US012724430B2

(12) United States Patent
Kurita

(10) Patent No.: US 12,724,430 B2
(45) Date of Patent: Sep. 1, 2026

(54) CONTROL DEVICE, FLYING OBJECT, MEASUREMENT SYSTEM, CONTROL METHOD, FLYING OBJECT CONTROL METHOD, AND STORAGE MEDIUM

(71) Applicant: NEC Corporation, Tokyo (JP)

(72) Inventor: Masafumi Kurita, Tokyo (JP)

(73) Assignee: NEC CORPORATION, Tokyo (JP)

( * ) Notice: Subject to any disclaimer, the term of this patent is extended or adjusted under 35 U.S.C. 154(b) by 12 days.

(21) Appl. No.: 18/725,201

(22) PCT Filed: Mar. 11, 2022

(86) PCT No.: PCT/JP2022/010944
§ 371 (c)(1),
(2) Date: Jun. 28, 2024

(87) PCT Pub. No.: WO2023/170940
PCT Pub. Date: Sep. 14, 2023

(65) Prior Publication Data
US 2025/0060761 A1 Feb. 20, 2025

(51) Int. Cl.
*G05D 1/689* (2024.01)
*G05D 1/48* (2024.01)
(Continued)

(52) U.S. Cl.
CPC ............... *G05D 1/689* (2024.01); *G05D 1/48* (2024.01); *G05D 1/695* (2024.01); *G05D 2105/55* (2024.01); *G05D 2109/20* (2024.01)

(58) Field of Classification Search
CPC .......... G05D 1/689; G05D 1/48; G05D 1/695; G05D 2105/55; G05D 2109/20;
(Continued)

(56) References Cited

U.S. PATENT DOCUMENTS

| | | | | |
|---|---|---|---|---|
| 10,218,893 | B2 * | 2/2019 | Iwakura | B64C 13/20 |
| 10,788,428 | B2 * | 9/2020 | Troy | G01S 17/10 |

(Continued)

FOREIGN PATENT DOCUMENTS

| | | | |
|---|---|---|---|
| CN | 111654814 | A | 9/2020 |
| JP | 2019-508778 | A | 3/2019 |

(Continued)

OTHER PUBLICATIONS

International Search Report for PCT Application No. PCT/JP2022/010944, mailed on May 31, 2022.

(Continued)

*Primary Examiner* — Thomas Ingram
(74) *Attorney, Agent, or Firm* — Sughrue Mion, PLLC

(57) ABSTRACT

A control device according to an aspect of the present disclosure includes: at least one memory storing a set of instructions; and at least one processor configured to execute the set of instructions to: control a first flying object and a second flying object in such a way that the first flying object hovers above a first target device, and the second flying object hovers above a second target device; control the first flying object in such a way that the first flying object measure a first distance to the second flying object in response to the first flying object hovering above the first target device and the second flying object hovering above the second target device; and acquire the measured first distance from the first flying object.

20 Claims, 38 Drawing Sheets

(51) Int. Cl.

| | |
|---|---|
| ***G05D 1/695*** | (2024.01) |
| ***G05D 105/55*** | (2024.01) |
| ***G05D 109/20*** | (2024.01) |

(58) Field of Classification Search
CPC .. G05D 1/225; G05D 1/6987; G05D 2107/13; G05D 2111/10; B64C 39/02; G08G 5/00
See application file for complete search history.

(56) References Cited

U.S. PATENT DOCUMENTS

| | | | | |
|---|---|---|---|---|
| 2018/0149138 | A1* | 5/2018 | Thiercelin | F03D 80/50 |
| 2018/0307230 | A1* | 10/2018 | Iwakura | G06V 20/176 |
| 2019/0171237 | A1* | 6/2019 | Iwakura | G01C 11/02 |

FOREIGN PATENT DOCUMENTS

| | | | |
|---|---|---|---|
| JP | 2019-100843 | A | 6/2019 |
| JP | 2019-156575 | A | 9/2019 |

OTHER PUBLICATIONS

English translation of Written opinion for PCT Application No. PCT/JP2022/010944, malled on May 31, 2022.

* cited by examiner

CONTROL DEVICE, FLYING OBJECT, MEASUREMENT SYSTEM, CONTROL METHOD, FLYING OBJECT CONTROL METHOD, AND STORAGE MEDIUM

This application is a National Stage Entry of PCT/JP2022/010944 filed on Mar. 11, 2022, the contents of all of which are incorporated herein by reference, in their entirety.

TECHNICAL FIELD

The present disclosure relates to a technique for controlling a flying object, and particularly to a technique for controlling a flying object in order to measure a distance.

BACKGROUND ART

When an accident occurs at an intersection in a metropolitan area, traffic is paralyzed due to processing after the accident, so that a large traffic jam occurs. In order to suppress the occurrence of large traffic congestion, it is necessary to speed up processing after the accident. In processing after the accident, it is necessary to measure a distance between objects left at the accident site. However, in order to speed up post-accident processing including manual measurement of distances between various objects, an increase in personnel in charge of post-accident processing is required.

PTL 1 describes a method of signaling an accident by a signaling drone in which a drone acquires a location of an accident site, calculates a location of at least one signaling, and performs signaling at the calculated location. The signaling of PTL 1 is to notify a vehicle traveling on a road of an accident by sound, light, or the like.

CITATION LIST

Patent Literature

PTL 1: JP 2019-508778 A

SUMMARY OF INVENTION

Technical Problem

The technique of PTL 1 is a technique for saving labor of traffic arrangement when a traffic accident occurs. The technique of PTL 1 cannot shorten the time for accident handling including measurement of the distance between objects left at the accident site.

An object of the present disclosure is to provide an estimation device and so forth that can reduce time for accident handling, without increasing staff for the accident handling.

Solution to Problem

A control device according to an aspect of the present disclosure includes: flying object control means for controlling a first flying object and a second flying object in such a way that the first flying object hovers above a first target device, and the second flying object hovers above a second target device; measurement control means for controlling the first flying object in such a way that the first flying object measure a first distance to the second flying object in response to the first flying object hovering above the first target device and the second flying object hovering above the second target device; and distance acquisition means for acquiring the measured first distance from the first flying object.

A control method according to an aspect of the present disclosure includes: controlling a first flying object and a second flying object in such a way that the first flying object hovers above a first target device, and the second flying object hovers above a second target device; controlling the first flying object in such a way that the first flying object measure a first distance to the second flying object in response to the first flying object hovering above the first target device and the second flying object hovering above the second target device; and acquiring the measured first distance from the first flying object.

A storage medium according to an aspect of the present disclosure stores a program for causing a computer to execute: flying object control processing of controlling a first flying object and a second flying object in such a way that the first flying object hovers above a first target device, and the second flying object hovers above a second target device; measurement control processing of controlling the first flying object in such a way that the first flying object measure a first distance to the second flying object in response to the first flying object hovering above the first target device and the second flying object hovering above the second target device; and distance acquisition processing of acquiring the measured first distance from the first flying object.

A flying object according to an aspect of the present disclosure includes: target image capturing means for capturing an image of a target region; target detection means for detecting a first target device from the target region by using the image of the target region; body control means for controlling a position of a body in such a way that the body moves to and hovers above the detected first target device; distance measurement means for measuring, at above the first target device, a distance to another flying object hovering above the second target device; and distance transmission means for transmitting the distance.

A flying object control method according to an aspect of the present disclosure includes: capturing an image of a target region; detecting a first target device from the target region by using the image of the target region; controlling a position of a body in such a way that the body moves to and hovers above the detected first target device; measuring, at above the first target device, a distance to another flying object hovering above the second target device; and transmitting the distance.

A storage medium according to an aspect of the present disclosure stores a program for causing a computer to execute: target image capturing processing of capturing an image of a target region; target detection processing of detecting a first target device from the target region by using the image of the target region; body control processing of controlling a position of a body in such a way that the body moves to and hovers above the detected first target device; distance measurement processing of measuring, at above the first target device, a distance to another flying object hovering above the second target device; and distance transmission processing of transmitting the distance.

An aspect of the present disclosure is also achieved by the above-described program.

Advantageous Effects of Invention

The present disclosure has an effect of shortening the time for accident handling without increasing the number of personnel for accident handling.

EXAMPLE EMBODIMENT

Hereinafter, example embodiments of the present disclosure will be described in detail using the drawings.

First Example Embodiment

First, the first example embodiment of the present disclosure will be described in detail using the drawings.

<Configuration>

Figure 1:
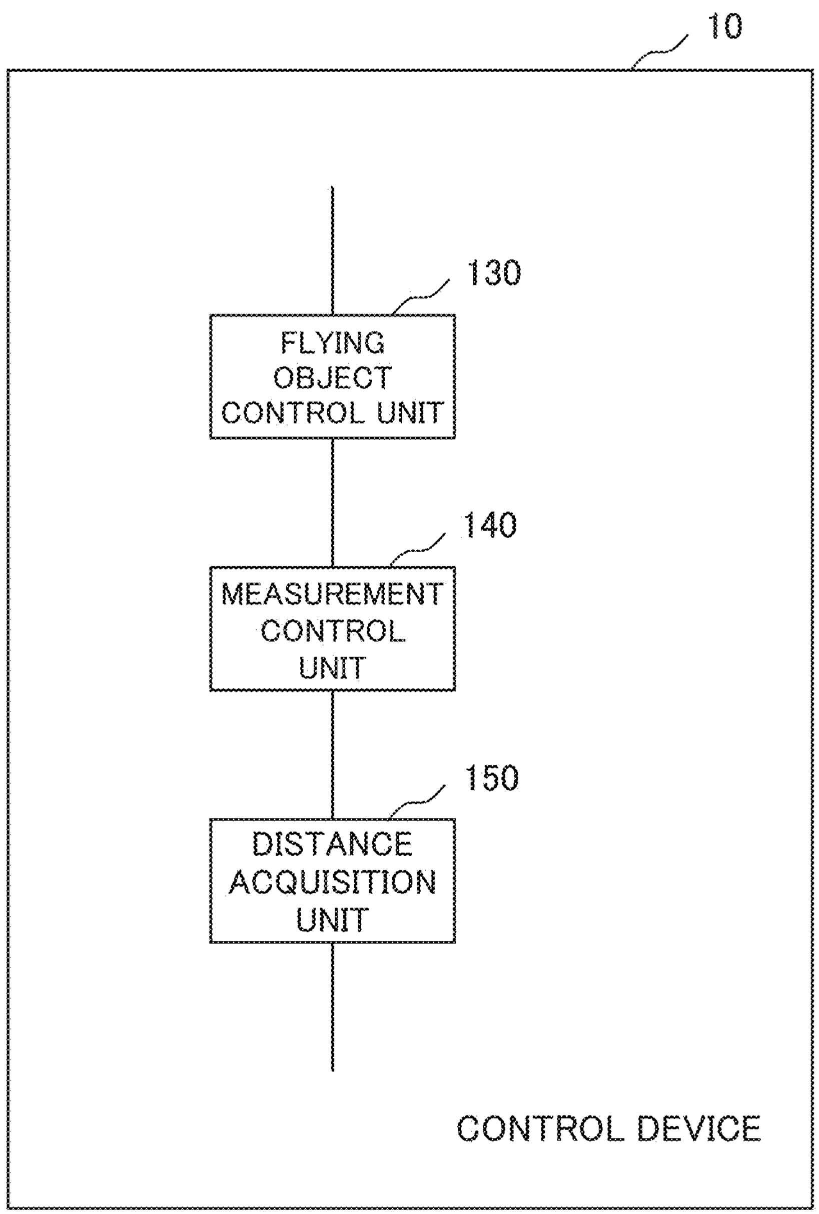
FIG. 1 is a block diagram illustrating an example of a configuration of a control device according to the first example embodiment of the present disclosure.

FIG. 1 is a block diagram illustrating an example of a configuration of a control device according to the first example embodiment of the present disclosure. In the example illustrated in FIG. 1, a control device 10 according to the present example embodiment includes a flying object control unit 130, a measurement control unit 140, and a distance acquisition unit 150. The flying object control unit 130 controls the first flying object and the second flying object in such a way that the first flying object hovers above the first target device and the second flying object hovers above the second target device. The measurement control unit 140 controls the first flying object in such a way that the first flying object measures a first distance to the second flying object in response to the first flying object hovering above the first target device and the second flying object hovering above the second target device. The distance acquisition unit 150 acquires the measured first distance from the first flying object.

<Target Device>

The first target device and the second target device are, for example, plate-shaped members on which a pattern of a predetermined pattern is drawn. The first target device and the second target device are collectively referred to as a target device in the description of the present disclosure. The first target device and the second target device may also be referred to as a first position target device and a second target device, respectively. The first target device and the second target device are also collectively referred to as a position target device. The pattern of the first target device is different from the pattern of the second target device.

The pattern of the target device may be drawn in such a way that one specific point (for example, a center point, a specific vertex, or the like) set in the target device can be identified. Such a pattern may be, for example, a pattern including concentric circles. In this case, the above-described one specific point is, for example, the center of a concentric circle. Such a pattern may be, for example, a pattern including a plurality of line segments intersecting at one point. In this case, the above-described one specific point is, for example, an intersection of a plurality of line segments. Such a pattern may be, for example, a pattern including a concentric circle and a plurality of line segments intersecting at the center of the concentric circle. In this case, the above-described one specific point is, for example, a point that is a center of a concentric circle and is an intersection of a plurality of line segments. The position of the target device is represented by the position of one specific point (hereinafter, also referred to as a reference point) described above.

The target device is not limited to the above example. Another specific example of the target device will be described in detail later.

In the example embodiment of the present disclosure, the air above the target device represents vertically above the above-described one point (that is, the specific point) representing the position of the target device.

<Flying Object>

In the following description, the first flying object and the second flying object are collectively referred to as a flying object. The flying object of the present example embodiment is a flying object (for example, a drone or the like) that can fly under the control of the control device 10 (in other words, in accordance with an instruction from a control device 100). In other words, the flying object of the present example embodiment changes the position and height in the air according to an instruction from the control device 10. In the present description, the position of the flying object represents a position (in other words, the position of the flying object projected on the horizontal plane) in a plane parallel to the horizontal plane. The height of the flying object represents a height of the flying object in the vertical direction. The position and height of the flying object are represented by the position and height of one specific point (hereinafter, also referred to as a reference point) set in the flying object. The flying object of the present example embodiment can also hover in the air under the control by the control device 10 (in other words, in accordance with an instruction from the control device 100).

In the example embodiment of the present disclosure, that the flying object hovers above the target device means that the flying object hovers in the air in a state where the reference point of the flying object is vertically above the reference point of the target device.

The flying object includes a target measurement device that measures a target device. The target measuring unit is, for example, an imaging device. The target measurement device may be another measurement device that outputs a measurement result from which data from which the position of the target device can be estimated is obtained. The flying object further includes a distance measurement device that measures a distance to another flying object. The distance measurement device may be, for example, a laser distance meter. The distance measurement device may be a distance meter that measures a distance by another means. The flying object includes an attitude detection device, including a gyro or the like, capable of detecting a vertical direction (specifically, the direction of gravity) at the time of hovering in the air. The flying object may be configured to be able to control the attitude (specifically, inclination of the body) detected by the attitude detection device. Specifically, the flying object is configured to maintain a state in which the attitude detected by the attitude detection device is a predetermined attitude when the flying object is hovering in the air. The predetermined attitude may be, for example, an attitude in which a reference face set on the body of the flying object is parallel to the horizontal plane. Hereinafter, the attitude in which the reference face set in the body of the flying object is parallel to the horizontal plane is denoted as a reference attitude. A straight line that passes through the reference point of the flying object and is orthogonal to the reference face is denoted as a reference line.

The target measurement device is configured in such a way that a measurement result obtained by the target measurement device is in a predetermined state when the reference point of the flying object is in the air above the reference point of the target device. For example, the target measurement device is attached to the flying object in such a way that the position of the image of the reference point of the target device is a predetermined position in the image captured by the target measurement device as the imaging device in a case where the attitude of the flying object is the reference attitude and the reference point of the flying object is in the air above the reference point of the target device. In the following description, a point indicated by the predetermined position is denoted as a target point. The target point is a point representing the position of the image of the reference point of the target device in the image captured by the target measurement device that is the imaging device in a case where the attitude of the flying object is the reference attitude and the reference point of the flying object is in the air above the reference point of the target device.

The distance measurement device is attached to the flying object in such a way as to measure a distance from a distance measuring device to an object closest to the distance measuring device on a plane orthogonal to a vertical line passing through a reference point of the flying object (on a plane parallel to the horizontal plane and the reference face) in a case where the attitude of the flying object is the reference attitude. In other words, the distance measurement device is attached to the flying object in such a way as to measure the distance from the distance measuring device to the object closest to the distance measuring device on a straight line parallel to the reference face of the flying object. A positional relationship between a vertical line and a reference point of the distance measuring device in distance measurement (that is, the point at which the distance is zero) on a plane orthogonal to the vertical line passing through the reference point of the flying object in a case where the attitude of the flying object is the reference attitude and a direction in which the distance measuring device measures the distance are measured and obtained in advance. The distance measurement device may be attached to the flying object in such a way as to measure a distance from the distance measuring device to an object closest to the distance measuring device, the object being present on a straight line orthogonal to a vertical line passing through a reference point of the flying object, in a case where the attitude of the flying object is the reference attitude. In other words, the distance measurement device may be attached to the flying object in such a way as to measure the distance from the distance measuring device to the object closest to the distance measuring device on a straight line that passes through the reference point of the flying object and is orthogonal to the reference face of the flying object. In this case, the direction in which the distance measuring device measures the distance is a direction, on a straight line orthogonal to a vertical line (that is, the above-described reference line) passing through the reference point of the flying object in a case where the attitude of the flying object is the reference attitude, from an intersection of the straight line and the reference line to the reference point of the distance measuring device in distance measurement. In this case, the distance from the vertical line passing through the reference point of the flying object in a case where the attitude of the flying object is the reference attitude to the reference point of the distance measuring device in distance measurement is measured and obtained in advance.

A member (for example, a rod-shaped member) indicating a reference line is attached to the flying object. For example, a cylindrical member may be attached to the flying object as an exterior in such a way that an axis of the member matches the reference line. The diameter of the outer periphery of the cylindrical member is previously measured and known. When the flying object (for example, the first flying object) measures the distance to another flying object (for example, the second flying object), the flying object control unit 130 controls the attitude of the flying object in such a way that the direction of measurement by the distance measurement device of the flying object is a direction toward a straight line indicated by a member indicating a reference line of the another flying object. The distance measurement device of the flying object (in this case, the first flying object) measures a distance (that is, the first distance described above) from a reference point of the distance measurement device of the flying object (in this case, the first flying object) in distance measurement to a member of an exterior of another flying object (in this case, the second flying object). As described above, when measuring the distance, the first flying object hovers above the first target device, and the second flying object hovers above the second target device. Therefore, the distance (specifically, the distance between the reference point of the first target device and the reference point of the second target device) between the first target device and the second target device is the sum of the first distance, the radius of the outer periphery of the member of the exterior of the flying object, and the distance between the reference line of the flying object and the measurement reference point of the distance measuring device.

The configuration of the flying object is not limited to the above example.

In the description of the present example embodiment, a flying object that measures the distance by the distance measurement device is denoted as a first flying object, and a flying object that does not measure the distance by the distance measurement device is denoted as a second flying object. However, the configuration of the second flying object may be the same as the configuration of the first flying object. Specifically, the second flying object may also include a distance measurement device. The structure of the second flying object may be the same as the structure of the first flying object. The structure of the second flying object may be different from the structure of the first flying object.

<Operation>

Next, an operation of the control device 10 according to the first example embodiment of the present disclosure will be described in detail with reference to the drawings.

Figure 2:
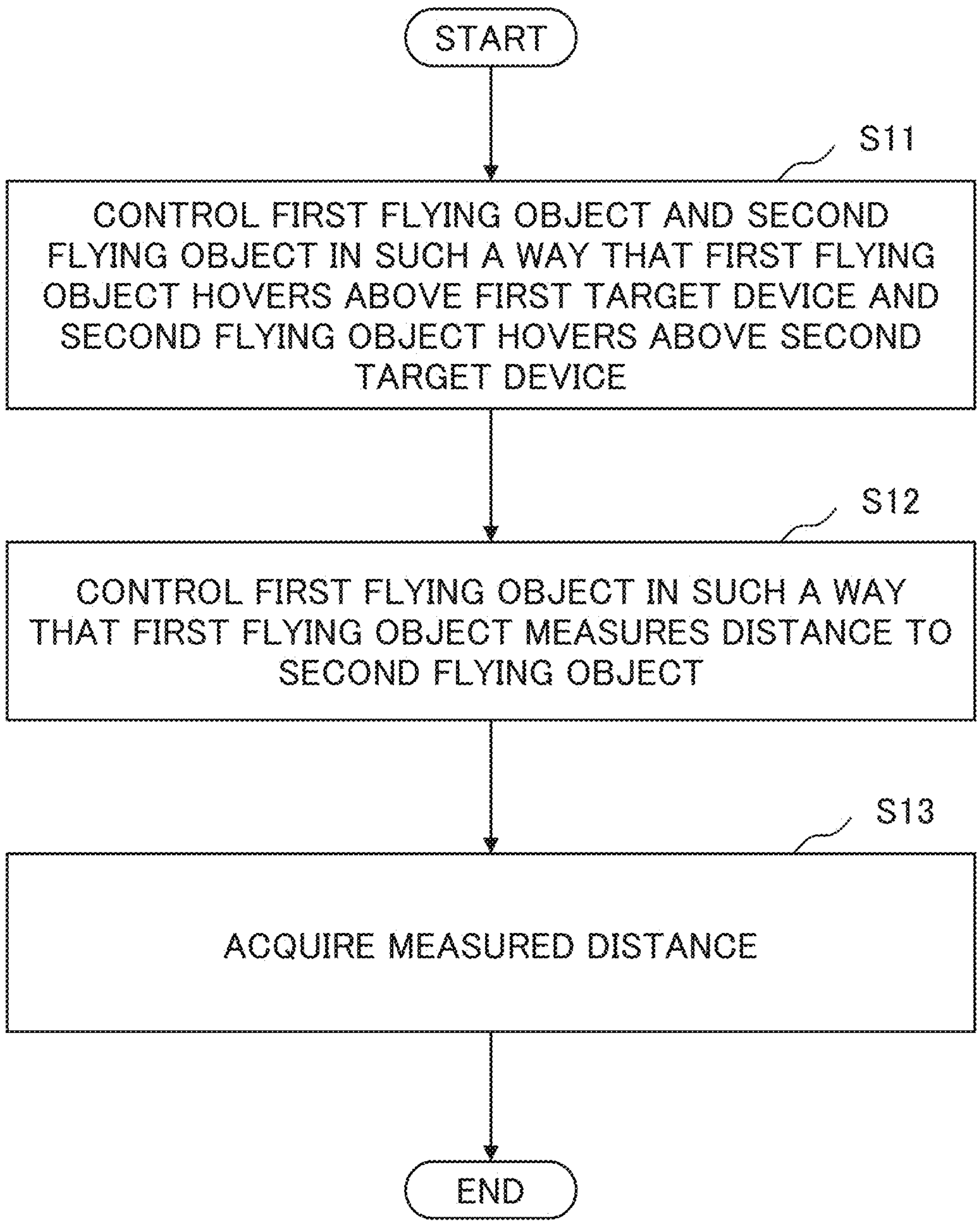
FIG. 2 is a flowchart illustrating an example of an operation of a measuring device according to the first example embodiment of the present disclosure.

FIG. 2 is a flowchart illustrating an example of the operation of the control device 10 according to the first example embodiment of the present disclosure. In the example illustrated in FIG. 2, the flying object control unit 130 controls the first flying object and the second flying object in such a way that the first flying object hovers above the first target device and the second flying object hovers above the second target device (step S11). Next, the measurement control unit 140 controls the first flying object in such a way that the first flying object measures the distance to the second flying object (step S12). The distance acquisition unit 150 acquires the measured distance from the first flying object (step S13).

<Effects>

The present example embodiment described above has an effect of shortening the time for accident handling without increasing the number of personnel for accident handling. This is because the flying object control unit 130 controls the first flying object and the second flying object in such a way that the first flying object hovers above the first target device and the second flying object hovers above the second target device. Then, this is because the measurement control unit 140 controls the first flying object in such a way as to measure the distance to the second flying object. As described above, in the example embodiment of the present disclosure, that the flying object hovers above the target device means that the flying object hovers in the air in a state where the reference point of the flying object is vertically above the reference point of the target device. Therefore, in a state where the first flying object hovers above the first target device and the second flying object hovers above the second target device, the distance between the reference line of the first flying object and the reference line of the second flying object corresponds to the distance (specifically, the distance between the reference point of the first target device and the reference point of the second target device) between the first target device and the second target device. The distance between the first target device and the second target device can be derived from the distance (specifically, a distance from the distance measurement device to the distance measurement point on the exterior of the second flying object) to the second flying object measured by the distance measurement device of the first flying object. Therefore, it is not necessary to manually measure the distance between the first target device and the second target device. In a case where the distance between the first target device and the second target device is measured manually, it takes time to place the measurement instrument and accurately measure the distance. On the another hand, by performing distance measurement using the flying object, the time for measuring the distance between the first target device and the second target device is shortened.

First Modification of First Example Embodiment

As described above, the distance measuring device may be attached in such a way as to measure a distance in a direction of a straight line parallel to the reference face of the flying object and orthogonal to the reference line of the flying object. A cylindrical member may be attached to the flying object as an exterior in such a way that an axis of the member matches the reference line.

In this case, the distance acquisition unit 150 may calculate the sum of the first distance, the radius of the outer periphery of the member of the exterior of the flying object, and the distance between the reference line of the flying object and the measurement reference point of the distance measuring device as the distance between the first target device and the second target device. Specifically, the distance between the first target device and the second target device represents a distance between a reference point of the first target device and a reference point of the second target device. This modification can also be applied to other example embodiments described later.

Second Modification of First Example Embodiment

In the present modification, the distance measurement device of the flying object may be attached in such a way as to measure the distance to the distance measurement point in a plane parallel to the reference face. The positional relationship between the reference line and the distance measurement reference point and the distance measurement direction are measured and obtained in advance, for example. The information about the outer shape of the first flying object and the information about the outer shape of the second flying object are also obtained in advance.

The distance measurement device of the flying object (first flying object) may include a laser light radiation device attached to irradiate a distance measurement point with laser light. The distance measurement point is a point to be measured for the distance by the distance measurement device. In other words, the distance measurement device measures the distance from the reference point of the distance measurement to the distance measurement point. The flying object may include an imaging device that images a distance measurement target when the distance measurement device measures the distance. The distance acquisition unit 150 may acquire an image captured at the time of measuring the distance in addition to the measured distance. The distance acquisition unit 150 may detect a distance measurement point (that is, the point irradiated with the laser light) of another flying object to be distance measured. In this case, the distance acquisition unit 150 may identify the position of the distance measurement point on the surface of the exterior of another flying object (for example, the second flying object) using an existing image recognition technique. The distance acquisition unit 150 may identify a positional relationship between the reference line of another flying object (for example, the second flying object) and the distance measurement point using information about the shape of the exterior of the another flying object. Furthermore, the distance acquisition unit 150 may calculate the distance between the reference line of the first flying object and the reference line of the second flying object from the information about the structure of the flying object (that is, the first flying object), the obtained first distance, and the positional relationship between the reference line of another flying object and the distance measurement point. The distance acquisition unit 150 may set the calculated distance as a distance between the reference point of the first target device and the reference point of the second target device. This modification can also be applied to other example embodiments described later.

Third Modification of First Example Embodiment

The flying object may include a device using light detection and ranging (LiDAR) as the distance measurement device. Another flying object may be measured using a device using LiDAR. In this case, the flying object may transmit data obtained by measurement by a device using LiDAR to the distance acquisition unit 150. In the flying object, the distance acquisition unit 150 may estimate the position and attitude of another flying object by an existing technology using data obtained by measurement by a device using LiDAR. The distance acquisition unit 150 may estimate the position of the reference line of the another flying object from the estimated position and attitude of the another flying object. The distance acquisition unit 150 may calculate the distance between the reference line of the flying object and the position of the reference line of the another flying object from the positional relationship between the reference line of the flying object and the distance measurement device and the position of the reference line of the another flying object. This modification can also be applied to other example embodiments described later.

<Another Example of Target Device>

The target device (that is, the position target device) may be a plate-like member having a back face coated with an adhesive. In this case, a pattern may be drawn on the front face of the target device. The material of the member may be any of resin, metal, ceramic, wood, and the like. The target device may be a seal including resin. In this case, a pattern may be drawn on the front face of the target device, and an adhesive may be applied to the back face of the target device.

The pattern of the target device may be drawn by night light paint. The pattern of the target device may be achieved by a structure that reflects light in a light radiation direction. The pattern of the target device may be drawn by a coating material that emits fluorescence when irradiated with light of a predetermined wavelength (ultraviolet light or the like). The pattern of the target device may be achieved by a light emitting device including a light-emitting diode (LED).

The pattern of the first target device may be different in shape from the pattern of the second target device. The pattern of the first target device may be different in color from the pattern of the second target device. The pattern of the first target device may be different from the pattern of the second target device in a combination of colors.

The target device may include LEDs that blink in a predetermined pattern. In this case, the blinking pattern of the first target device may be different from the blinking pattern of the second target device.

Second Example Embodiment

Hereinafter, the second example embodiment of the present disclosure will be described in detail using the drawings.

<Configuration>

Figure 3:
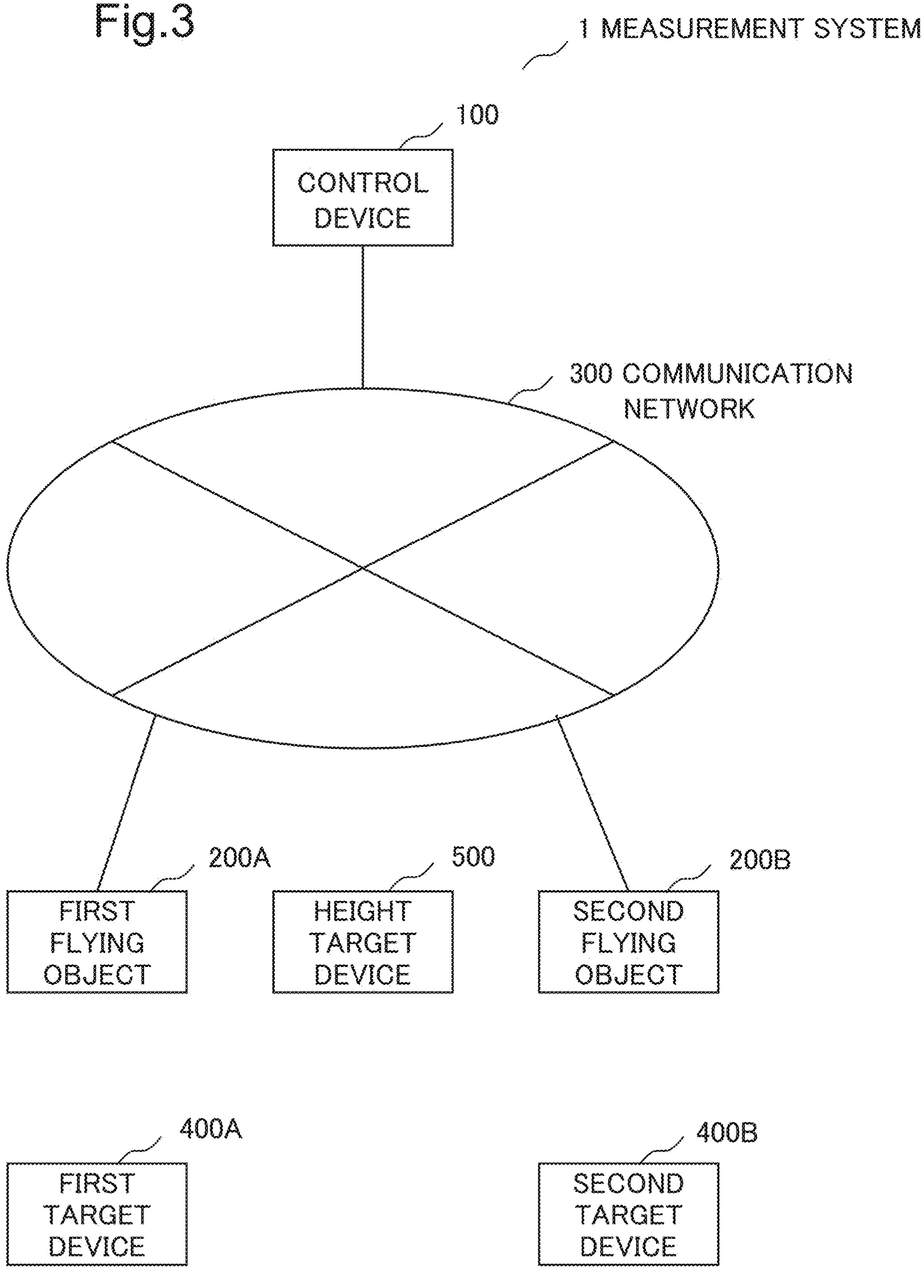
FIG. 3 is a diagram illustrating a configuration of a measurement system according to the second example embodiment of the present disclosure.

FIG. 3 is a diagram illustrating a configuration of a measurement system according to the second example embodiment of the present disclosure. In the example illustrated in FIG. 3, a measurement system 1 of the present example embodiment includes the control device 100, a first flying object 200A, a second flying object 200B, a first target device 400A, a second target device 400B, and a height target device 500. The control device 100 is communicably connected to the first flying object 200A and the second flying object 200B via a communication network 300. The configuration of the control device 100 will be described in detail later.

<Flying Object>

The first flying object 200A and the second flying object 200B of the present example embodiment are the same as the first flying object and the second flying object of the first example embodiment, respectively. When the first flying object 200A and the second flying object 200B are individually indicated, the first flying object 200A and the second flying object 200B are denoted as the first flying object 200A and the second flying object 200B as they are, respectively. In a case where the first flying object 200A and the second flying object 200B are collectively referred to, the target device including the first flying object 200A and the second flying object 200B is denoted as a flying object 200. The configuration of the flying object 200 will be described in detail later. The communication network 300 is a communication network using radio. The first flying object 200A and the second flying object 200B are wirelessly connected to the communication network 300. The first flying object 200A and the second flying object 200B communicate with a device connected to the communication network 300 by wireless communication. The control device 100 may be connected to the communication network 300 by wire. The control device 100 may be wirelessly connected to the communication network 300.

<Target Device>

The first target device 400A and the second target device 400B of the present example embodiment are the same as the first target device and the second target device of the first example embodiment, respectively. In a case where the first target device 400A and the second target device 400B are distinguished, the first target device 400A and the second target device 400B are denoted as the first target device 400A and the second target device 400B as they are, respectively. In a case where the first target device 400A and the second target device 400B are not distinguished from each other, the first target device 400A and the second target device 400B are collectively referred to as a target device 400.

<Height Target Device 500>

The height target device 500 is, for example, a plate-shaped member on which a pattern of a predetermined pattern is drawn.

The pattern of the height target device 500 may be drawn in such a way that one specific point (for example, a center point, a specific vertex, or the like) set in the height target device 500 can be identified, as in the pattern of the first target device 400A and the pattern of the second target device 400B. However, the pattern of the height target device 500 is different from the pattern of the first target device 400A and the pattern of the second target device 400B.

The height target device 500 is attached to a self-contained member (hereinafter, denoted as a self-contained device). The height of the mounting position of the height target device 500 may be variable. The height of the mounting position of the height target device 500 may be fixed.

The height target device 400 is placed in such a way as to be visible from the air above the accident site, for example.

<Flying Object 200>

Figure 4:
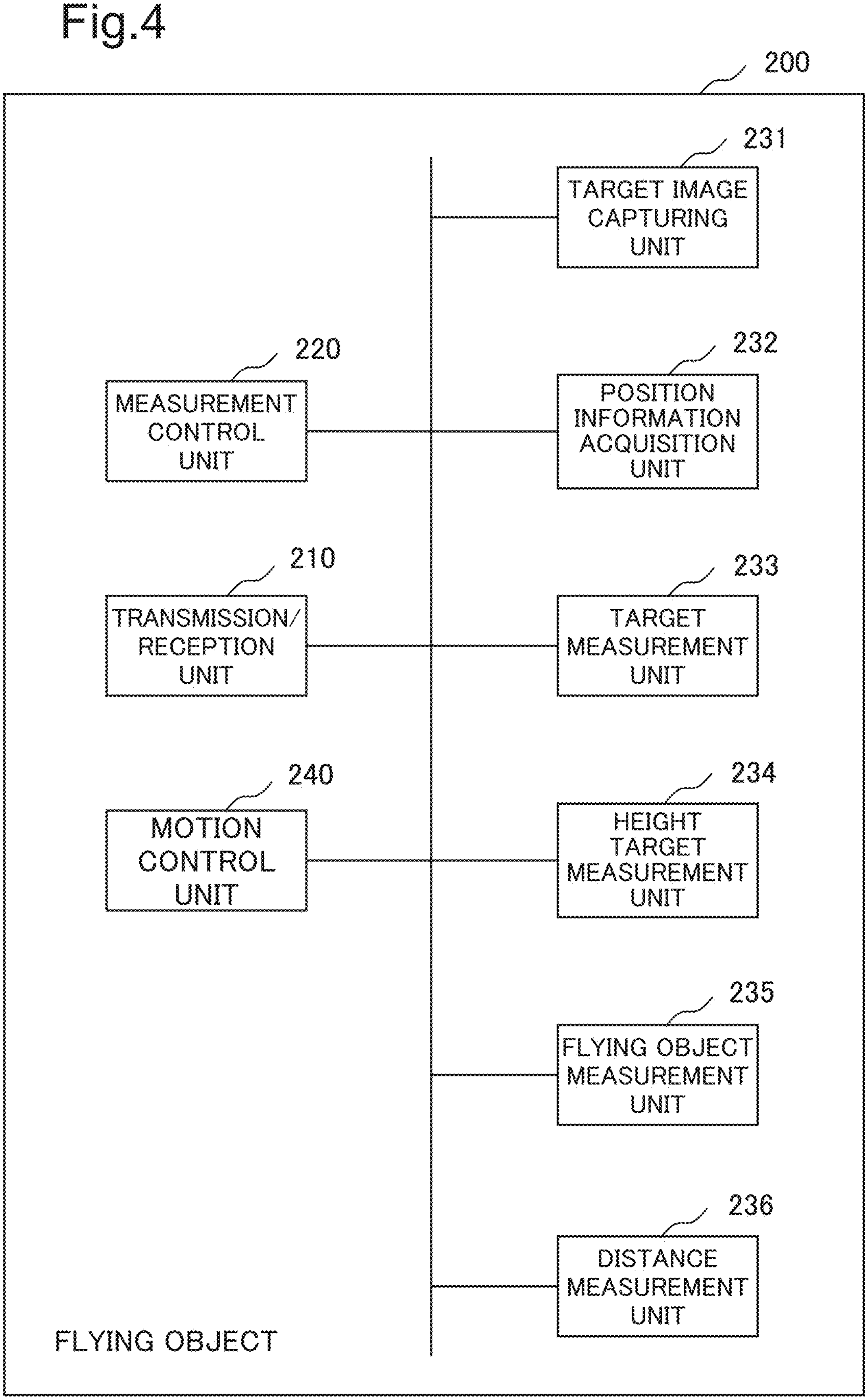
FIG. 4 is a block diagram illustrating an example of a configuration of a flying object according to the second example embodiment of the present disclosure.

FIG. 4 is a block diagram illustrating an example of a configuration of a flying object according to the second example embodiment of the present disclosure. In the example illustrated in FIG. 4, the flying object 200 includes a transmission/reception unit 210, a measurement control unit 220, a motion control unit 240, a target image capturing unit 231, a position information acquisition unit 232, a target measurement unit 233, a height target measurement unit 234, a flying object measurement unit 235, and a distance measurement unit 236. The first flying object 200A has the configuration illustrated in FIG. 4. The second flying object 200B may not include the flying object measurement unit 235 and the distance measurement unit 236 in the configuration illustrated in FIG. 4.

<Transmission/Reception Unit 210>

The transmission/reception unit 210 receives a measurement instruction and a body control instruction from the control device 100. The transmission/reception unit 210 transmits the measurement instruction received from the control device 100 to the measurement control unit 220. The transmission/reception unit 210 transmits, to the motion control unit 240, the instruction to control the body received from the control device 100. The instruction to control the body is an instruction to move the body. In other words, the instruction to control the body is an instruction to change at least one of the position and the height of the body. The instruction to control the body may be an instruction to cause the body to hover in the air. The instruction to control the body may be an instruction to change the direction of the body.

In a state where the flying object 200 is hovering in the air, the flying object may be configured to be hovering in the air in a state where the reference face is parallel to the horizontal plane.

The transmission/reception unit 210 receives the measurement data obtained by the measurement from the measurement control unit 220 to transmit the received measurement data to the control device 100.

<Motion Control Unit 240>

The motion control unit 240 receives an instruction to control the body from the transmission/reception unit 210. The motion control unit 240 controls the body in accordance with the received instruction to control the body. In a case where the instruction to control the body is an instruction to change the position of the body, the motion control unit 240 moves the flying object 200 according to the instruction.

In a case where the instruction to control the body is an instruction to change the position of the body without changing the height of the body, the motion control unit 240 horizontally moves the flying object 200 according to the instruction. The instruction to change the position of the body without changing the height of the body may be, for example, an instruction to move to a point specified by information identifying the position. In this case, the motion control unit 240 horizontally moves the flying object 200 to a point specified by the information for identifying the position, for example, using the information about the position of the flying object 200 acquired by the position information acquisition unit 232 to be described in detail later, according to the instruction. The information for identifying the position is, for example, latitude and longitude. The information for identifying the position may be coordinates in a coordinate system set in the target region. In this case, the relationship between the latitude and longitude and the coordinates in the coordinate system set in the target region may be given to the motion control unit 240.

The instruction to change the position of the body without changing the height of the body may be, for example, an instruction to move in an instructed direction. In this case, the motion control unit 240 moves the flying object 200 in the instructed direction according to the instruction, for example, using the information about the position of the flying object 200 acquired by the position information acquisition unit 232 described in detail later. The instruction to move in the instructed direction may include an instruction of a time of movement. In this case, the motion control unit 240 moves the flying object 200 in the instructed direction for the instructed time using, for example, information about the position of the flying object 200 acquired by the position information acquisition unit 232 to be described in detail later according to the instruction. The moving speed of the flying object 200 may be appropriately determined in advance.

In a case where the instruction to control the body is an instruction to cause the body to hover in the air, the motion control unit 240 causes the flying object to hover in the air.

In a case where the instruction to control the body is an instruction to change the direction of the body, the motion control unit 240 changes the direction (in other words, the direction in which the flying object is facing) of the flying object without changing the height and position of the place where the flying object 200 is staying in the air according to the instruction. The front, back, left, and right of the flying object may be appropriately defined. The instruction to change the direction of the body may be, for example, an instruction to direct the body in the instructed direction. In this case, the motion control unit 240 changes the direction of the flying object 200 in such a way that the direction of the flying object 200 is directed to the instructed azimuth using, for example, information about the position of the flying object 200 acquired by the position information acquisition unit 232 to be described in detail later. The instruction to change the direction of the body may be, for example, an instruction to rotate the body in an instructed direction (for example, right direction or left direction). In this case, the motion control unit 240 rotates the flying object 200 in the instructed direction. The indication to rotate in the indicated direction may include an instruction of a time to rotate. In this case, the motion control unit 240 rotates the flying object 200 in the instructed direction for the instructed time.

The flying object 200 may be configured to hover in the air in a case where there is no instruction to control the body. The flying object 200 may be designed to avoid surrounding and lower obstacles. Specifically, the flying object 200 may include a plurality of distance measurement devices that respectively measure distances to a surface of a road surface, an object, or the like existing around and below. In a case where at least any one of the distances measured by the plurality of distance measurement devices is less than a predetermined distance, the motion control unit 240 may be configured to change the direction of movement in such a way as to avoid an obstacle in a direction in which the distance less than the predetermined distance is measured. For example, in a case where the downward distance falls below a predetermined distance, the motion control unit 240 may move the body upward. For example, in a case where the right distance falls below the predetermined distance, the motion control unit 240 may move the body to the left. For example, in a case where the left distance falls below the predetermined distance, the motion control unit 240 may move the body to the right. For example, in a case where the forward distance falls below the predetermined distance, the motion control unit 240 may move the body upward. In a case where the forward distance falls below the predetermined distance, the motion control unit 240 may move the body in a predetermined direction (for example, rightward or leftward). In this case, at least one of the plurality of distance measurement devices may operate as a distance measurement unit 236 described in detail later.

In a case where the instruction to control the body is an instruction to change the height of the body without changing the position of the body on the horizontal plane, the motion control unit 240 moves the flying object in the vertical direction in accordance with the instruction. The instruction to change the height may be, for example, an instruction to change the height of the body (for example, the height from an object below the body or the ground surface) to a designated height. In a case where such an instruction is received, the motion control unit 240 changes the height of the body of the flying object 200 in such a way that the distance measured by the distance measurement device that measures the distance below among the above-described distance measurement devices is the designated height. After the height of the body reaches the designated height, the motion control unit 240 causes the body of the flying object 200 to hover in the air.

The instruction to change the height may be, for example, an instruction to raise the body or an instruction to lower the body. When receiving the instruction to raise the body, the motion control unit 240 raises the position of the body, for example, until receiving the next instruction. When receiving an instruction to lower the body, the motion control unit 240 lowers the position of the body, for example, until the height of the body measured by a distance measurement device that measures a distance below reaches a predetermined height or a next instruction is received. The instruction to raise the body may include an instruction of time. In a case where an instruction to raise the body including an instruction of time is received, the motion control unit 240 raises the position of the body for the instructed time. In this case, after raising the body for the instructed time, the motion control unit 240 causes the position of the body to hover in the air. The instruction to lower the body may include an instruction of time. When receiving an instruction to lower the body including an instruction of time, the motion control unit 240 lowers the position of the body for the instructed time. In this case, after lowering the body for the instructed time, the motion control unit 240 causes the position of the body to hover in the air.

<Measurement Control Unit 220>

The measurement control unit 220 receives a measurement instruction from the transmission/reception unit 210. In accordance with the received measurement instruction, the measurement control unit 220 performs measurement using at least any one of the target image capturing unit 231, the position information acquisition unit 232, the target measurement unit 233, the height target measurement unit 234, the flying object measurement unit 235, and the distance measurement unit 236.

In a case where the measurement instruction is an instruction to capture a target image, the measurement control unit 220 captures an image of a target region using the target image capturing unit 231. The measurement control unit 220 further acquires information about the position of the flying object using the position information acquisition unit 232 when capturing the target image. The measurement control unit 220 associates identification information about an image, the information identifying the captured image, with information about the position of the flying object when the image is captured. The measurement control unit 220 transmits, to the transmission/reception unit 210, the image obtained by imaging the target region and the information about the position associated with the identification information about the image as measurement data obtained by the measurement. The transmission/reception unit 210 receives, as measurement data, an image obtained by imaging the target region and information about a position associated with identification information about the image. The transmission/reception unit 210 transmits, to the control device 100, the image obtained by imaging the received target region and information about the position associated with the identification information about the image as measurement data.

The target image is an image obtained by imaging a target region. The target region is a region where the target device 400 is placed (for example, a region including a site of a traffic accident). The information indicating the range of the target region may be given to the flying object 200 in advance. The information indicating the range of the target region may be included in the instruction to capture the target image. The range of the target region may be represented by latitude and longitude.

The control device 100 moves the flying object 200 to a position and a height at which the target image is captured by transmitting an instruction to move the body of the flying object before transmitting an instruction to capture the target image.

In a case where the measurement instruction is an instruction to measure the target device, the measurement control unit 220 measures the target device 400 using the target measurement unit 233. The measurement control unit 220 transmits the measurement data obtained by measuring the target device 400 to the transmission/reception unit 210. The transmission/reception unit 210 receives the measurement data to transmit the received measurement data to the control device 100.

The control device 100 sets the state of the flying object 200 to a state in which the flying object 200 is hovering in the air by transmitting an instruction to hover in the air to the flying object 200 before measuring the instruction to measure the target device.

In a case where the measurement instruction is an instruction to measure the height target, the measurement control unit 220 measures the height target device 500 using the height target measurement unit 234. The measurement control unit 220 transmits the measurement data obtained by measuring the height target device 500 to the transmission/reception unit 210. The transmission/reception unit 210 receives the measurement data to transmit the received measurement data to the control device 100.

The control device 100 transmits an instruction to change the direction of the flying object 200 before transmitting the instruction to measure the height target. Thus, the direction of the flying object 200 is set to a direction in which the height target measurement unit 234 can measure the height target device 500. The control device 100 sets the state of the flying object 200 to a state in which the flying object 200 is hovering in the air by transmitting an instruction to hover in the air to the flying object 200 or the like.

In a case where the measurement instruction is an instruction to measure another flying object 200, the measurement control unit 220 measures the another flying object 200 using the flying object measurement unit 235. The measurement control unit 220 transmits the measurement data of the another flying object 200, the measurement data being obtained by the measurement, to the transmission/reception unit 210. The transmission/reception unit 210 receives the measurement data to transmit the received measurement data to the control device 100.

The control device 100 transmits an instruction to change the direction of the flying object 200 before transmitting the instruction to measure the another flying object 200. Thus, the direction of the flying object 200 is set to a direction in which the flying object measurement unit 235 can measure the another flying object 200 to be measured. The control device 100 sets the state of the flying object 200 to a state in which the flying object 200 is hovering in the air by transmitting an instruction to hover in the air to the flying object 200 or the like.

In a case where the measurement instruction is an instruction to measure the distance, the measurement control unit 220 measures the distance using the distance measurement unit 236. The measurement control unit 220 transmits, to the transmission/reception unit 210, the distance information obtained by the measurement as measurement data. The transmission/reception unit 210 receives distance information as measurement data to transmit the received distance information to the control device 100 as measurement data.

The control device 100 transmits an instruction to change the direction of the flying object 200 before transmitting the instruction to measure the distance. Thus, the direction of the flying object 200 is set to the direction in which the distance measurement unit 236 can measure the distance to the another flying object 200. The control device 100 sets the state of the flying object 200 to a state in which the flying object 200 is hovering in the air by transmitting an instruction to hover in the air to the flying object 200 or the like.

<Target Image Capturing Unit 231>

The target image capturing unit 231 captures an image of a target region under the control of the measurement control unit 220. The target image capturing unit 231 transmits the image of the target region obtained by performing imaging to the measurement control unit 220. An image obtained by imaging the target region is also denoted as a target image.

<Position Information Acquisition Unit 232>

The position information acquisition unit 232 acquires information about the position of the flying object 200 under the control of the measurement control unit 220. In the description of the example embodiment of the present disclosure, the information about the position of the flying object 200 includes information about the latitude and longitude of the position of the flying object 200 and information about the azimuth in the direction in which the flying object 200 is facing. The position information acquisition unit 232 may measure the position (that is, latitude and longitude) of the flying object using, for example, a technology of measuring the position of a global positioning system (GPS) or the like. The flying object 200 may be equipped with an azimuth sensor including a gyro or the like. The azimuth sensor may be configured to measure an azimuth in a direction in which the flying object 200 is facing to output information about the azimuth obtained by the measurement. The position information acquisition unit 232 may measure an azimuth in a direction in which the flying object 200 is facing, using an azimuth sensor mounted on the flying object 200. The position information acquisition unit 232 transmits the acquired position information (that is, information including information about the latitude and longitude of the flying object 200 and information about the azimuth in the direction in which the flying object 200 is facing) to the measurement control unit 220.

<Target Measurement Unit 233>

The target measurement unit 233 measures the target device 400 under the control of the measurement control unit 220. The target measurement unit 233 transmits the measurement data obtained by measuring the target device 400 to the measurement control unit 220.

The target measurement unit 233 may be, for example, an imaging device. In this case, the measurement data is an image obtained by imaging the target device 400. The target measurement unit 233 that is the imaging device may be attached in such a way that an intersection of a vertical line (that is, the reference line) passing through the reference point and the surface of the imaging target is a predetermined point in the captured image, for example, in a state where the reference face of the flying object 200 is parallel to the horizontal plane. Specifically, for example, the target measurement unit 233 may be attached in such a way that the optical axis of the target measurement unit 233, which is an imaging device, matches the reference line.

The target measurement unit 233 is the same as the target measurement device of the first example embodiment. The target measurement unit 233 may operate as the target image capturing unit 231.

<Height Target Measurement Unit 234>

The height target measurement unit 234 measures the height target device 500 under the control of the measurement control unit 220. The height target measurement unit 234 transmits the measurement data of the height target device 500 obtained by the measurement to the measurement control unit 220.

The height target measurement unit 234 may be, for example, an imaging device. In this case, the measurement data is an image obtained by imaging the height target device 500. The height target measurement unit 234 may be attached to the flying object 200 in such a way that a predetermined line of an image obtained by performing imaging indicates the height equal to the height of the reference face of the flying object 200 in a case where the flying object 200 to which the height target measurement unit 234 is attached is in the reference attitude. For example, the height target measurement unit 234 may be attached in such a way that the optical axis of the height target measurement unit 234, which is an imaging device, passes through the reference face of the flying object 200. Hereinafter, the above-described predetermined line is denoted as a target line. The target line is a line including an image of a point at the height equal to the height of the reference face of the flying object 200 in the image captured by the height target measurement unit 234 mounted on the flying object 200 in a case where the flying object 200 is in the reference attitude.

<Flying Object Measurement Unit 235>

The flying object measurement unit 235 measures the another flying object 200 under the control of the measurement control unit 220. The flying object measurement unit 235 transmits the measurement data of the another flying object 200, the measurement data being obtained by the measurement, to the measurement control unit 220.

The flying object measurement unit 235 may be, for example, an imaging device. In this case, the measurement data is an image obtained by imaging the another flying object 200. The flying object measurement unit 235 may be attached to the flying object 200 in such a way that a predetermined line of the image obtained by performing imaging indicates the height of the reference face of the flying object 200 to which the flying object measurement unit 235 is attached. For example, the flying object measurement unit 235 may be attached in such a way that the optical axis of the flying object measurement unit 235, which is an imaging device, passes through the reference face of the flying object 200.

On the exterior of the flying object 200, a figure such as a line or an arrow, for example, indicating the reference face of the flying object 200 may be drawn. For example, an intersection line between the reference face of the flying object 200 and the exterior of the flying object 200 may be drawn as a figure indicating the reference face of the flying object 200. As described above, the flying object measurement unit 235 is attached to the flying object 200 in such a way that a predetermined line of an image obtained by imaging by the flying object measurement unit 235 indicates the height of the reference face of the flying object 200 to which the flying object measurement unit 235 is attached. In this case, in a case where the reference face of the flying object 200 and the reference face of the another flying object 200 are parallel, and the height of the reference face of the flying object 200 is equal to the height of the reference face of the another flying object 200, a figure indicating the reference face of the another flying object 200 indicates the above-described predetermined line in the image obtained by imaging the another flying object 200.

The height target measurement unit 234 may operate as the flying object measurement unit 235.

<Distance Measurement Unit 236>

The distance measurement unit 236 measures a distance to a measurement target (specifically, for example, the another flying object 200). The distance measurement unit 236 is the same as the distance measurement device of the first example embodiment.

The distance measurement unit 236 may be configured to measure a distance downward in the reference direction. In this case, the distance measurement unit 236 may include a second distance measurement device that measures a distance in a direction parallel to the direction of the reference line and facing downward of the flying object in addition to the first distance measurement device that measures the distance to the another flying object 200. In this case, the first distance measurement device is the same as the distance measurement device of the first example embodiment. The second distance measurement device is parallel to the direction of the reference line of the flying object 200 and is attached in a direction facing downward of the flying object. The first distance measurement device and the second distance measurement device may be two distance imaging devices of the same type having different attachment directions.

<Control Device 100>

Figure 5:
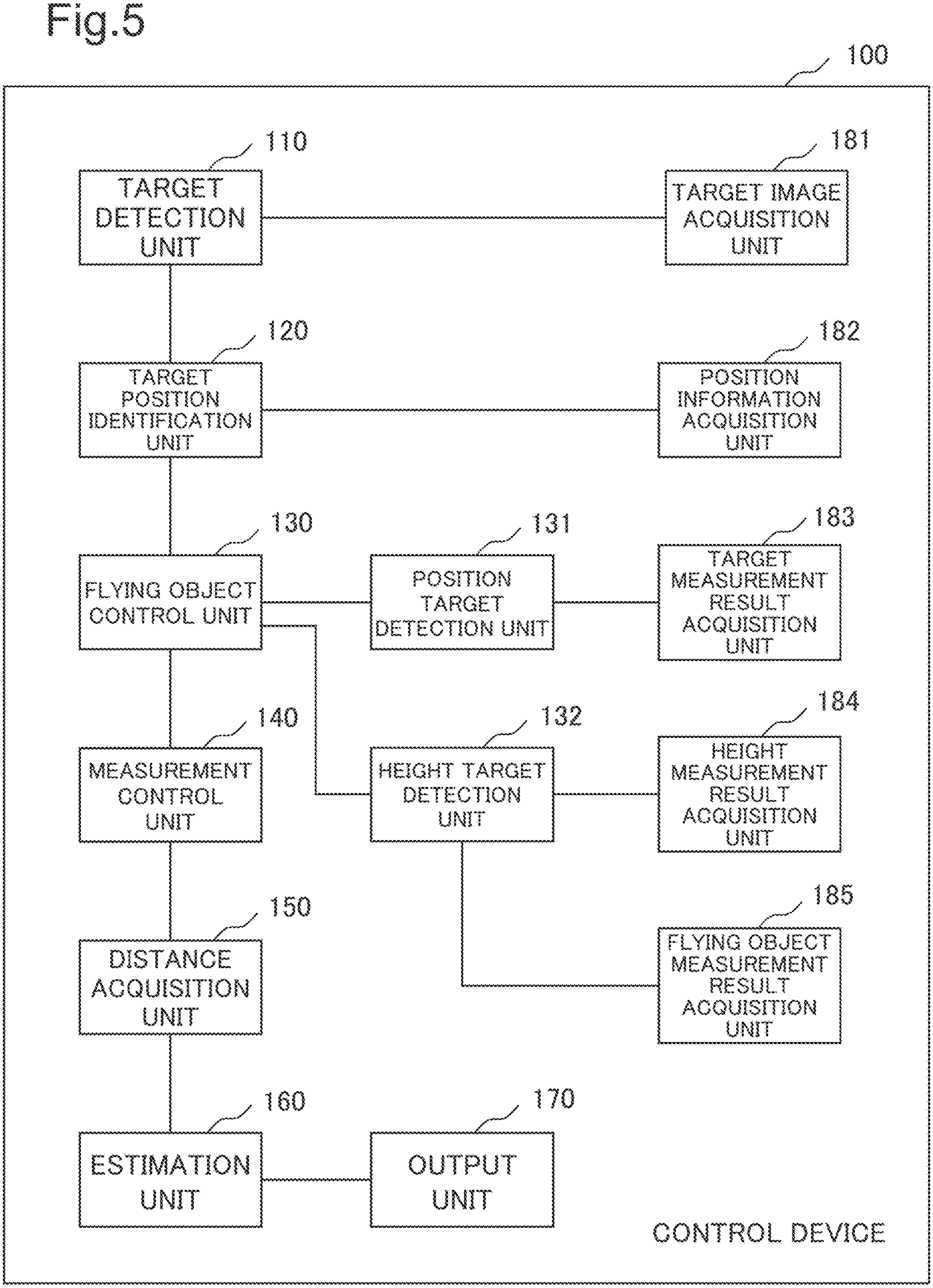
FIG. 5 is a block diagram illustrating an example of a configuration of a control device according to the second example embodiment of the present disclosure.

FIG. 5 is a diagram illustrating an example of a configuration of the control device 100 according to the second example embodiment of the present disclosure. In the example illustrated in FIG. 4, the control device 100 includes a target detection unit 110, a target position identification unit 120, the flying object control unit 130, a position target detection unit 131, a height target detection unit 132, the measurement control unit 140, the distance acquisition unit 150, an estimation unit 160, and an output unit 170. The control device 100 further includes a target image acquisition unit 181, a position information acquisition unit 182, a target measurement result acquisition unit 183, a height measurement result acquisition unit 184, and a flying object measurement result acquisition unit 185. The flying object control unit 130, the measurement control unit 140, and the distance acquisition unit 150 of the present example embodiment are the same as the flying object control unit 130, the measurement control unit 140, and the distance acquisition unit 150 of the first example embodiment, respectively, except for differences described below. The flying object control unit 130, the measurement control unit 140, and the distance acquisition unit 150 of the present example embodiment perform the operations same as the operations of the flying object control unit 130, the measurement control unit 140, and the distance acquisition unit 150 of the first example embodiment except for differences described below.

<Target Image Acquisition Unit 181>

The target image acquisition unit 181 transmits an instruction to capture an image of a target region to the flying object 200. The target image acquisition unit 181 acquires an image of a target region (that is, the target image) from the flying object 200. The target image acquisition unit 181 transmits the acquired target image to the target detection unit 110.

The imaging method in this case may be determined in advance. The information about the range of the target region may be given in advance. The height (hereinafter, denoted as an imaging height) of the flying object 200, in which the resolution of the image captured by the target image capturing unit 231 mounted on the flying object 200 is a resolution at which the pattern of the target device 400 can be recognized, may be calculated in advance. The camera parameter such as the angle of view and the resolution of the target image capturing unit 231 are given to the control device 100 in advance.

First, the target image acquisition unit 181 calculates one or more imaging positions using the information about the range of the target region, the imaging height, and the angle of view of the target image capturing unit 231. The target image acquisition unit 181 calculates one or more imaging positions in such a way that, in a case where an image is captured by the target image capturing unit 231 at the height of the imaging height at each of the calculated one or more imaging positions, the entire target region is imaged at least once. The target image acquisition unit 181 may calculate a movement path for moving along the shortest path to all of the calculated one or more imaging positions.

The target image acquisition unit 181 transmits, for example, an instruction to change the height of the flying object 200 to the imaging height to the flying object. Furthermore, the target image acquisition unit 181 transmits, for example, an instruction to move to a position where the target image is captured to the flying object 200 in the order of the calculated movement route. After transmitting such a movement instruction, the target image acquisition unit 181 transmits an instruction to image the target region to the flying object 200. The target image acquisition unit 181 repeats transmission of an instruction to move to the next imaging position on the calculated path of movement and an instruction to capture the target image until the capturing of the target image is completed at all of the calculated one or more imaging positions.

<Position Information Acquisition Unit 182>

The position information acquisition unit 182 acquires, from the flying object 200 (for example, the first flying object 200A), information (that is, information about the position of the flying object 200 at the imaging location) about the position of the flying object 200 at the time when the target image is captured. In a case where the target image is captured at a plurality of imaging locations, the position information acquisition unit 182 acquires information about the position of the flying object 200 at the plurality of imaging locations. As described above, the identification information about the target image captured at the imaging location is associated with the information about the position of the flying object 200 at the imaging location. The position information acquisition unit 182 transmits the acquired information about the position of the flying object 200 at the imaging location to the target position identification unit 120.

<Target Detection Unit 110>

The target detection unit 110 receives the target image from the target image acquisition unit 181. The target detection unit 110 detects the target device 400 (specifically, the first target device 400A and the second target device 400B) from the received target image. The target detection unit 110 identifies the position of the detected target device 400 in the target image. Information (specifically, the identification information about the target device 400 and the information about the pattern of the target device 400) about the target device 400 is given to the target detection unit 110 in advance. Specifically, the information about the first target device 400A and the information about the second target device 400B are given to the target detection unit 110. The target detection unit 110 detects the first target device 400A and the second target device 400B from the received target image. In a case where the first target device 400A is detected from the received target image, the target detection unit 110 identifies a position where the first target device 400A is detected in the target image. The position where the first target device 400A is detected is, for example, coordinates (for example, a number or the like representing a position of a pixel and the like) of the position of the reference point of the first target device 400A, the coordinates being represented by the coordinate system set in the target image. Similarly, in a case where the second target device 400B is detected from the received target image, the target detection unit 110 identifies the position where the second target device 400B is detected in the target image.

The target detection unit 110 transmits information about the position of the detected target device 400 in the target image to the target position identification unit 120. Specifically, the target detection unit 110 transmits the identification information about the first target device 400A, the identification information about the target image in which the first target device 400A is detected, and the information about the position in which the first target device 400A is detected from the target image to the target position identification unit 120. In other words, the information about the position of the detected first target device 400A in the target image indicates the identification information about the first target device 400A, the identification information about the target image in which the first target device 400A is detected, and the information about the position in which the first target device 400A is detected from the target image. In a case where the first target device 400A is detected from a plurality of target images, the target detection unit 110 transmits information about the position of the detected first target device 400A in the target image to the target position identification unit 120 for each of the plurality of target images in which the first target device 400A is detected.

Further, the target detection unit 110 transmits the identification information about the second target device 400B, the identification information about the target image in which the second target device 400B is detected, and the information about the position in which the second target device 400B is detected from the target image to the target position identification unit 120. In a case where the second target device 400B is detected from a plurality of target images, the target detection unit 110 transmits information about the position of the detected second target device 400B in the target image to the target position identification unit 120 for each of the plurality of target images in which the second target device 400B is detected. The information about the position of the detected second target device 400B in the target image indicates the identification information about the second target device 400B, the identification information about the target image in which the second target device 400B is detected, and the information about the position in which the second target device 400B is detected from the target image.

The target detection unit 110 further detects the height target device 500 from the received target image. The target detection unit 110 identifies the position of the detected height target device 500 in the target image. Information (specifically, the identification information about the height target device 500 and the information about the pattern of the height target device 500) about the height target device 500 is given to the target detection unit 110 in advance.

The target detection unit 110 transmits information about the position of the detected height target device 500 in the target image to the target position identification unit 120. Specifically, the target detection unit 110 transmits the identification information about the height target device 500, the identification information about the target image in which the height target device 500 is detected, and the information about the position in which the height target device 500 is detected from the target image to the target position identification unit 120. The information about the position of the detected height target device 500 in the target image indicates the identification information about the height target device 500, the identification information about the target image in which the height target device 500 is detected, and the information about the position in which the height target device 500 is detected from the target image in the target detection unit 110. In a case where the height target device 500 is detected from the plurality of target images, the target detection unit 110 transmits information about the position of the detected height target device 500 in the target image to the target position identification unit 120 for each of the plurality of target images in which the height target device 500 is detected.

<Target Position Identification Unit 120>

The target position identification unit 120 receives information about the position of the detected first target device 400A and information about the position of the detected second target device 400B in the target image from the target detection unit 110. The target position identification unit 120 receives information about the position of the flying object 200 at the imaging location from the position information acquisition unit 182. As described above, the identification information about the target image captured at the imaging location is associated with the information about the position of the flying object 200 at the imaging location. The information about the position of the flying object 200 at the imaging location includes information about latitude and longitude and information about an azimuth in a direction in which the flying object 200 is facing.

The target position identification unit 120 receives information about the position of the detected height target device 500 in the target image from the target detection unit 110.

The target position identification unit 120 identifies the position of the first target device 400A from the camera parameter such as the angle of view and resolution of the target image capturing unit 231, the information about the position of the detected first target device 400A in the target image, and the information about the position of the flying object 200 at the imaging location. The position of the first target device 400A, the position being identified by the target position identification unit 120, is, for example, an estimation value of the latitude and longitude of the reference point of the first target device 400A placed in the target region. The position of the first target device 400A, the position being identified by the target position identification unit 120, may be, for example, an estimation value of coordinates of a reference point of the first target device 400A in a coordinate system defined in a target region.

The target position identification unit 120 identifies the position of the second target device 400B from the camera parameter such as the angle of view and resolution of the target image capturing unit 231, the information about the position of the detected second target device 400B in the target image, and the information about the position of the flying object 200 at the imaging location. The position of the second target device 400B, the position being identified by the target position identification unit 120, is, for example, an estimation value of the latitude and longitude of the reference point of the second target device 400B placed in the target region. The position of the second target device 400B, the position being identified by the target position identification unit 120, may be, for example, an estimation value of coordinates of a reference point of the second target device 400B in a coordinate system defined in a target region.

The target position identification unit 120 identifies the position of the height target device 500 from the camera parameter such as the angle of view and resolution of the target image capturing unit 231, the information about the position of the detected height target device 500 in the target image, and the information about the position of the flying object 200 at the imaging location. The position of the height target device 500, the position being identified by the target position identification unit 120, is, for example, an estimation value of the latitude and longitude of the reference point of the height target device 500 placed in the target region. The position of the height target device 500 identified by the target position identification unit 120 may be, for example, an estimation value of coordinates of a reference point of the height target device 500 in a coordinate system defined in a target region.

The target position identification unit 120 transmits the information about the position of the first target device 400A, the information about the position of the second target device 400B, and the information about the position of the height target device 500 to the flying object control unit 130.

<Target Measurement Result Acquisition Unit 183>

The target measurement result acquisition unit 183 acquires, from the first flying object 200A, measurement data obtained by measuring the first target device 400A by the target measurement unit 233 of the first flying object 200A. In a case where the target measurement unit 233 of the first flying object 200A is the imaging device, the measurement data obtained by measuring the first target device 400A by the target measurement unit 233 is, for example, an image captured by the target measurement unit 233 of the first flying object 200A. The image captured by the target measurement unit 233 of the first flying object 200A while the first flying object 200A stays above the first target device 400A includes an image of the first target device 400A.

The target measurement result acquisition unit 183 transmits measurement data (for example, an image) obtained by measuring the first target device 400A by the target measurement unit 233 of the first flying object 200A to the position target detection unit 131. Hereinafter, the image obtained by the target measurement unit 233 is denoted as a position target image. The image obtained by measuring the first target device 400A by the target measurement unit 233 of the first flying object 200A is denoted as a position target image of the first target device 400A. In the following description, it is assumed that measurement data obtained by measuring the first target device 400A by the target measurement unit 233 of the first flying object 200A is a position target image of the first target device 400A.

The target measurement result acquisition unit 183 acquires, from the second flying object 200B, measurement data obtained by measuring the second target device 400B by the target measurement unit 233 of the second flying object 200B. In a case where the target measurement unit 233 of the second flying object 200B is the imaging device, the measurement data obtained by measuring the eye second target device 400B by the target measurement unit 233 of the eye second flying object 200B is, for example, an image captured by the target measurement unit 233. The image captured by the target measurement unit 233 of the second flying object 200B while the second flying object 200B stays above the second target device 400B includes the image of the second target device 400B.

The target measurement result acquisition unit 183 transmits measurement data (for example, an image) obtained by measuring the second target device 400B by the target measurement unit 233 of the second flying object 200B to the position target detection unit 131. The image obtained by measuring the second target device 400B by the target measurement unit 233 of the second flying object 200B is denoted as a position target image of the second target device 400B. In the following description, it is assumed that measurement data obtained by measuring the second target device 400B by the target measurement unit 233 of the second flying object 200B is a position target image of the second target device 400B.

<Position Target Detection Unit 131>

The position target detection unit 131 receives the measurement data (for example, the position target image of the first target device 400A) of the first target device 400A from the target measurement result acquisition unit 183. The position target detection unit 131 receives measurement data (for example, the position target image of the second target device 400B) of the second target device 400B from the target measurement result acquisition unit 183.

The position target detection unit 131 detects the first target device 400A from the measurement data (for example, the position target image of the first target device 400A) of the first target device 400A. The information about the first target device 400A is given to the position target detection unit 131 in advance. As described above, the information about the first target device 400A includes a pattern capable of identifying the reference point of the first target device 400A. The position target detection unit 131 identifies the position of the reference point of the first target device 400A in the position target image of the first target device 400A using the information (for example, information about the pattern of the first target device 400A) about the first target device 400A. The position of the reference point of the first target device 400A is, for example, coordinates of an image of the reference point in a coordinate system set in a position target image of the first target device 400A. The coordinates of the image of the reference point may be information indicating the position of the pixel where the image of the reference point is located in the position target image of the first target device 400A.

The position target detection unit 131 transmits information about the position of the reference point of the detected first target device 400A to the flying object control unit 130.

The position target detection unit 131 detects the first target device 400A from the measurement data (for example, the position target image of the second target device 400B) of the second target device 400B. The information about the second target device 400B is given to the position target detection unit 131 in advance. As described above, the information about the second target device 400B includes a pattern capable of identifying the reference point of the second target device 400B. The position target detection unit 131 identifies the position of the reference point of the second target device 400B in the position target image of the second target device 400B using the information (for example, information about the pattern of the second target device 400B) about the second target device 400B. The position of the reference point of the second target device 400B is, for example, coordinates of an image of the reference point in a coordinate system set in a position target image of the second target device 400B. The coordinates of the image of the reference point may be information indicating the position of the pixel where the image of the reference point is located in the position target image of the second target device 400B.

The position target detection unit 131 transmits information about the position of the reference point of the detected second target device 400B to the flying object control unit 130.

<Height Measurement Result Acquisition Unit 184>

The target measurement result acquisition unit 183 acquires, from the first flying object 200A, measurement data obtained by measuring the height target device 500 by the height target measurement unit 234 of the first flying object 200A. In a case where the height target measurement unit 234 of the first flying object 200A is an imaging device, the obtained measurement data is an image. In the following description, it is assumed that measurement data obtained by measuring the height target device 500 by the height target measurement unit 234 of the first flying object 200A is an image. In the following description, an image obtained by measurement (that is, imaging) of the height target device 500 by the height target measurement unit 234 of the first flying object 200A is denoted as a height target image of the first flying object 200A. In a case where the first flying object 200A is facing the direction in which the height target measurement unit 234 of the first flying object 200A can image the height target device 500, the height target image of the first flying object 200A includes an image of the height target device 500.

The target measurement result acquisition unit 183 transmits the height target image of the first flying object 200A to the height target detection unit 132.

The target measurement result acquisition unit 183 acquires, from the second flying object 200B, measurement data obtained by measuring the height target device 500 by the height target measurement unit 234 of the second flying object 200B. In a case where the height target measurement unit 234 of the second flying object 200B is an imaging device, the obtained measurement data is an image. In the following description, it is assumed that measurement data obtained by measuring the height target device 500 by the height target measurement unit 234 of the second flying object 200B is an image. In the following description, an image obtained by measurement (that is, imaging) of the height target device 500 by the height target measurement unit 234 of the second flying object 200B is denoted as a height target image of the second flying object 200B. In a case where the second flying object 200B is facing the direction in which the height target measurement unit 234 of the second flying object 200B can image the height target device 500, the height target image of the second flying object 200B includes an image of the height target device 500.

The target measurement result acquisition unit 183 transmits the height target image of the second flying object 200B to the height target detection unit 132.

<Flying Object Measurement Result Acquisition Unit 185>

The flying object measurement result acquisition unit 185 receives, from the flying object 200 (for example, the first flying object 200A), measurement data obtained by measuring another flying object (for example, the second flying object 200B) by the flying object measurement unit 235 of the flying object 200 (for example, the first flying object 200A). In the following description, it is assumed that the flying object measurement unit 235 is an imaging device, and the flying object measurement result acquisition unit 185 receives measurement data obtained by measuring the second flying object 200B from the first flying object 200A. In this case, the obtained measurement data is an image. An image obtained by the flying object measurement unit 235 of the flying object 200 capturing an image of the another flying object 200 is denoted as a flying object image. The flying object image obtained by the flying object measurement unit 235 of the first flying object 200A imaging the second flying object 200B is denoted as a flying object image of the second flying object 200B. In a case where the flying object measurement unit 235 measures an image while the first flying object 200A is facing the direction in which the flying object measurement unit 235 of the first flying object 200A can image the second flying object 200B, the captured flying object image of the second flying object includes the image of the second flying object 200B.

The flying object measurement result acquisition unit 185 transmits the flying object image, of the second flying object 200B, acquired from the first flying object 200A to the height target detection unit 132.

<Height Target Detection Unit 132>

The height target detection unit 132 receives the height target image of the first flying object 200A from the target measurement result acquisition unit 183. The height target detection unit 132 receives the height target image of the second flying object 200B from the target measurement result acquisition unit 183. The height target detection unit 132 receives the flying object image of the second flying object B from the flying object measurement result acquisition unit 185.

The height target detection unit 132 detects the height target device 500 from the height target image of the first flying object 200A. The information about the height target device 500 is given to the height target detection unit 132 in advance. As described above, the information about the height target device 500 includes a pattern capable of identifying the reference point of the height target device 500. The height target detection unit 132 identifies the position of the reference point of the height target device 500 in the position target image of the height target device 500 using the information (for example, the information about the pattern of the height target device 500) about the height target device 500. The position of the reference point of the height target device 500 is, for example, coordinates of an image of the reference point in a coordinate system set in a position target image of the height target device 500. The coordinates of the image of the reference point may be information indicating the position of the pixel where the image of the reference point is located in the position target image of the height target device 500.

The height target detection unit 132 transmits information about the position of the reference point of the height target device 500 detected from the height target image of the first flying object 200A to the flying object control unit 130.

The height target detection unit 132 detects the height target device 500 from the height target image of the second flying object 200B. The height target detection unit 132 identifies the position of the reference point of the height target device 500 in the position target image of the height target device 500 using the information (for example, the information about the pattern of the height target device 500) about the height target device 500. The position of the reference point of the height target device 500 is, for example, coordinates of an image of the reference point in a coordinate system set in a position target image of the height target device 500. The coordinates of the image of the reference point may be information indicating the position of the pixel where the image of the reference point is located in the position target image of the height target device 500.

The height target detection unit 132 transmits information about the position of the reference point of the height target device 500 detected from the height target image of the second flying object 200B to the flying object control unit 130.

The height target detection unit 132 receives the flying object image, of the second flying object 200B, acquired from the first flying object 200A from the flying object measurement result acquisition unit 185. The height target detection unit 132 detects a figure indicating the reference face of the second flying object 200B from the flying object image of the second flying object 200B. At this time, the height target detection unit 132 may extract a region of the second flying object 200B from the flying object image of the second flying object 200B, and detect a figure indicating the reference face in the extracted region of the second flying object 200B.

The height target detection unit 132 transmits the information about the position of the figure indicating the reference face of the second flying object 200B to the flying object control unit 130. The information about the position of the figure indicating the reference face of the second flying object 200B may be, for example, information indicating a distribution of coordinates indicating a height in the image among coordinates of pixels included in the detected image of the figure indicating the reference face. The information indicating the distribution of the coordinates may be a combination of the maximum value of the coordinates and the minimum value of the coordinates. The information indicating the distribution of the coordinates may be statistical values (for example, a median value, an intermediate value, an average value, or the like) of the coordinates.

<Flying Object Control Unit 130>

The flying object control unit 130 receives information about the position of the first target device 400A, information about the position of the second target device 400B, and information about the position of the height target device 500 from the target position identification unit 120.

The flying object control unit 130 transmits, to the first flying object 200A, an instruction to fly to a position (that is, the position of the first target device 400A) indicated by the received position information about the first target device 400A. At this time, the flying object control unit 130 may first transmit an instruction to ascend to a predetermined height to the first flying object 200A. Thereafter, the flying object control unit 130 transmits an instruction to fly to the position of the first target device 400A while maintaining the height to the first flying object 200A. The first flying object 200A that has received such an instruction reaches the air above the first target device 400A and then hovers in the air.

The flying object control unit 130 transmits an instruction to capture the position target image to the first flying object 200A. The flying object control unit 130 may request the first flying object 200A to transmit state information and receive the state information from the first flying object 200A. After transmitting the instruction to fly to the position of the first target device 400A, when the received state information indicates a state in which the first flying object 200A is hovering in the air, the flying object control unit 130 may transmit an instruction to capture the position target image to the first flying object 200A. The state information may include information about the position of the first flying object. In this case, in a case where the received state information indicates a state in which the first flying object 200A is hovering in the air within a predetermined distance from the position of the first target device 400A, the flying object control unit 130 may transmit an instruction to capture the position target image to the first flying object 200A. In these cases, for example, when receiving a request for transmission of state information, the transmission/reception unit 210 of the flying object 200 acquires the state information from, for example, at least one of the measurement control unit 220 and the motion control unit 240, and transmits the acquired state information to the control device 100.

When receiving the instruction to capture the position target image, the measurement control unit 220 of the flying object 200 may continuously measure (for example, capture) the target device 400 using the target measurement unit 233. The transmission/reception unit 210 may transmit the obtained measurement data to the control device 100 each time the measurement data (for example, the target image) is obtained. Every time the target measurement result acquisition unit 183 receives the measurement data (for example, the target image), the position target detection unit 131 may detect the position of the reference point of the target device 400 and transmit information about the position of the detected reference point to the flying object control unit 130.

The flying object control unit 130 receives, from the position target detection unit 131, information about the position of the reference point, of the first target device 400A, detected from the position target image of the first target device 400A. The flying object control unit 130 determines whether the first flying object 200A exists in the air above the first target device 400A using the received information about the position of the reference point of the first target device 400A.

Specifically, for example, the flying object control unit 130 determines whether the position of the received reference point of the first target device 400A matches the position of the target point described above. When it is determined that the position of the received reference point of the first target device 400A matches the position of the target point described above, the flying object control unit 130 determines that the first flying object 200A exists in the air above the first target device 400A. When it is determined that the position of the received reference point of the first target device 400A does not match the position of the target point described above, the flying object control unit 130 determines that the first flying object 200A does not exist in the air above the first target device 400A.

As described above, in a case where the position of the reference point of the first target device 400A in the position target image of the first target device 400A matches the position of the target point described above, the first flying object 200A hovers above the first target device 400A. For example, in a case where the distance between the received position of the reference point of the first target device 400A and the position of the above-described target point is less than a predetermined threshold value, the flying object control unit 130 may determine that the received position of the reference point of the first target device 400A matches the position of the above-described target point. For example, in a case where the distance between the received position of the reference point of the first target device 400A and the position of the above-described target point is equal to or more than the predetermined threshold value, the flying object control unit 130 may determine that the received position of the reference point of the first target device 400A does not match the position of the above-described target point.

In a case where it is determined that the position of the received reference point of the first target device 400A does not match the position of the above-described target point, the flying object control unit 130 identifies a positional relationship between the position of the received reference point of the first target device 400A and the position of the above-described target point. Specifically, when it is determined that the received position of the reference point of the first target device 400A does not match the position of the target point described above, the flying object control unit 130 calculates a direction in which the first flying object 200A moves in order to move the position of the reference point of the first target device 400A to match the position of the target point. The flying object control unit 130 transmits an instruction to move in the calculated direction to the first flying object 200A.

The flying object control unit 130 repeats determination of matching between the position of the reference point of the first target device 400A and the position of the target point and the instruction of the above-described movement to the first flying object 200A until it is determined that the position of the reference point of the first target device 400A matches the position of the target point. An operation of repeating determination of matching between the position of the reference point of the target device 400 (for example, the first target device 400A) and the position of the target point and the instruction of the above-described movement to the flying object 200 (for example, the first flying object 200A) until it is determined that the position of the reference point of the first target device 400A matches the position of the target point is hereinafter denoted as position adjustment.

The flying object control unit 130 may calculate the distance by which the first flying object 200A is moved from the camera parameter of the target measurement unit 233 that is an imaging device, the measurement value of the height of the first flying object 200A, and the distance between the position of the reference point of the first target device 400A and the position of the target point in the obtained image. Specifically, the flying object control unit 130 calculates the estimated distance in the three-dimensional space between the intersection between the reference line of the first flying object 200A and the face on which the first target device 400A is placed and the reference point of the first target device 400A. For example, in a case where it is assumed that the first target device 400A is placed on a horizontal plane and the height of the first flying object 200A from the horizontal plane is a measurement value of the height of the first flying object 200A, the flying object control unit 130 may calculate the distance between the above-described intersection and the reference point of the first target device 400A. The flying object control unit 130 acquires the measurement value of the height of the first flying object 200A from the first flying object 200A. The flying object control unit 130 may calculate a value obtained by multiplying the estimated distance by a coefficient equal to or less than one as the distance by which the first flying object 200A is moved. The flying object control unit 130 may transmit an instruction to perform movement by the calculated distance in the above-described calculated direction as the above-described movement instruction to the first flying object 200A.

The flying object control unit 130 may transmit an instruction to move in the above-described calculated direction as the above-described movement instruction to the first flying object 200A for a predetermined time. This predetermined time may be a time experimentally determined in advance in such a way that the movement of the flying object 200 is not unstable.

The flying object control unit 130 receives information about the position of the reference point of the height target device 500 detected from the target image from the target position identification unit 120. The timing at which the flying object control unit 130 receives the information about the position of the reference point of the height target device 500 detected from the target image from the target position identification unit 120 may be before the above-described position adjustment. The timing at which the flying object control unit 130 receives the information about the position of the reference point of the height target device 500 detected from the target image from the target position identification unit 120 may be after the above-described position adjustment.

After the position adjustment, the flying object control unit 130 calculates the positional relationship between the first flying object 200A and the height target device 500 using the information about the position of the first flying object 200A, the information about the azimuth in which the first flying object 200A is facing, and the information about the position of the reference point of the height target device 500. For example, the flying object control unit 130 calculates the relationship between the direction in which the first flying object 200A is facing and the direction from the first flying object 200A to the height target device 500 as the above-described positional relationship. Using the direction in which the first flying object 200A is facing and the measurement range of the height target measurement unit 234, the flying object control unit 130 calculates the direction of the rotation and the size of the first flying object 200A for directing the direction of the first flying object 200A to the direction in which the height target measurement unit 234 can measure the height target device 500. In a case where the height target measurement unit 234 is an imaging device, the measurement range of the height target measurement unit 234 is the angle of view of the height target measurement unit 234.

The flying object control unit 130 transmits an instruction to perform rotation in the calculated direction and size to the first flying object 200A. As a result, the direction of the first flying object 200A is a direction in which the height target measurement unit 234 mounted on the first flying object 200A can measure the height target device 500. The operation described above in which the direction of the flying object 200 is set as the direction in which the height target measurement unit 234 mounted on the flying object 200 can measure the height target device 500 is hereinafter denoted as direction adjustment.

Further, the flying object control unit 130 transmits an instruction to measure (for example, imaging of the height target device by the height target measurement unit 234) the height target device 500 to the first flying object 200A. As described above, the description will be given on the assumption that the height target measurement unit 234 is an imaging device. An image obtained by imaging the height target device by the height target measurement unit 234 is denoted as a height target image. When receiving the instruction to measure the height target device 500, the measurement control unit 220 measures the height target device 500 using the height target measurement unit 234. When receiving the instruction to measure the height target device 500, the measurement control unit 220 may continuously measure the height target device 500 using the height target measurement unit 234. Every time the height target image captured by the height target measurement unit 234 is obtained under the control of the motion control unit 240, the transmission/reception unit 210 of the first flying object 200A transmits the obtained height target image to the height measurement result acquisition unit 184. The height measurement result acquisition unit 184 acquires a height target image to transmit the acquired height target image to the height target detection unit 132. The height target detection unit 132 receives the height target image, detects the height target device 500 from the received height target image, and detects the position of the reference point of the height target device 500. The height target detection unit 132 transmits the position of the reference point of the height target device 500 to the flying object control unit 130.

The flying object control unit 130 receives information about the height of the reference point of the height target device 500 detected from the height target image of the first flying object 200A from the height target detection unit 132. Using the received information about the position of the reference point of the height target device 500, the flying object control unit 130 determines whether the height of the first flying object 200A (specifically, the height of the reference point of the first flying object 200A is) matches the height of the height target device 500 (the height of the reference point of the height target device 500).

Specifically, the flying object control unit 130 determines whether the image of the reference point of the height target device 500 is included in the above-described target line of the height target image of the first flying object 200A. The flying object control unit 130 calculates the distance between the target line of the height target image of the first flying object 200A and the image of the reference point of the height target device 500. For example, in a case where the calculated distance is less than the predetermined distance threshold value, the flying object control unit 130 determines that the image of the reference point of the height target device 500 is included in the target line of the height target image of the first flying object 200A. For example, in a case where the calculated distance is equal to or more than a predetermined distance threshold value, the flying object control unit 130 determines that the image of the reference point of the height target device 500 is not included in the target line of the height target image of the first flying object 200A. When determining that the image of the reference point of the height target device 500 is included in the target line of the height target image of the first flying object 200A, the flying object control unit 130 determines that the height of the first flying object 200A matches the height of the height target device 500. When determining that the image of the reference point of the height target device 500 is not included in the target line of the height target image of the first flying object 200A, the flying object control unit 130 determines that the height of the first flying object 200A does not match the height of the height target device 500.

When determining that the height of the first flying object 200A does not match the height of the height target device 500, the flying object control unit 130 identifies a relationship between the height of the first flying object 200A and the height of the height target device 500. The flying object control unit 130 transmits an instruction to change the height of the first flying object 200A to the first flying object 200A using the identified positional relationship in such a way that the height of the first flying object 200A matches the height of the height target device 500.

For example, in a case where the image of the reference point of the height target device 500 is at a position lower than the target line of the height target image of the first flying object 200A, the height of the first flying object 200A is higher than the height of the height target device 500. In a case where the height of the first flying object 200A is higher than the height of the height target device 500, the flying object control unit 130 transmits an instruction to lower the body to the first flying object 200A. In a case where the image of the reference point of the height target device 500 is at a position higher than the target line of the height target image of the first flying object 200A, the height of the first flying object 200A is lower than the height of the height target device 500. In a case where the height of the first flying object 200A is lower than the height of the height target device 500, the flying object control unit 130 transmits an instruction to raise the body to the first flying object 200A.

The flying object control unit 130 may calculate the difference between the height of the reference face of the first flying object 200A and the height of the height target device 500 in the three-dimensional space using the camera parameter such as the angle of view of the height target measurement unit 234 and the distance between the first flying object 200A and the height target device 500. In a case where the height of the first flying object 200A is lower than the height of the height target device 500, the flying object control unit 130 may set a value obtained by multiplying the calculated difference by a coefficient equal to or less than one for the distance of ascent in the above instruction to raise the body. In a case where the height of the first flying object 200A is higher than the height of the height target device 500, the flying object control unit 130 may set a value obtained by multiplying the calculated difference by a coefficient equal to or less than one for the distance of descent in the instruction to raise the descending body. When receiving the instruction to change the height including the distance, the motion control unit 240 of the flying object 200 changes the height of the body in such a way that the change in the measurement value by the distance measurement device attached downward of the body is the distance designated in the instruction.

The flying object control unit 130 may transmit an instruction to change the height of the body to the first flying object for a predetermined time. The predetermined time may be a value experimentally determined in advance in such a way that the height of the body is not unstable.

Until it is determined that the height of the first flying object 200A and the height of the height target device 500 match, the flying object control unit 130 repeats determination of matching between the height of the first flying object 200A and the height of the height target device 500 and the instruction to change the above-described height to the first flying object 200A. Hereinafter, the operation of repeating determination of matching between the height of the flying object 200 and the height of the height target device 500 and the instruction to change the height until it is determined that the height of the flying object 200 and the height of the height target device 500 match will be denoted as height adjustment.

The flying object control unit 130 may transmit an instruction to measure the height of the body of the flying object 200 to the flying object 200 at the end of the height adjustment. The measurement control unit 220 of the flying object 200 measures the height of the body of the flying object 200 using the above-described distance measuring device that measures the distance from the road surface according to the instruction. For example, in a case where the target region is flat, for example, when the administrator of the flying object 200 moves the flying object 200 without changing the height, the administrator may set a mode in which the flying object flies in such a way that the distance measured by the distance measuring device that measures the distance from the road surface is kept constant. When the administrator of the flying object 200 instructs the flying object 200 to operate in such a mode using an input device such as a keyboard or a mouse of the control device 100, for example, the flying object control unit 130 transmits an instruction to operate in such a mode to the flying object 200. The flying object 200 operates in the above-described mode according to the instruction. In this case, the flying object 200 is configured to operate in a mode of flying in such a way that the distance measured by the distance measuring device that measures the distance from the road surface maintains the set distance. As in a second modification of the present example embodiment described later, in a case where there is a plurality of combinations of the first target device 400A and the second target device 400B, the flying object 200 moves from the air above the target device 400 to the air above the another target device 400. During such movement, the motion control unit 240 may be configured to cause the flying object 200 to fly while maintaining a state in which the distance measured by the distance measuring device that measures the distance from the road surface under the control of the measurement control unit 220 is the height measured at the end of the height adjustment.

The height target device 500 may be placed at a place whose altitude is known. The altitude of the place whose altitude is known refers to the altitude of the ground surface on which the self-contained device to which the height target device 500 is attached is placed. Furthermore, the height from the ground surface at a place whose altitude is known to the height target device 500 may be known. In other words, the altitude of the height target device 500 may be known. The altitude of the place where the height target device 500 is placed and the height from the ground surface of the place to the height target device 500 may be given to the control device 100. The flying object control unit 130 may acquire information about the attitude of the flying object 200 from the measurement control unit 220 of the flying object 200. In this case, the measurement control unit 220 may be configured to acquire information about the attitude of the flying object 200 using a gyro or the like. The flying object control unit 130 may calculate the altitude of the flying object 200 using the altitude of the place where the height target device 500 is placed, the height from the ground surface to the height target device 500, the information about the attitude of the flying object 200, the structure of the flying object 200, the camera parameter of a height target measurement unit 250, and the like. At this time, the flying object control unit 130 extracts a point indicating a place where the self-contained device to which the height target device 500 is attached is placed and a reference point of the height target device 500 from the image obtained by imaging the height target device 500. For example, the flying object control unit 130 calculates a positional relationship between the height target measurement unit 250, and the height target measurement unit 250 and the self-contained device using coordinates of the extracted two points on the image, the height from the ground surface to the height target device 500, the camera parameter of the height target measurement unit 250, and the like. For example, the flying object control unit 130 calculates a positional relationship between the flying object 200, and the height target measurement unit 250 and the self-contained device from the calculated positional relationship, the information about the attitude of the flying object 200, and the structure of the flying object 200. The flying object control unit 130 calculates the altitude of the flying object 200 from the positional relationship between the flying object 200, and the height target measurement unit 250 and the self-contained device, and the altitude of the place where the height target device 500 is placed.

In a case where there is a plurality of combinations of the first target device 400A and the second target device 400B as in the second modification of the present example embodiment to be described later, the flying object control unit 130 may control the flying object in such a way that the flying object 200 flies while maintaining a constant altitude, for example, as shown below. When causing the flying object 200 to fly, the flying object control unit 130 transmits an instruction to change the direction of the flying object 200 to a direction in which the height target device 500 can be imaged to the flying object 200. The flying object control unit 130 may capture an image of the height target device 500 by the height target measurement unit 234 while the flying object 200 is flying, and may, for example, periodically transmit an instruction to transmit the obtained image and an instruction to transmit information about the attitude of the flying object 200. The flying object control unit 130 calculates the altitude of the flying object 200 as described above using the information about the attitude of the flying object 200 and the image of the height target device 500. In a case where the calculated altitude is higher than the altitude of the height target device 500, the flying object control unit 130 transmits an instruction to lower the altitude at which the flying object 200 flies to the flying object 200. In a case where the calculated altitude is lower than the altitude of the height target device 500, the flying object control unit 130 transmits an instruction to raise the altitude at which the flying object 200 flies to the flying object 200.

The flying object control unit 130 transmits, to the second flying object 200B, an instruction to fly to a position (that is, the position of the second target device 400B) indicated by the received position information about the second target device 400B. At this time, the flying object control unit 130 may first transmit an instruction to ascend to a predetermined height to the second flying object 200B. Thereafter, the flying object control unit 130 transmits an instruction to fly to the position of the second target device 400B while maintaining the height to the second flying object 200B. The second flying object 200B that has received such an instruction reaches the air above the second target device 400B and then hovers in the air.

The flying object control unit 130 performs the above-described position adjustment, direction adjustment, and height adjustment on the second flying object 200B. The position adjustment on the second flying object 200B is the same as the position adjustment on the first flying object 200A, except that the flying object 200 is the second flying object 200B instead of the first flying object 200A, and the target device 400 is the second target device 400B instead of the first target device 400A. The flying object control unit 130 performs, on the second flying object 200B, position adjustment according to the above-described description of position adjustment on the first flying object 200A in which the first flying object 200A is replaced with the second flying object 200B, and the first target device 400A is replaced with the second target device 400B.

The direction adjustment on the second flying object 200B is the same as the direction adjustment on the first flying object 200A, except that the flying object 200 is the second flying object 200B instead of the first flying object 200A. The flying object control unit 130 performs, on the second flying object 200B, direction adjustment according to the description of the direction adjustment for the first flying object 200A described above, in which the first flying object 200A is replaced by the second flying object 200B.

The height adjustment on the second flying object 200B is the same as the height adjustment on the first flying object 200A, except that the flying object 200 is the second flying object 200B instead of the first flying object 200A. The flying object control unit 130 performs, on the second flying object 200B, height adjustment according to the description of the height adjustment on the first flying object 200A, in which the first flying object 200A is replaced by the second flying object 200B.

The flying object control unit 130 performs the second direction adjustment and the second height adjustment on the first flying object 200A after the position adjustment, the direction adjustment, and the height adjustment on the first flying object 200A, and the position adjustment, the direction adjustment, and the height adjustment on the second flying object 200B.

The second direction adjustment on the flying object 200 (for example, the first flying object 200A) is, for example, as described below, to change the direction of the flying object 200 to a direction in which the flying object measurement unit 235 of the flying object 200 can measure the another flying object 200 (for example, the second flying object 200B).

Hereinafter, a case where the flying object measurement unit 235 is an imaging device will be described. In this case, the flying object control unit 130 calculates the direction and the size of the rotation when rotating the first flying object 200A in such a way that a point having a height equal to a height of the first flying object 200A vertically above the reference point of the second target device 400B is included in the angle of view of the flying object measurement unit 235. When calculating the direction and the size of the rotation, the flying object control unit 130 uses the position of the reference point, of the second target device 400B, identified by the target position identification unit 120 as the position of the reference point of the second target device 400B. The flying object control unit 130 may calculate the direction and the size of the rotation when rotating the first flying object 200A in such a way that the optical axis of the flying object measurement unit 235 intersects a straight line orthogonal to a horizontal plane passing through the reference point of the second target device 400B. The flying object control unit 130 transmits an instruction to perform rotation in the calculated direction and size to the first flying object 200A.

The second height adjustment on the flying object 200 (for example, the first flying object 200A) is to change the height of the flying object 200 to be equal to the heights of the another flying object 200 (for example, the second flying object 200B), for example, as described below.

The flying object control unit 130 receives, from the height target detection unit 132, information about the position of the figure indicating the reference face of the second flying object 200B. The flying object control unit 130 determines whether the target line described above passes through the position of the figure indicating the reference face of the second flying object 200B. When determining that the target line described above passes through the position of the figure indicating the reference face of the second flying object 200B, the flying object control unit 130 may determine that the height of the first flying object 200A is equal to the height of the second flying object 200B. When determining that the target line does not pass through the position of the figure indicating the reference face of the second flying object 200B, the flying object control unit 130 may determine that the height of the first flying object 200A is not equal to the height of the second flying object 200B.

Specifically, the flying object control unit 130 calculates the distance between the target line described above and the position of the figure indicating the reference face of the second flying object 200B. For example, in a case where the calculated distance is less than the predetermined distance threshold value, the flying object control unit 130 determines that the target line passes through the position of the figure indicating the reference face of the second flying object 200B. For example, in a case where the calculated distance is equal to or more than the predetermined distance threshold value, the flying object control unit 130 determines that the target line does not pass through the position of the figure indicating the reference face of the second flying object 200B.

When determining that the height of the first flying object 200A is not equal to the height of the second flying object 200B, the flying object control unit 130 changes the height of the first flying object 200A in such a way that the height of the first flying object 200A is equal to the height of the second flying object 200B, for example, as shown below.

The flying object control unit 130 calculates the difference between the height of the first flying object 200A and the height of the second flying object 200B in the three-dimensional space from the distance between the target line and the position of the figure indicating the reference face of the second flying object 200B. Specifically, the difference between the height of the first flying object 200A and the height of the second flying object 200B is a difference between the height of the reference face of the first flying object 200A and the height of the reference face of the second flying object 200B. The flying object control unit 130 calculates the difference between the height of the first flying object 200A and the height of the second flying object 200B using the camera parameter such as the angle of view and the resolution of the flying object measurement unit 235 of the first flying object 200A and the distance between the first target device 400A and the second target device 400B.

The flying object control unit 130 transmits, to the first flying object 200A, an instruction to change the height of a value obtained by multiplying the calculated difference by a constant equal to or less than one in the direction in which the difference between the height of the first flying object 200A and the height of the second flying object 200B is decreased.

Until it is determined that the height of the first flying object 200A is equal to the height of the second flying object 200B, the flying object control unit 130 repeats determination on a difference between the height of the first flying object 200A and the heights of the second flying object 200B and transmission of an instruction to change the height of the first flying object 200A.

In a case where the flying object 200 is configured in such a way that the optical axis of the flying object measurement unit 235 and the measurement direction of the distance measurement unit 236 are the same, the flying object control unit 130 may perform the fine direction adjustment described below after the second direction adjustment and the second position adjustment of the first flying object 200A. The fine direction adjustment is to change the direction of the first flying object 200A in such a way that the direction of distance measurement by the distance measurement unit 236 of the first flying object 200A matches the direction from the distance measurement unit 236 of the first flying object 200A toward the reference line of the second flying object 200B.

In a case where the flying object measurement unit 235 of the first flying object 200A continues the measurement of the second flying object 200B, the flying object measurement result acquisition unit 185 continues receiving the measurement data (that is, the image) of the second flying object 200B from the first flying object 200A. In a case where the flying object measurement unit 235 of the first flying object 200A does not continue the measurement of the second flying object 200B, the flying object control unit 130 transmits an instruction to measure the second flying object 200B to the first flying object 200A. In this case, the first flying object 200A transmits measurement data (that is, the image) of the second flying object 200B to the control device 100. The flying object measurement result acquisition unit 185 receives the measurement data (that is, the image) of the second flying object 200B from the first flying object 200A.

The flying object control unit 130 acquires an image (hereinafter, denoted as an image of the second flying object 200B) obtained by imaging the second flying object 200B from the flying object measurement result acquisition unit 185 via the height target detection unit 132, for example. The flying object control unit 130 detects the reference line of the second flying object 200B from the image of the second flying object 200B. The flying object control unit 130 may detect a member, indicating the above-described reference line, of the second flying object 200B from the image of the second flying object 200B, and detect a straight line indicated by the image of the member indicating the detected reference line as the reference line of the second flying object 200B.

The flying object control unit 130 determines whether the direction of distance measurement by the distance measurement unit 236 (hereinafter, denoted as a distance measurement direction) matches the direction from the flying object measurement unit 235 toward the reference line of the second flying object 200B (hereinafter, denoted as a flying object direction). Specifically, for example, the flying object control unit 130 determines whether a straight line indicating the reference line of the second flying object 200B passes through a point indicating the optical axis of the flying object measurement unit 235. When determining that the straight line indicating the reference line of the second flying object 200B passes through the point indicating the optical axis of the flying object measurement unit 235, the flying object control unit 130 determines that the distance measurement direction matches the flying object direction. When determining that the straight line indicating the reference line of the second flying object 200B does not pass through the point indicating the optical axis of the flying object measurement unit 235, the flying object control unit 130 determines that the distance measurement direction does not match the flying object direction.

When determining that the distance measurement direction does not match the flying object direction, the flying object control unit 130 calculates the direction and the size of the rotation of the first flying object 200A in such a way that the distance measurement direction matches the flying object direction, for example, as shown below. An angle formed by a direction indicated by an any point in an image and a direction of an optical axis can be calculated from the camera parameter such as an angle of view and resolution of the imaging device and a point representing the optical axis of the imaging device in the image captured by the imaging device. For example, in the image of the second flying object 200B, the flying object control unit 130 calculates an intersection between a straight line that passes through a point indicating the optical axis of the flying object measurement unit 235 and is parallel to a straight line indicating the reference face of the first flying object 200A and a straight line indicated by an image of a member indicating the reference line of the second flying object 200B. The flying object control unit 130 calculates an angle between the direction indicated by the optical axis of the flying object measurement unit 235 and the direction indicated by the calculated intersection. The flying object control unit 130 sets the direction in which the first flying object 200A is rotated as the direction of the rotation of the first flying object whose distance measurement direction matches the flying object direction in such a way that the direction indicated by the optical axis of the flying object measurement unit 235 matches the direction indicated by the calculated intersection. The flying object control unit 130 sets an angle obtained by multiplying the angle between the direction indicated by the optical axis of the flying object measurement unit 235 and the direction indicated by the calculated intersection point by a constant equal to or less than one as the magnitude of rotation of the first flying object whose distance measurement direction matches the flying object direction.

The flying object control unit 130 transmits an instruction to perform rotation in the calculated direction and size to the first flying object 200A.

The flying object control unit 130 may repeat determination of matching between the distance measurement direction and the flying object direction and transmission of an instruction to perform rotation in the calculated direction and size until it is determined that the distance measurement direction and the flying object direction match.

When the position adjustment, the direction adjustment, and the height adjustment of the first flying object and the position adjustment, the direction adjustment, and the height adjustment of the second flying object are completed, the flying object control unit 130 notifies the measurement control unit 140 of the end of the arrangement adjustment. In a case where the flying object control unit 130 is configured to perform the fine direction adjustment, when the position adjustment, the direction adjustment, and the height adjustment of the first flying object, the position adjustment, the direction adjustment, and the height adjustment of the second flying object, and the fine direction adjustment are completed, the flying object control unit 130 notifies the measurement control unit 140 of the end of the arrangement adjustment.

<Measurement Control Unit 140>

When notified of the end of the arrangement adjustment from the flying object control unit 130, the measurement control unit 140 transmits an instruction to measure the distance to the another flying object 200 (for example, the second flying object 200B) to the flying object 200 (for example, the first flying object 200A).

<Distance Acquisition Unit 150>

The distance acquisition unit 150 acquires a measured distance from the flying object 200 (for example, the first flying object 200A). The distance acquisition unit 150 transmits information indicating the measured distance to the estimation unit 160.

In a case where there is another information (for example, an image of the second flying object 200B captured while irradiating a distance measurement point with laser light at the time of measuring the distance) necessary for estimating the distance between the first flying object 200A and the second flying object 200B, the distance acquisition unit 150 acquires the another information from the first flying object 200A. In this example, for example, the measurement control unit 220 may be configured to control a laser light source attached to the distance measurement unit 236 in such a way that the laser light source irradiates the distance measurement point with laser light when the distance measurement unit 236 measures the distance. The measurement control unit 220 may be further configured to control the flying object measurement unit 235 in such a way that the flying object measurement unit 235 images the second flying object 200B while the laser light is radiated when the distance measurement unit 236 measures the distance. The measurement control unit 220 may be configured to transmit an image obtained by imaging the second flying object 200B in a state where the distance measurement point is irradiated with the laser light to the distance acquisition unit 150 of the control device 100 via the transmission/reception unit 210.

<Estimation Unit 160>

The estimation unit 160 receives information indicating the measured distance from the distance acquisition unit 150. The estimation unit 160 estimates the distance between the first flying object 200A and the second flying object 200B from the structure of the first flying object 200A and the structure of the second flying object 200B and the measured distance. As described above, the distance between the first flying object 200A and the second flying object 200B is the distance between the reference point of the first flying object 200A and the reference point of the second flying object 200B. The structure of the first flying object 200A and the structure of the second flying object 200B may include, for example, information about the shape of the exterior, information about the position of the reference point of the first flying object 200A, information about the position of the reference point of the second flying object 200B, and information about the position and direction in which the distance measurement unit 236 is attached. The estimation unit 160 may estimate the distance between the first flying object 200A and the second flying object 200B further using the image of the second flying object 200B whose distance measurement point is irradiated with the laser light, the camera parameter of the flying object measurement unit 235, and the attachment position and direction of the flying object measurement unit 235. The estimation unit 160 may estimate the arrangement of the first flying object 200A and the second flying object 200B from these pieces of information, and calculate the distance between the reference point of the first flying object 200A and the reference point of the second flying object 200B in the arrangement.

The estimation unit 160 sets the estimated distance between the first flying object 200A and the second flying object 200B as a distance between the first target device 400A and the second target device 400B. The estimation unit 160 of the present example embodiment estimates the distance between the first flying object 200A and the second flying object 200B from the measured distance by a method similar to the method of estimating the distance between the first flying object and the second flying object by the first flying object in the description of the first example embodiment described above. In order to estimate the distance between the first flying object 200A and the second flying object 200B, the estimation unit 160 may use another information necessary for estimating the distance between the first flying object 200A and the second flying object 200B described above.

The estimation unit 160 transmits the estimated distance between the first flying object 200A and the second flying object 200B to the output unit 170.

<Output Unit 170>

The output unit 170 receives, from the estimation unit 160, the distance between the first flying object 200A and the second flying object 200B staying by the estimation unit 160. The output unit 170 outputs the received information indicating the distance to the output destination device. The output destination device may be, for example, an information processing device such as a server communicably connected to the control device 100 directly or via the communication network 300. The output destination device may be a storage device such as a storage communicably connected to the control device 100.

<Operation>

Figure 6:
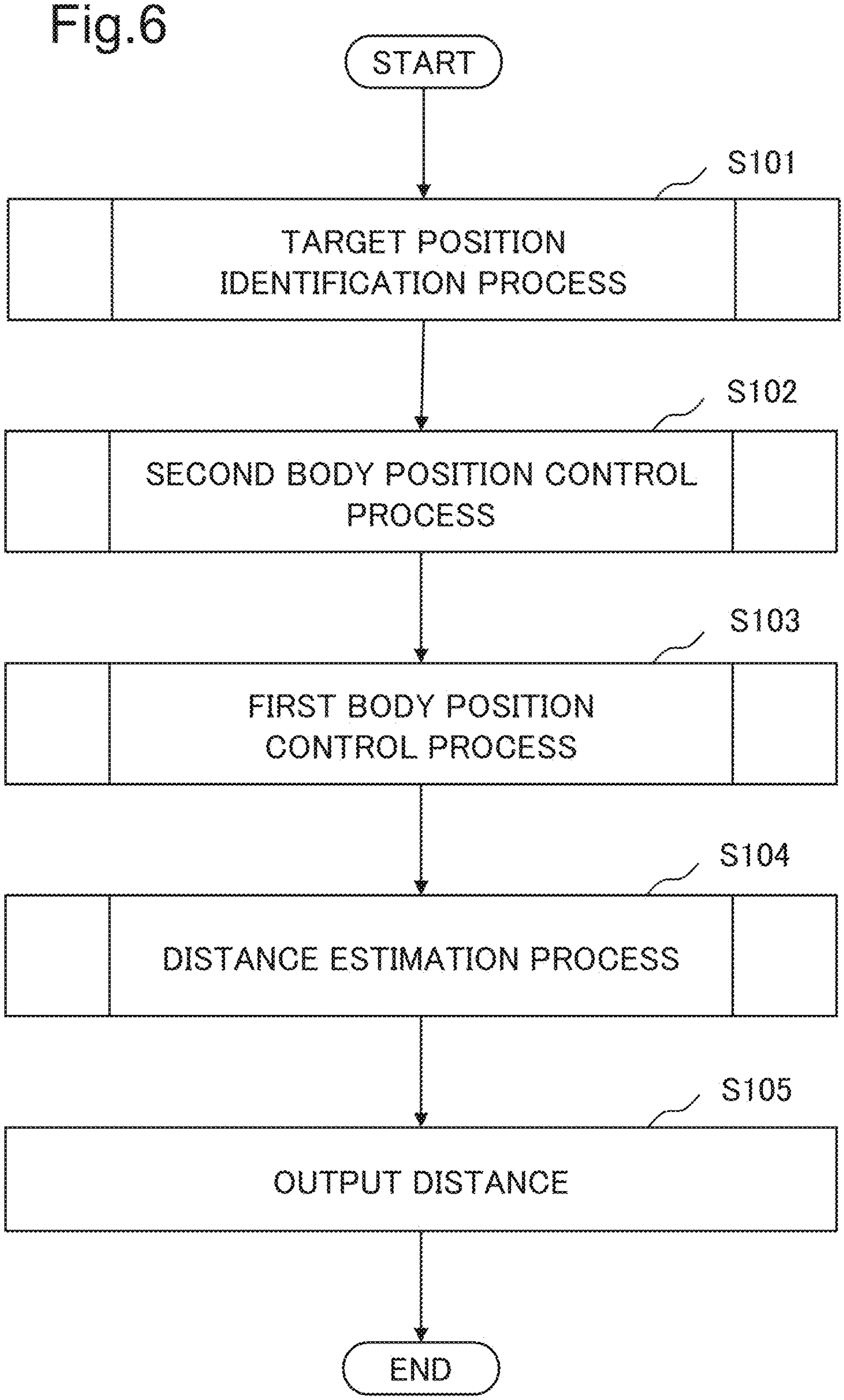
FIG. 6 is a flowchart illustrating an entire example of the operation of the control device according to the second example embodiment of the present disclosure.

FIG. 6 is a flowchart illustrating the entire example of the operation of the control device 100 according to the second example embodiment of the present disclosure. In the example illustrated in FIG. 6, the control device 100 executes a target position identification process (step S101). Next, the control device 100 executes a second body position control process (step S102). The control device 100 executes a first body position control process (step S103). The control device 100 executes a distance estimation process (step S104). The output unit 170 outputs the distance (step S105). The target position identification process, the second body position control process, the first body position control process, and the distance estimation process will be described in detail below.

Figure 7:
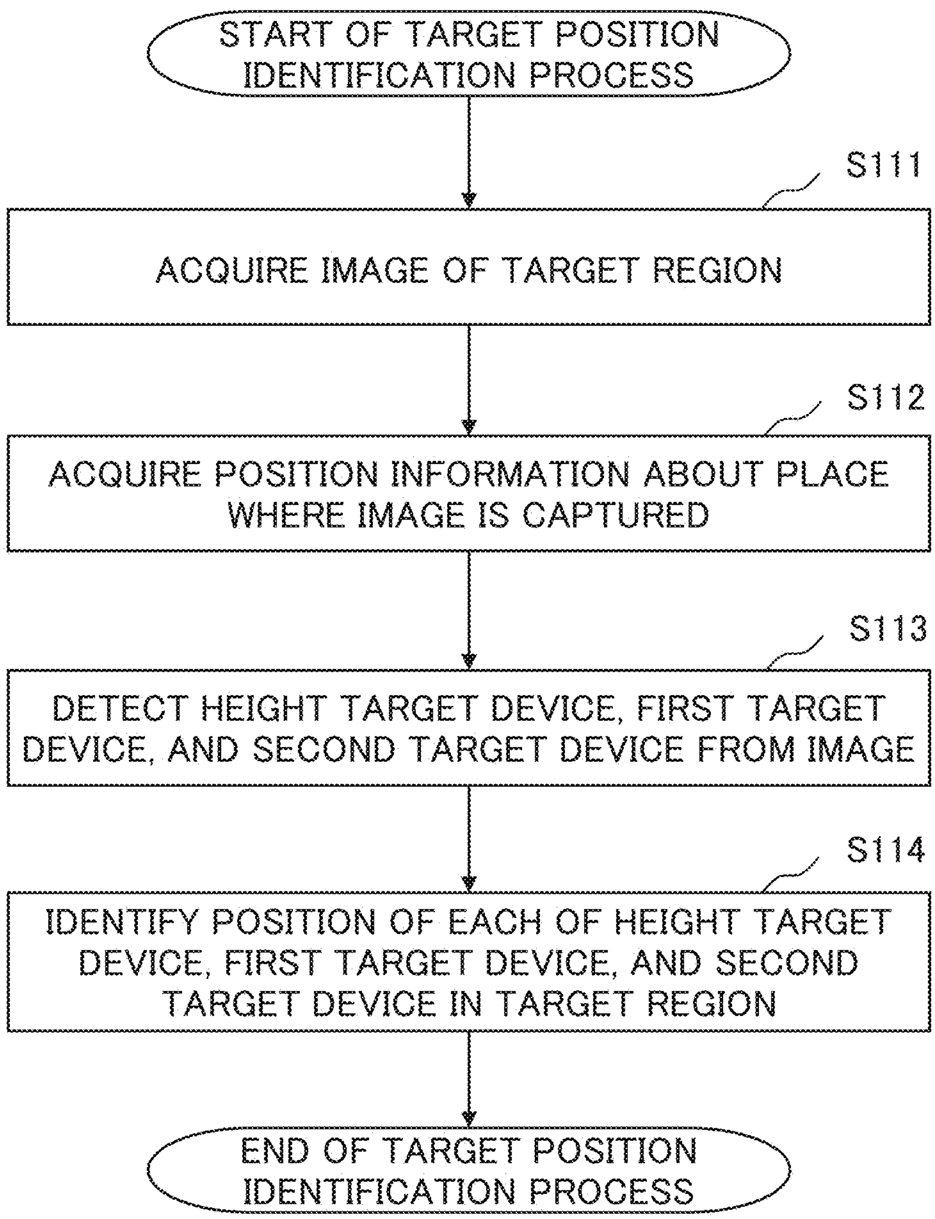
FIG. 7 is a flowchart illustrating an example of an operation of a target position identification process of the control device according to the second example embodiment of the present disclosure.

FIG. 7 is a flowchart illustrating an example of the operation of the target position identification process of the control device 100 according to the second example embodiment of the present disclosure. In the example illustrated in FIG. 7, first, the target image acquisition unit 181 instructs, for example, the first flying object 200A to capture an image of a target region, and acquires the image of the target region from the first flying object 200A (step S111). The image of the target region is the target image described above. The position information acquisition unit 182 acquires information about the position of the place where the image was captured (step S112). The target detection unit 110 detects the height target device 500, the first target device 400A, and the second target device 400B from the image (step S113). The target position identification unit 120 identifies the positions of the height target device 500, the first target device 400A, and the second target device 400B in the target region (step S114). The control device 100 ends the operation illustrated in FIG. 7.

Figure 8:
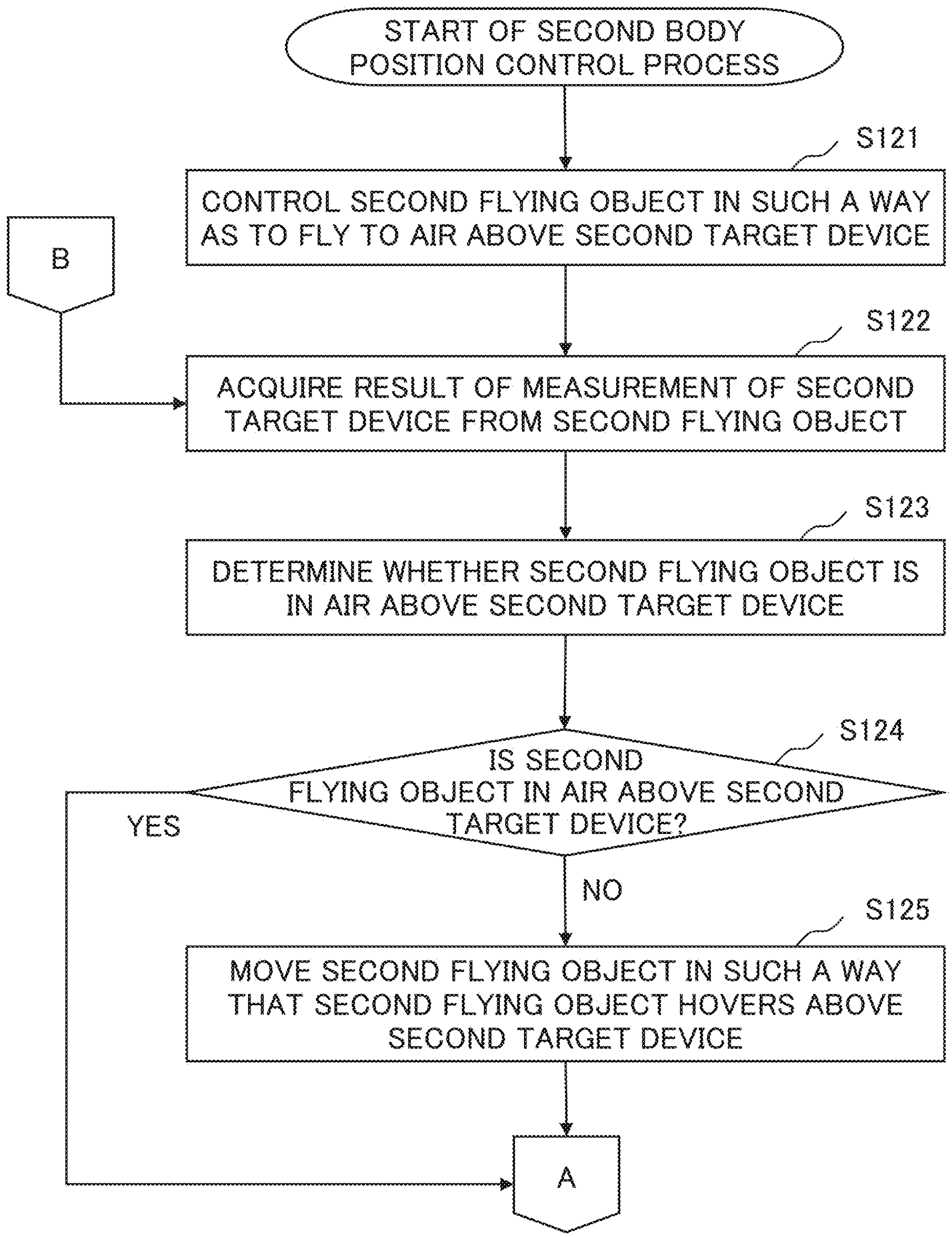
FIG. 8 is a flowchart illustrating an example of an operation of a second body position control process of the control device according to the second example embodiment of the present disclosure.
Figure 9:
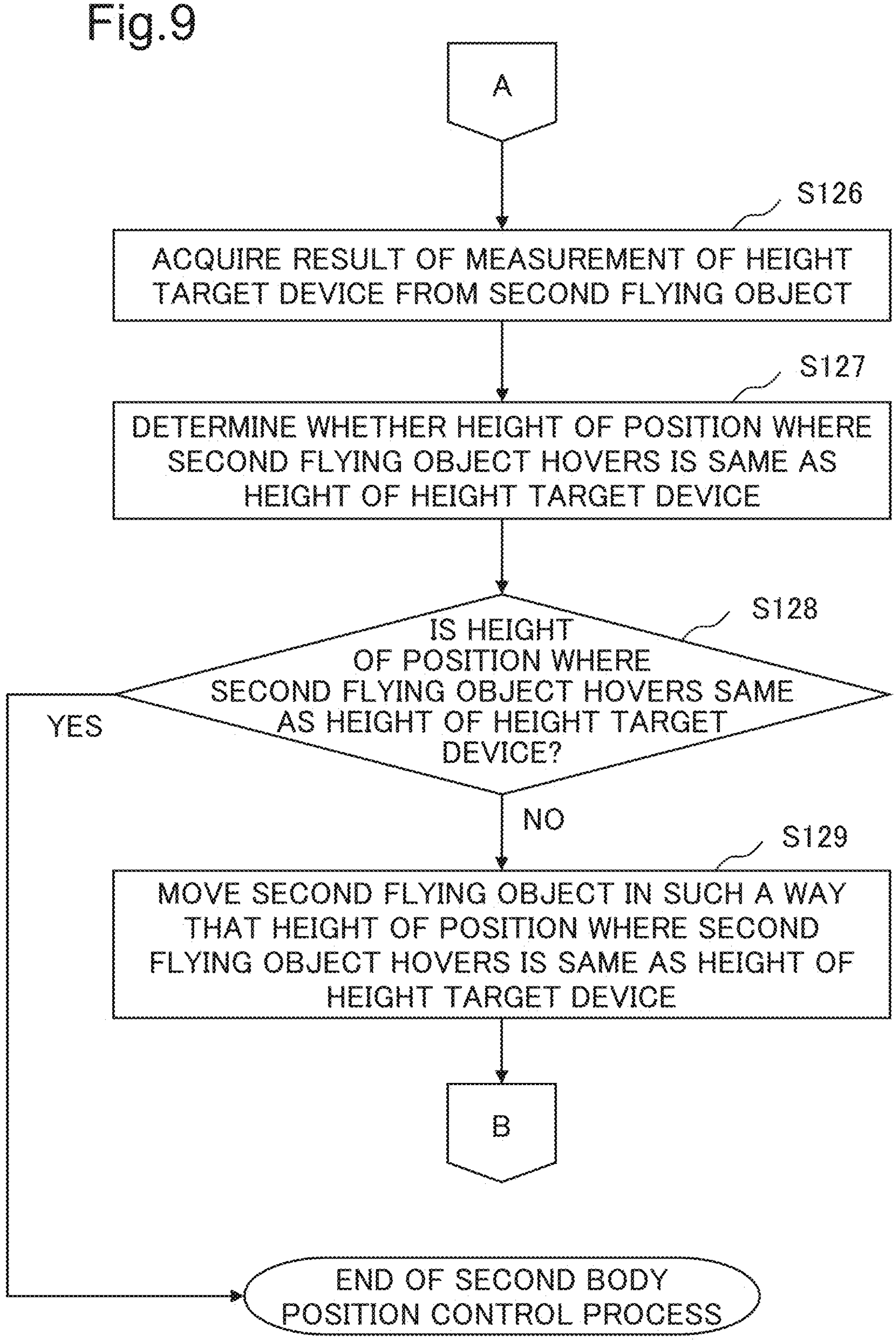
FIG. 9 is a flowchart illustrating an example of an operation of a second body position control process of the control device according to the second example embodiment of the present disclosure.

FIGS. 8 and 9 are flowcharts illustrating an example of the operation of the second body position control process of the control device 100 according to the second example embodiment of the present disclosure.

In the operation illustrated in FIG. 8, first, the flying object control unit 130 controls the second flying object 200B in such a way that the second flying object 200B flies to the air above the second target device 400B (step S121). For example, the flying object control unit 130 transmits an instruction to translate to the position of the second target device 400B to the second flying object 200B. Next, the flying object control unit 130 transmits an instruction to measure the second target device 400B to the second flying object 200B. The target measurement result acquisition unit 183 acquires the measurement result of the second target device 400B from the second flying object 200B (step S122). The measurement result is the measurement data described above, for example, an image of the second target device 400B captured by the target measurement unit 233. The flying object control unit 130 determines whether the second flying object 200B is in the air above the second target device 400B from the measurement result of the second target device 400B (step S123). In a case where the second flying object 200B is in the air above the second target device 400B (YES in step S125), the control device 100 then performs the operation of step S126 in FIG. 9. When the second flying object 200B is not in the air above the second target device 400B (NO in step S125), the flying object control unit 130 moves the second flying object 200B in such a way that the second flying object 200B hovers above the second target device (step S125). The control device 100 performs the operation of step S126 in FIG. 9.

In the operation illustrated in FIG. 9, the flying object control unit 130 transmits an instruction to measure the height target device 500 to the second flying object 200B, and the height measurement result acquisition unit 184 acquires the measurement result of the height target device 500 from the second flying object 200B (step S126). The measurement result of the height target device 500 is, for example, an image obtained by imaging the height target device 500. The flying object control unit 130 determines whether the height of the position where the second flying object 200B hovers is equal to the height of the height target device 500 using the measurement result of the height target device 500 (step S127). In a case where the height of the position where the second flying object 200B hovers is not equal to the height of the height target device 500 (NO in step S128), the flying object control unit 130 moves the second flying object 200B in such a way that the height of the position where the second flying object 200B hovers is equal to the height of the height target device 500 (step S129). In this case, the position of the second flying object 200B may be shifted from the air above the second target device 400B. After the operation in step S129, the control device 100 repeats the operations in and after step S122 in FIG. 8.

In a case where the height of the position where the second flying object 200B hovers is equal to the height of the height target device 500 (YES in step S128), the control device 100 ends the operation illustrated in FIGS. 8 and 9.

Figure 10:
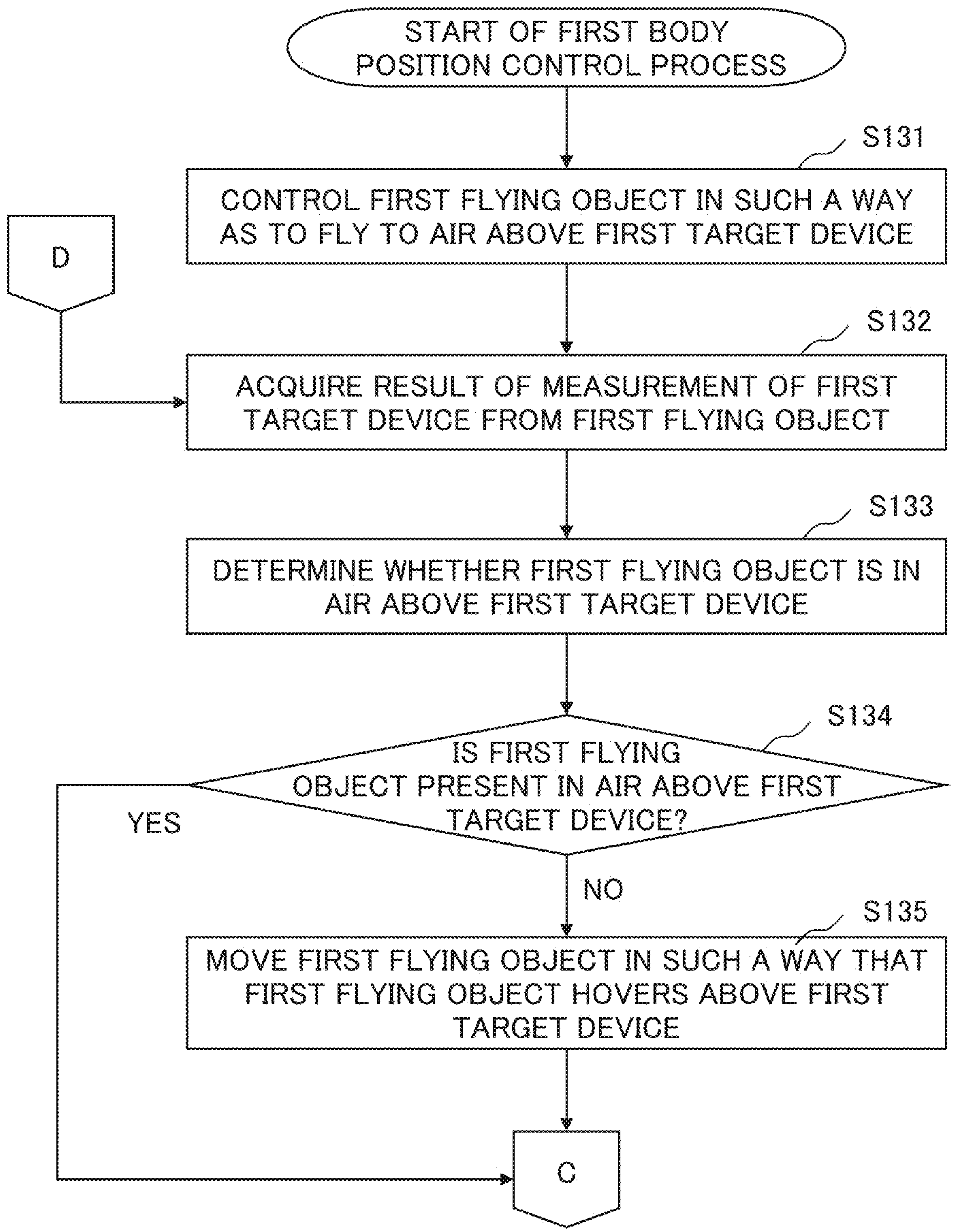
FIG. 10 is a flowchart illustrating an example of the operation of a first body position control process of the control device according to the second example embodiment of the present disclosure.
Figure 11:
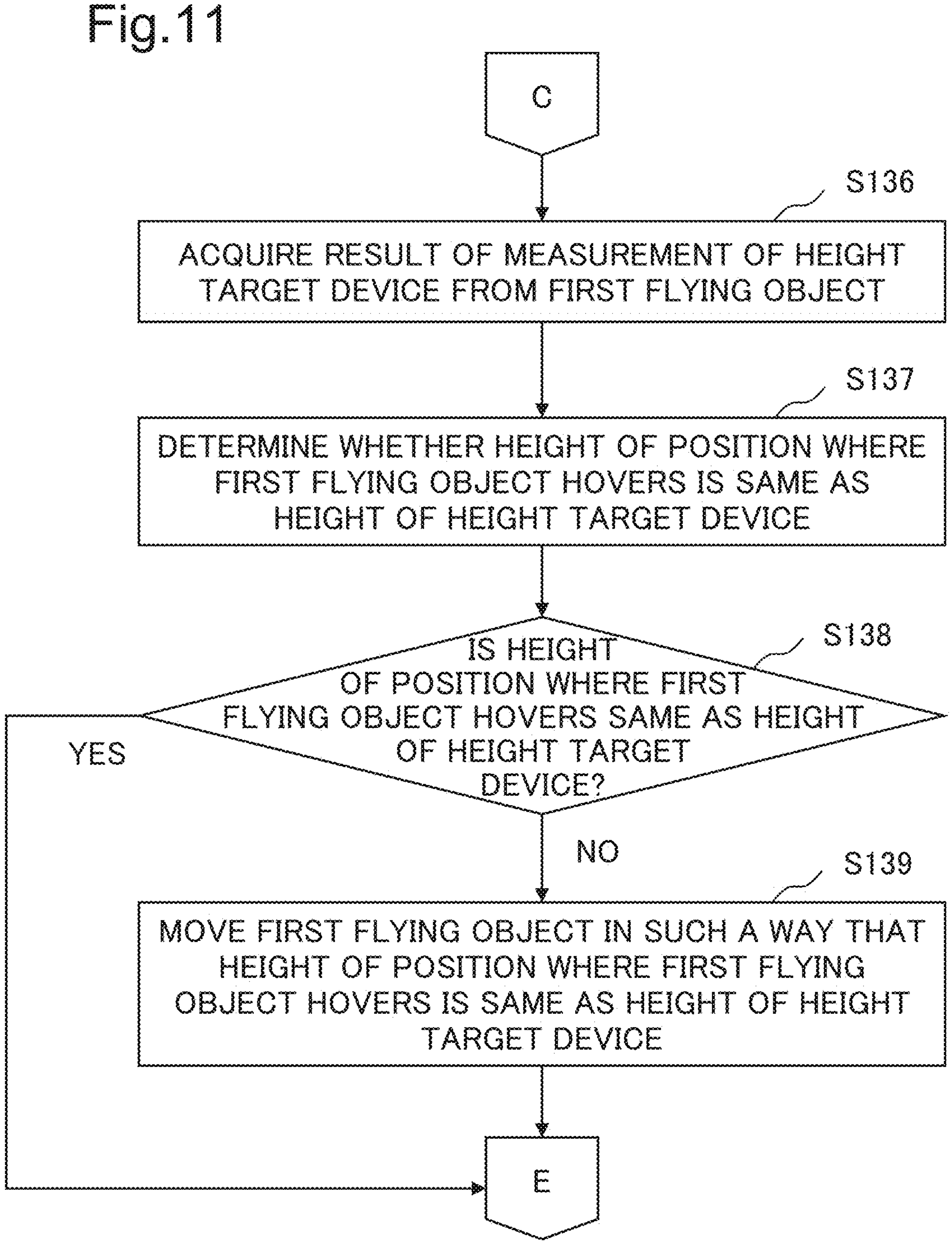
FIG. 11 is a flowchart illustrating an example of the operation of the first body position control process of the control device according to the second example embodiment of the present disclosure.
Figure 12:
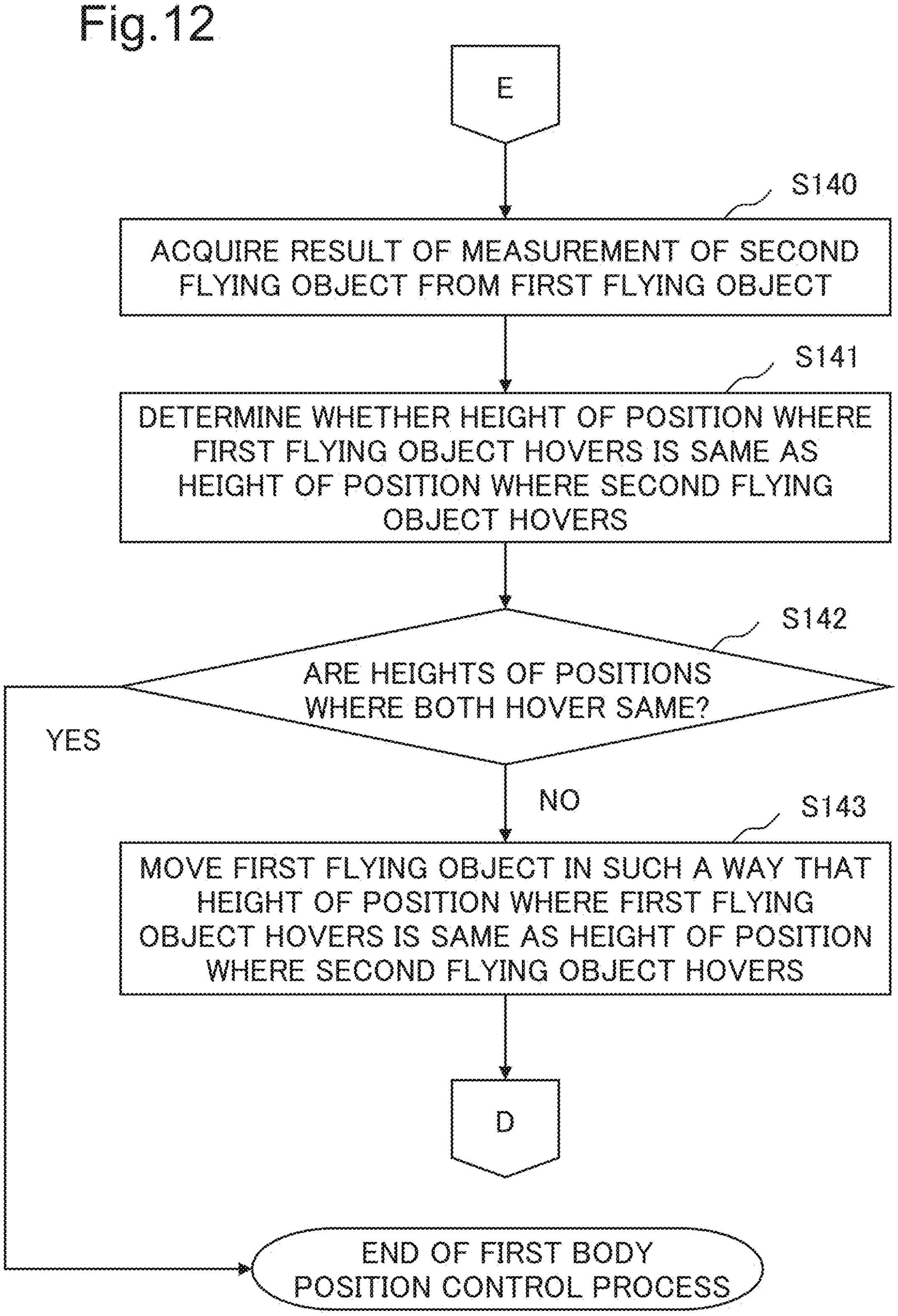
FIG. 12 is a flowchart illustrating an example of the operation of the first body position control process of the control device according to the second example embodiment of the present disclosure.

FIGS. 10, 11, and 12 are flowcharts illustrating an example of the operation of the first body position control process of the control device 100 according to the second example embodiment of the present disclosure.

In the operation illustrated in FIG. 10, first, the flying object control unit 130 controls the first flying object 200A in such a way that the first flying object 200A flies to the air above the first target device 400A (step S131). For example, the flying object control unit 130 transmits an instruction to translate to the position of the first target device 400A to the first flying object 200A. Next, the flying object control unit 130 transmits an instruction to measure the first target device 400A to the first flying object 200A. The target measurement result acquisition unit 183 acquires the measurement result of the first target device 400A from the first flying object 200A (step S132). The measurement result is the measurement data described above, for example, an image of the first target device 400A captured by the target measurement unit 233. The flying object control unit 130 determines whether the first flying object 200A is in the air above the first target device 400A from the measurement result of the first target device 400A (step S133). In a case where the first flying object 200A is in the air above the first target device 400A (YES in step S135), the control device 100 then performs the operation of step S136 in FIG. 9. In a case where the first flying object 200A is not in the air above the first target device 400A (NO in step S135), the flying object control unit 130 moves the first flying object 200A in such a way that the first flying object 200A hovers above the second target device (step S135). The control device 100 performs the operation of step S136 in FIG. 11.

In the operation illustrated in FIG. 11, the flying object control unit 130 transmits an instruction to measure the height target device 500 to the first flying object 200A, and the height measurement result acquisition unit 184 acquires the measurement result of the height target device 500 from the first flying object 200A (step S136). The measurement result of the height target device 500 is, for example, an image obtained by imaging the height target device 500. The flying object control unit 130 determines whether the height of the position where the first flying object 200A hovers is equal to the height of the height target device 500 using the measurement result of the height target device 500 (step S137). In a case where the height of the position where the first flying object 200A hovers is not equal to the height of the height target device 500 (NO in step S138), the flying object control unit 130 moves the first flying object 200A in such a way that the height of the position where the first flying object 200A hovers is equal to the height of the height target device 500 (step S139). Next, the control device 100 performs the operation of step S140 illustrated in FIG. 12. In a case where the height of the position where the first flying object 200A hovers is equal to the height of the height target device 500 (YES in step S138), the control device 100 performs the operation of step S140 illustrated in FIG. 12.

Figure 13:
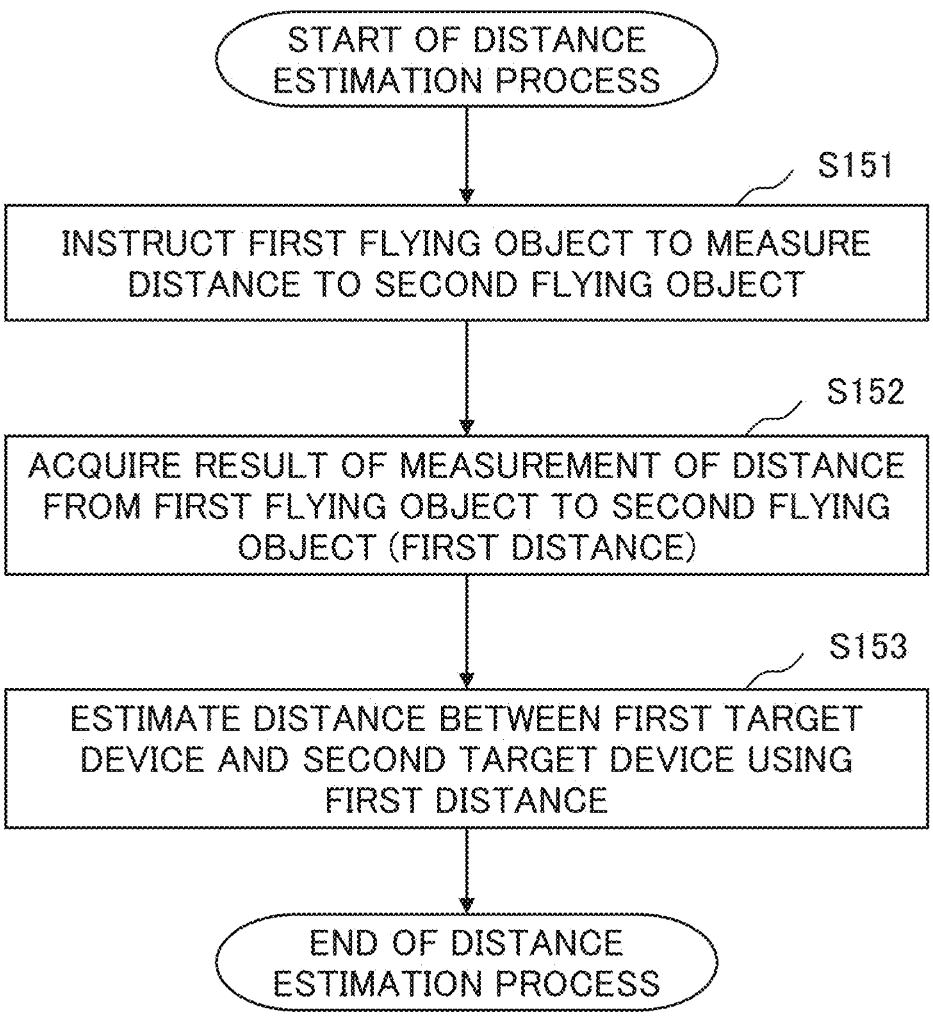
FIG. 13 is a flowchart illustrating an example of an operation of a distance estimation process of the control device according to the second example embodiment of the present disclosure.

In the example illustrated in FIG. 13, the flying object control unit 130 transmits an instruction to measure the second flying object 200B to the first flying object 200A, and the flying object measurement result acquisition unit 185 acquires the measurement result of the second flying object 200B from the first flying object 200A (step S140). The flying object control unit 130 determines whether the height of the position where the first flying object 200A hovers is equal to the height of the position where the second flying object 200B hovers (step S141). When the heights of positions at which both hover are not the same (NO in step S142), the flying object control unit 130 moves the first flying object 200A in such a way that the height of the position where the first flying object 200A hovers is equal to the height of the position where the second flying object 200B hovers (step S143). In this case, there is a possibility that the position of the first flying object 200A is shifted from the air above the first target device 400A. After the operation in step S143, the control device 100 repeats the operations in and after step S132 in FIG. 10.

When the heights of positions at which both hover are the same (YES in step S142), the control device 100 ends the operation illustrated in FIGS. 10, 11, and 12.

The control device 100 may perform the operation illustrated in FIGS. 8 and 9 and the operation illustrated in FIGS. 10 and 11 in parallel. The control device 100 performs the operation illustrated in FIG. 12 after the operations illustrated in FIGS. 8 and 9 are completed.

FIG. 13 is a flowchart illustrating an example of the operation of a distance estimation process of the control device 100 according to the second example embodiment of the present disclosure. In the example illustrated in FIG. 13, the measurement control unit 140 instructs the first flying object 200A to measure the distance to the second flying object 200B (step S151). Next, the distance acquisition unit 150 acquires a result of a measurement of the distance from the first flying object 200A to the second flying object 200B (denoted as a first distance) (step S152). The estimation unit 160 estimates the distance between the first target device 400A and the second target device 400B using the first distance (step S153). The control device 100 ends the operation illustrated in FIG. 13.

Next, the operation of the flying object according to the second example embodiment of the present disclosure will be described in detail with reference to the drawings.

Figure 14:
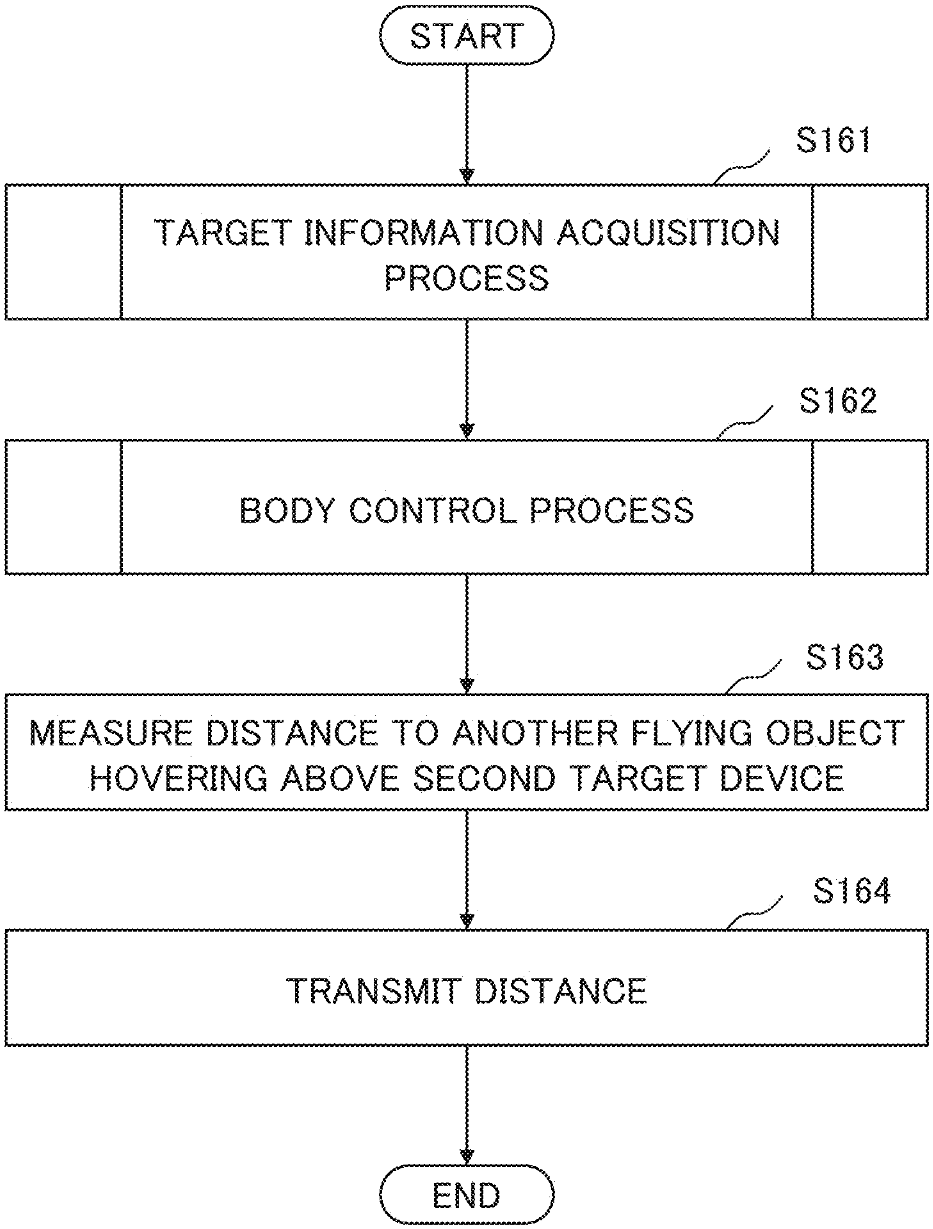
FIG. 14 is a flowchart illustrating an entire example of an operation of the flying object according to the second example embodiment of the present disclosure.

FIG. 14 is a flowchart illustrating an example of the entire operation of the flying object (for example, the first flying object 200A) according to the second example embodiment of the present disclosure. In the example illustrated in FIG.

14, the first flying object 200A executes a target information acquisition process (step S161). Next, the first flying object 200A executes a body control process (step S162). The target information acquisition process and the body control process will be described in detail later. The distance measurement unit 236 of the first flying object 200A measures a distance to the another flying object 200 (for example, the second flying object 200B) hovering above the second target device 400B (step S163). The distance measurement unit 236 transmits the distance obtained by the measurement via, for example, the measurement control unit 220 and the transmission/reception unit 210 (step S164).

The operation of the second flying object 200B of the present example embodiment does not include the operations of step S161, step S163, and step S164. As described below, the content of the body control process of the second flying object 200B is different from the content of the body control process of the first flying object 200A. The second flying object 200B may perform a body control process similar to the body control process of the first flying object 200A in the following description. In this case, the first flying object 200A performs a body control process similar to the body control process of the second flying object 200B in the following description. The second flying object 200B may perform the operations of step S163 and step S164. In this case, the first flying object 200A does not need to perform the operations of step S163 and step S164. Also in these cases, in the operation of the second flying object 200B, the target device 400 is not the first target device 400A but the second target device 400B.

Figure 15:
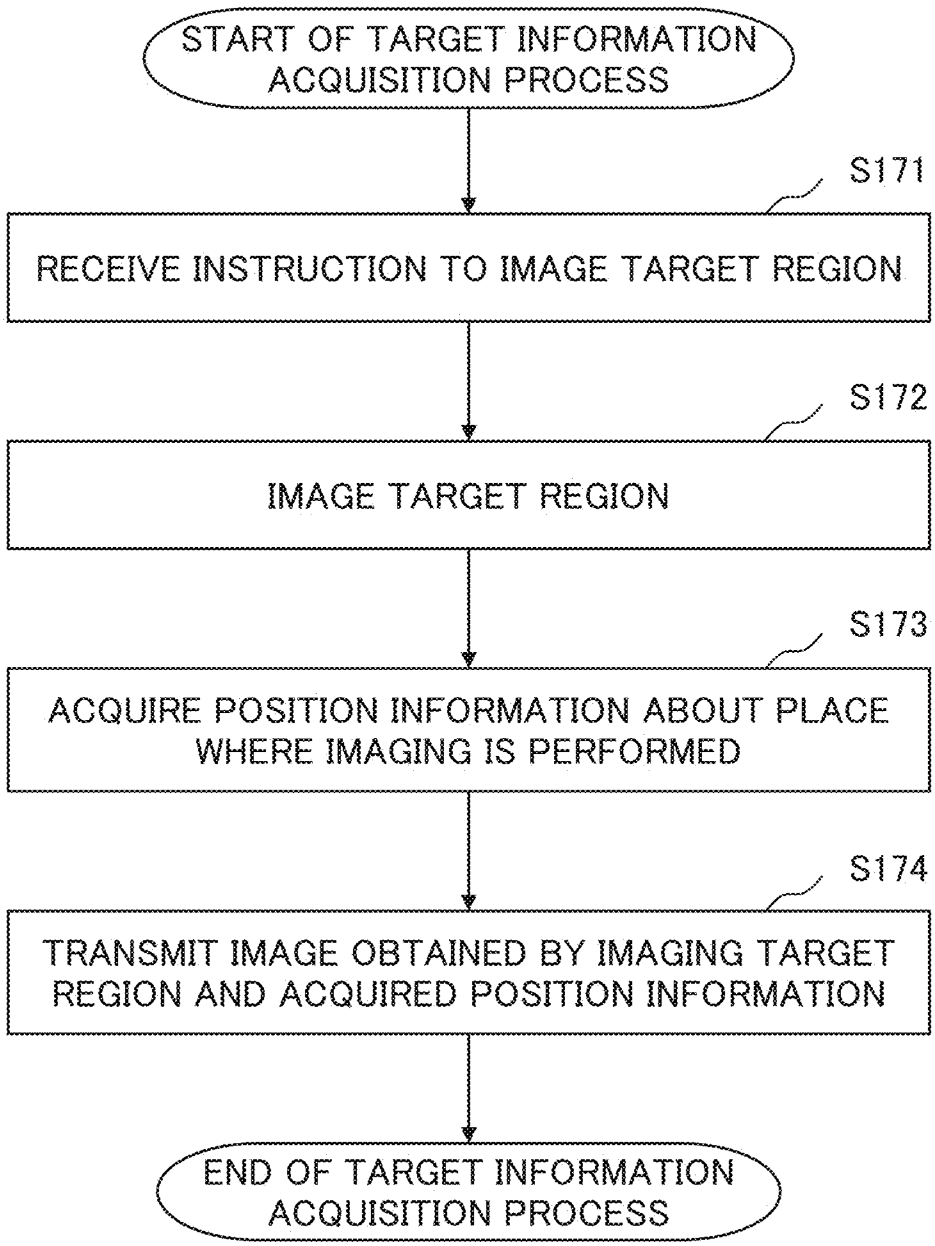
FIG. 15 is a flowchart illustrating an example of an operation of a target information acquisition process of the flying object according to the second example embodiment of the present disclosure.

FIG. 15 is a flowchart illustrating an example of the operation of a target information acquisition process of the flying object (for example, the first flying object 200A) according to the second example embodiment of the present disclosure. In the example illustrated in FIG. 15, the transmission/reception unit 210 of the first flying object 200A receives an instruction to image a target region (step S171). The target image capturing unit 231 captures an image of a target region under the control of the measurement control unit 220 (step S172). The position information acquisition unit 232 acquires information about the position of the place where the imaging has been performed (step S173). The transmission/reception unit 210 transmits the image obtained by imaging the target region and the acquired position information (step S174).

Figure 16:
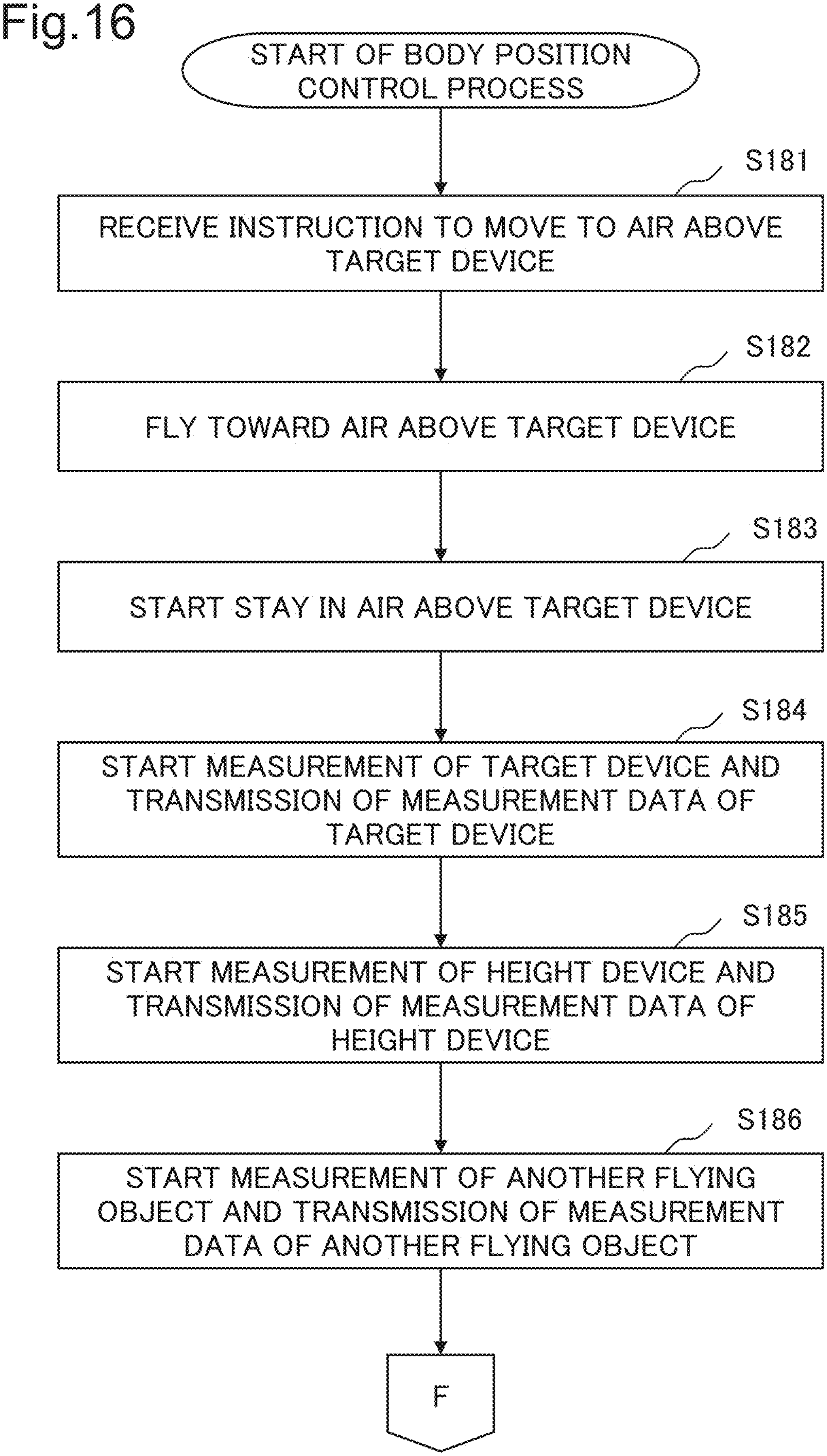
FIG. 16 is a flowchart illustrating an example of an operation of a body control process of the flying object according to the second example embodiment of the present disclosure.
Figure 17:
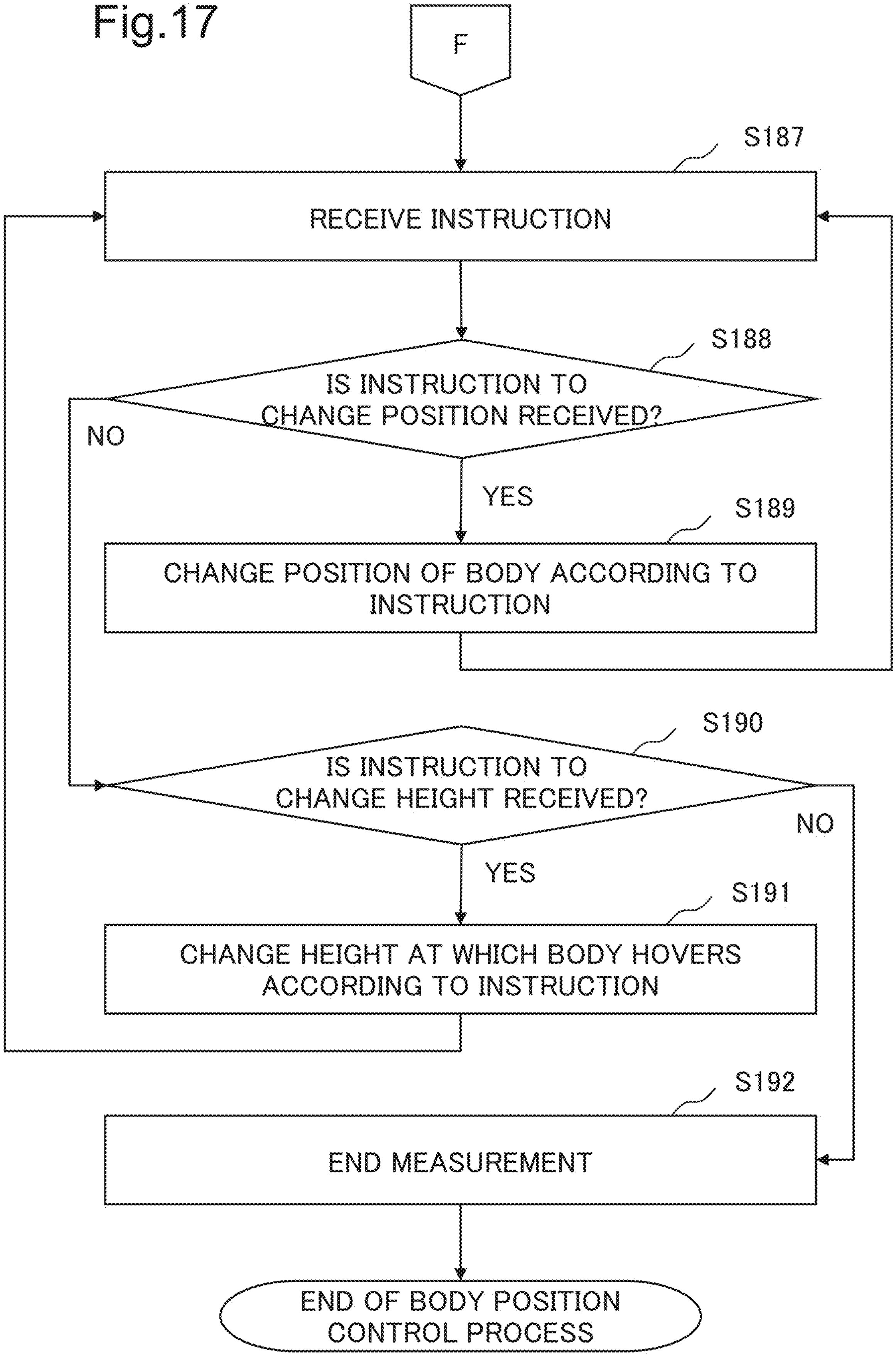
FIG. 17 is a flowchart illustrating an example of an operation of a body control process of the flying object according to the second example embodiment of the present disclosure.

FIGS. 16 and 17 are flowcharts illustrating an example of the operation of the body control process of the flying object (for example, the first flying object 200A) according to the second example embodiment of the present disclosure.

In the operation illustrated in FIG. 16, the transmission/reception unit 210 receives an instruction to move to the air above the target device (for example, the first target device 400A) (step S181). The instruction to move to the air above the target device is an instruction to move to a designated position where the position of the target device is designated. The motion control unit 240 performs control in such a way that the body of the first flying object 200A moves to the air above the first target device 400A. The first flying object 200A flies toward the air above the first target device 400A (step S182). The first flying object 200A starts a stay in the air above the first target device 400A (step S183). That is, the first flying object 200A hovers in the air above the first target device 400A.

Next, the target measurement unit 233 starts measurement of the first target device 400A and transmission of measurement data of the first target device 400A (step S184). When receiving an instruction to measure the first target device 400A, the target measurement unit 233 starts measurement of the first target device 400A. The target measurement unit 233 transmits the measurement data of the first target device 400A via the measurement control unit 220 and the transmission/reception unit 210.

The height target measurement unit 234 starts measurement of the height target device 500 and transmission of measurement data of the height target device 500 (step S185). When receiving an instruction to measure the height target device 500, the height target measurement unit 234 starts measurement of the height target device 500. The height target measurement unit 234 transmits measurement data of the height target device 500 via the measurement control unit 220 and the transmission/reception unit 210.

Furthermore, the flying object measurement unit 235 starts measurement of another flying object and transmission of measurement data of another flying object (step S186). In a case where the flying object 200 is the first flying object 200A, the another flying object is the second flying object 200B. When receiving an instruction to measure the another flying object, the flying object measurement unit 235 starts measurement of the another flying object. The flying object measurement unit 235 transmits measurement data of the another flying object via the measurement control unit 220 and the transmission/reception unit 210.

In the examples of FIGS. 16 and 17, the operation of step S187 is drawn before the operations of steps S184 to S186, but the first flying object 200A may perform the operations of steps S184, S185, and S186 after step S187. In this case, in a case where the instruction received in step S187 described below is an instruction to perform measurement, the first flying object performs any of the operations of steps S184 to S186 according to the instruction.

In the operation illustrated in FIG. 17, the transmission/reception unit 210 receives the instruction (step S187). When receiving the instruction to change the position (YES in step S188), the motion control unit 240 changes the position of the body according to the instruction (step S189). The operation of the first flying object 200A returns to step S187. When not receiving the instruction to change the position (NO in step S188), and when the instruction to change the height is received (YES in step S190), the motion control unit 240 changes the height of the body according to the instruction (step S191). The operation of the first flying object 200A returns to step S187.

When not receiving the instruction to change the height (NO in step S190), and for example, in a case where the instruction to measure the distance has been received, the first flying object 200A ends the measurement of the first target device 400A, the height target device 500, and the another flying object 200 (step S192). The first flying object 200A ends the operation illustrated in FIGS. 16 and 17.

Figure 18:
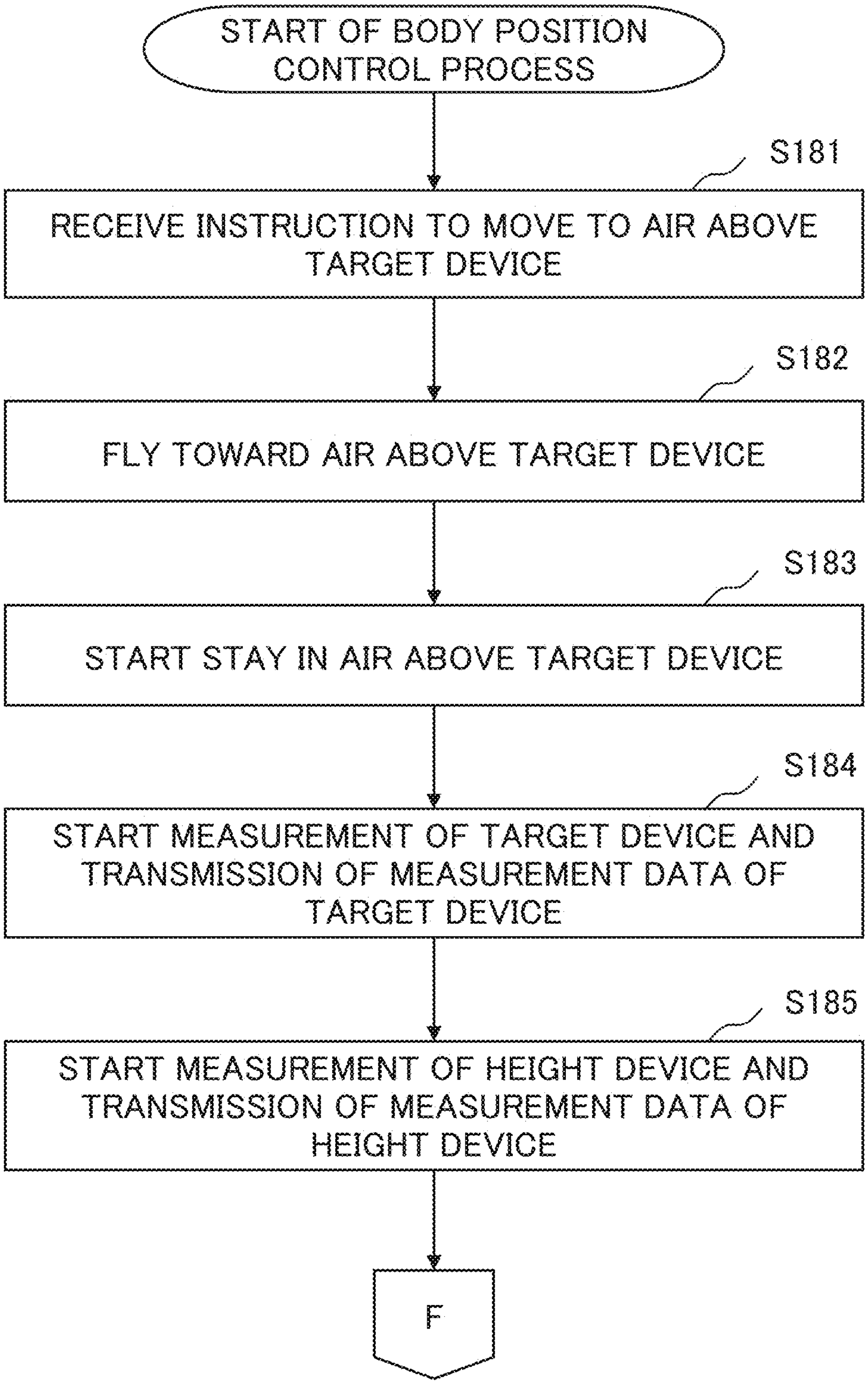
FIG. 18 is a flowchart illustrating another example of an operation of a body control process of the flying object according to the second example embodiment of the present disclosure.

FIGS. 18 and 17 are flowcharts illustrating an example of the operation of the body control process of the flying object (for example, the second flying object 200B) according to the second example embodiment of the present disclosure. The operation illustrated in FIG. 18 is the same as the operation illustrated in FIG. 16 except that the operation in step S186 is not performed. The operations from step S181 to step S185 in FIG. 18 by the second flying object 200B are the same as the operations from step S181 to step S185 in FIG. 16 except that the subject of the operation is the second flying object 200B and the target device is the second target device 400B. The operation illustrated in FIG. 17 by the second flying object 200B is the same as the operation illustrated in FIG. 17 by the first flying object except that the measurement of the second target device 400B instead of the first target device 400A is ended and the measurement of the another flying object 200 is not ended in step S192. Since the second flying object 200B has not measured the another flying objects 200, it is not necessary to end the measurement of the another flying object 200.

<Effects>

The present example embodiment has the same effect as the first example embodiment. The reason is the same as the reason why the effect of the first example embodiment occurs.

First Modification of Second Example Embodiment

The configuration of the control device 100 of the present modification is the same as the configuration of the control device 100 of the second example embodiment. Hereinafter, differences between the control device 100 of the present modification and the control device 100 of the second example embodiment will be described.

The flying object control unit 130 performs fine direction adjustment on the second flying object 200B. The fine direction adjustment on the second flying object 200B is the same as the fine direction adjustment on the first flying object 200A except that the first flying object 200A and the second flying object 200B are replaced with each other in the description of the fine direction adjustment on the first flying object 200A. The flying object control unit 130 may perform the fine direction adjustment on the second flying object 200B according to the operation described in the fine direction adjustment on the first flying object 200A in which the first flying object 200A and the second flying object 200B are replaced with each other.

The distance acquisition unit 150 transmits an instruction to measure the distance to the second flying object 200B to the first flying object 200A and transmits an instruction to measure the distance to the first flying object 200A to the second flying object 200B. The distance acquisition unit 150 acquires the measured distance from both the first flying object 200A and the second flying object 200B.

The estimation unit 160 estimates the distance between the first flying object 200A and the second flying object 200B from the distance (hereinafter, denoted as first distance) acquired from the first flying object 200A and the distance (hereinafter, denoted as a second distance) acquired from the second flying object 200B. For example, the estimation unit 160 may set the average of the distance acquired from the first flying object 200A and the distance acquired from the second flying object 200B as the distance between the first flying object 200A and the second flying object 200B.

Figure 19:
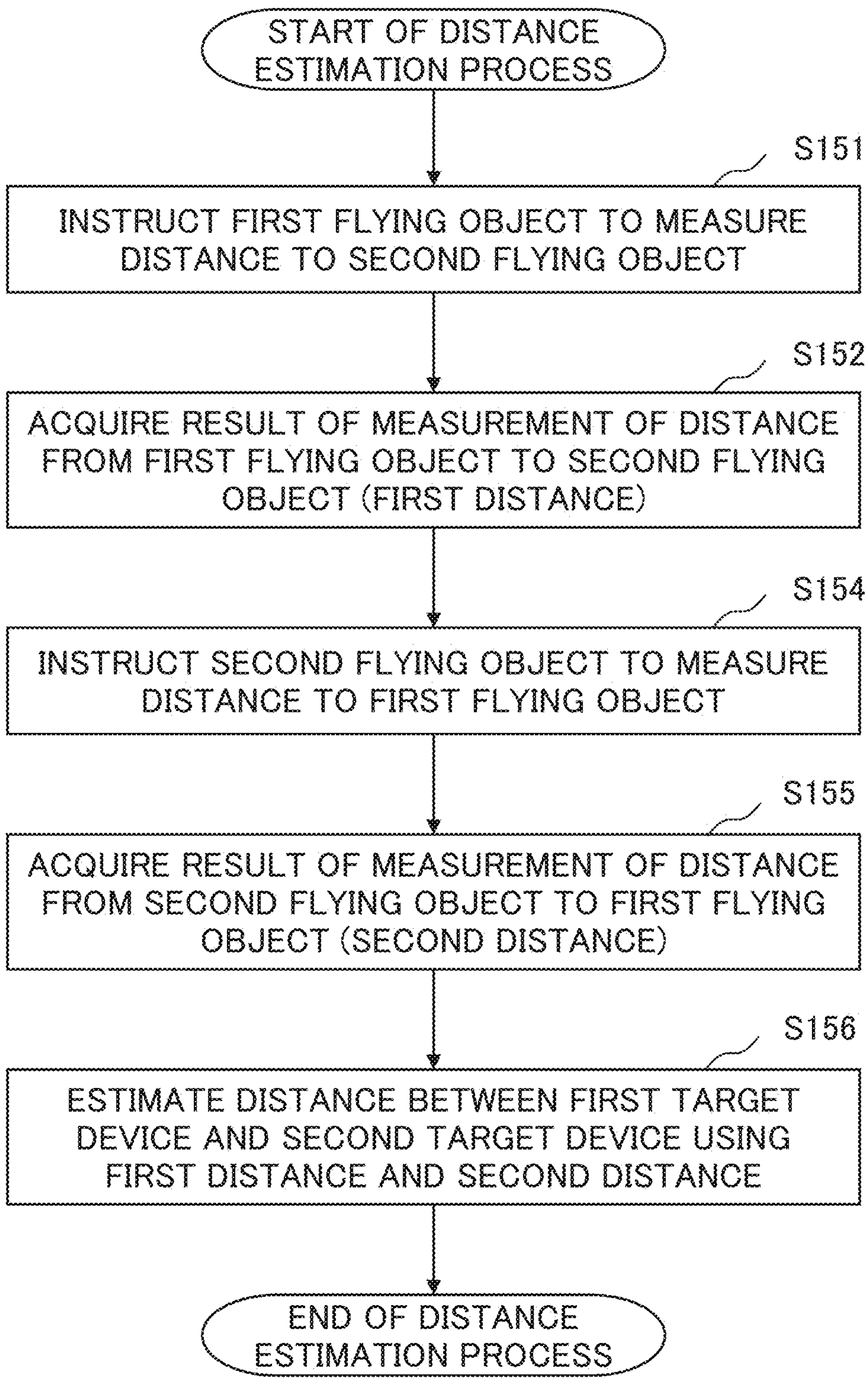
FIG. 19 is a flowchart illustrating an example of an operation of a distance estimation process of the control device according to the first modification of the second example embodiment.

The operation of the control device 100 of the present modification is the same as the operation of the control device 100 of the second example embodiment except that the operation of the distance estimation process in step S104 of FIG. 6 is the operation illustrated in FIG. 19.

FIG. 19 is a flowchart illustrating an example of the operation of the distance estimation process of the control device 100 according to the first modification of the second example embodiment of the present disclosure. In the example illustrated in FIG. 19, the measurement control unit 140 instructs the first flying object 200A to measure the distance to the second flying object 200B (step S151). Next, the distance acquisition unit 150 acquires a result of a measurement of the distance from the first flying object 200A to the second flying object 200B (denoted as a first distance) (step S152). The measurement control unit 140 instructs the second flying object 200B to measure the distance to the first flying object 200A (step S154). Next, the distance acquisition unit 150 acquires a result of a measurement of the distance from the second flying object 200B to the first flying object 200A (denoted as a second distance) (step S155). The estimation unit 160 estimates the distance between the first target device 400A and the second target device 400B using the first distance and the second distance (step S156). The control device 100 ends the operation illustrated in FIG. 13.

Second Modification of Second Example Embodiment

In the present modification, information about the plurality of sequenced first target devices 400A and information about the plurality of sequenced second target devices 400B are given to the control device 100. Different orders are assigned to the plurality of first target devices 400A. Different orders are assigned to the plurality of second target devices 400B. However, the same order is assigned to one first target device 400A and one second target device 400B.

In the present modification, the target detection unit 110 detects all the first target devices 400A and all the second target devices 400B. The target detection unit 110 identifies the positions of all the first target devices 400A and the positions of all the second target devices 400B. The flying object control unit 130 controls the first flying object 200A and the second flying object 200B in such a way that the first flying object 200A hovers above the first target device 400A and the second flying object 200B hovers above the second target device 400B according to the order assigned to the first target device 400A and the second target device 400B. The flying object control unit 130 controls the first flying object 200A and the second flying object 200B in such a way that the second flying object 200B hovers above the second target device 400B to which the order same as the order assigned to the first target device 400A is assigned during a time period at least partially overlapping with a time period during which the first flying object 200A hovers above the first target device 400A. For each combination of the first target device 400A and the second target device 400B to which the same order is assigned, the distance acquisition unit 150 acquires the distance between the first flying object 200A hovering above the first target device 400A and the second flying object 200B hovering above the second target device 400B. The estimation unit 160 estimates the distance between the first target device 400A and the second target device 400B for each combination of the first target device 400A and the second target device 400B to which the same order is assigned. The output unit 170 outputs the distance between the first target device 400A and the second target device 400B for each combination of the first target device 400A and the second target device 400B to which the same order is assigned.

Third Modification of Second Example Embodiment

In the present modification, the flying object control unit 130 does not perform the second direction adjustment and the second height adjustment.

Figure 20:
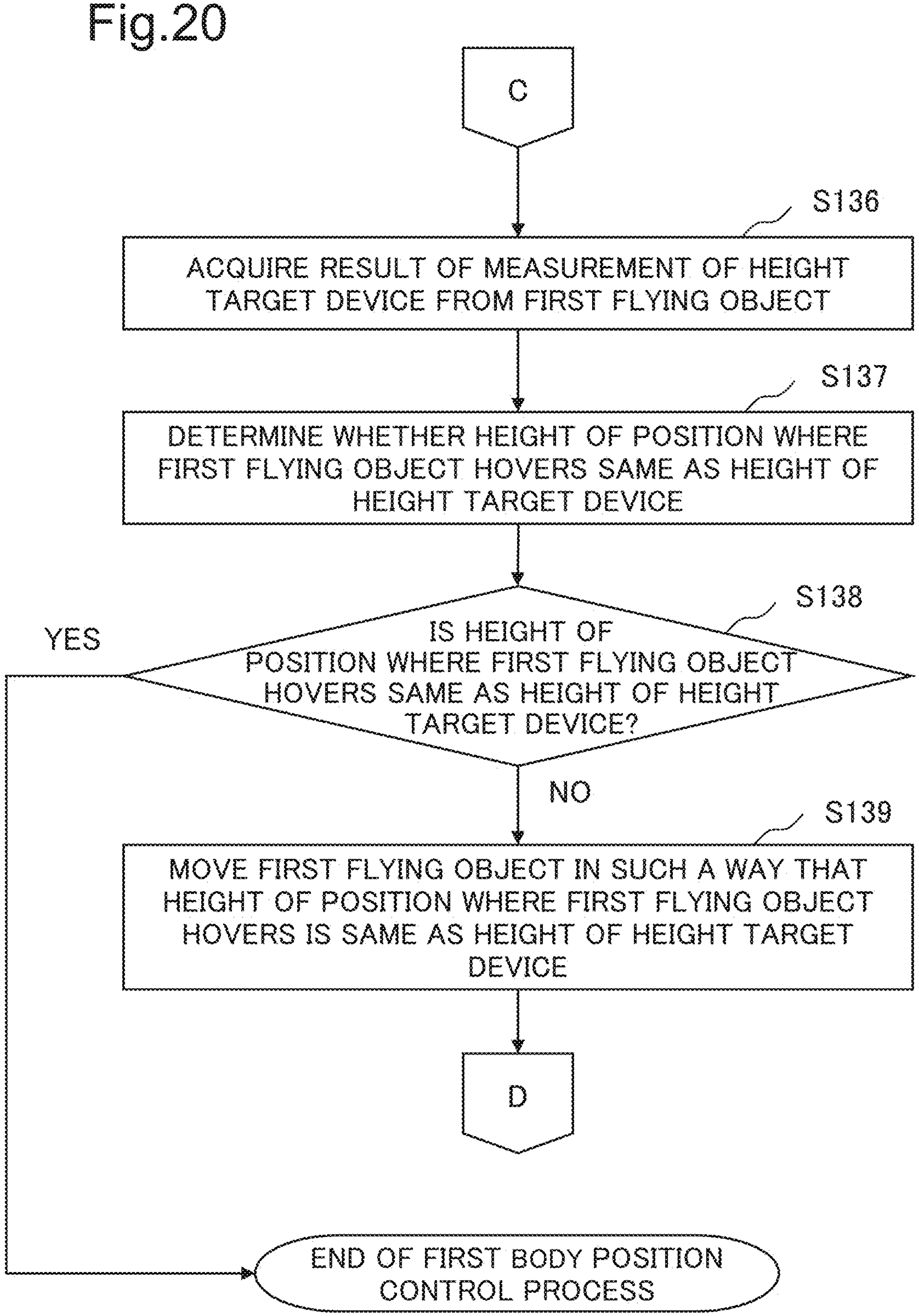
FIG. 20 is a flowchart illustrating an example of an operation of a first body position control process of the control device according to the third modification of the second example embodiment of the present disclosure.

The operation of the control device 100 of the present modification is the same as the operation of the control device 100 of the second example embodiment except that the operation illustrated in FIG. 20 is performed instead of the operation illustrated in FIGS. 11 and 12 in the first body position control process of step S103 of FIG. 6.

FIG. 20 is a flowchart illustrating an example of the operation of the first body position control process of the control device 100 according to the third modification of the second example embodiment of the present disclosure. The control device 100 of the present modification performs the operation of step S136 and subsequent steps of FIG. 20 instead of the operations in and after step S136 in FIG. 11. The operations in steps S136, S137, and S139 in FIG. 20 are the same as the operations in steps S136, S137, and S139 in FIG. 11. In steps S136, S137, and S139, the control device 100 of the present modification performs the operations same as the operations of steps S136, S137, and S139 of the control device of the second example embodiment.

In step S138, when the height of the position where the first flying object 200A hovers is equal to the height of the height target device 500 (YES in step S138), the control device 100 performs the operations in and after step S132 of FIG. 10. After the operation in step S139, the control device 100 performs the operations in and after step S132 in FIG. 10.

The operation of the first flying object 200A of the present example embodiment is the same as the operation of the first flying object 200A of the second example embodiment except that the operation of step S186 in FIG. 16 is not performed in the operation of the body position control process of step S162 of FIG. 14.

Fourth Modification of Second Example Embodiment

The flying object control unit 130 may transmit an instruction to measure the first flying object 200A to the second flying object 200B instead of the first flying object 200A. The flying object control unit 130 may transmit an instruction to change the height of the second flying object 200B to the second flying object 200B in such a way that the height of the position where the second flying object 200B hovers is equal to the height of the position where the first flying object 200A hovers. The operation of the flying object control unit 130 in this case is similar to the operation when the control device 100 of the first example embodiment changes the height of the first flying object 200A.

The target image acquisition unit 181 may instruct not the first flying object 200A but the second flying object 200B to capture the target image, and acquire the image of the target image from the second flying object 200B. The second flying object 200B may capture the target image.

Third Example Embodiment

Next, the third example embodiment of the present disclosure will be described in detail with reference to the drawings.

<Configuration>

Figure 21:
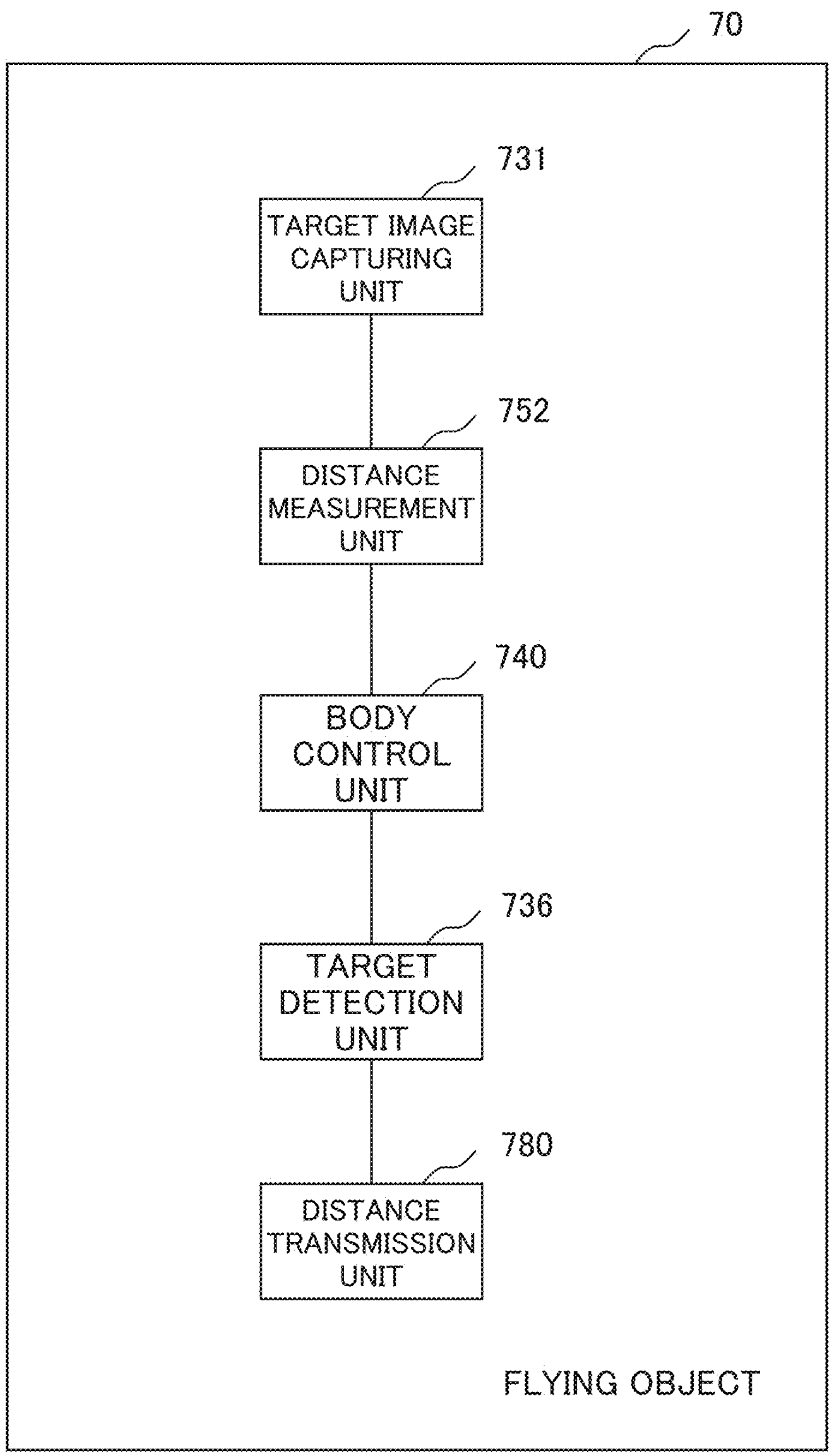
FIG. 21 is a block diagram illustrating an example of a configuration of a flying object according to the third example embodiment of the present disclosure.

FIG. 21 is a block diagram illustrating an example of a configuration of a flying object according to the third example embodiment of the present disclosure. In the example illustrated in FIG. 21, a flying object 70 according to the present example embodiment includes a target image capturing unit 731, a target detection unit 752, the motion control unit 740, a distance measurement unit 736, and a distance transmission unit 780. The target image capturing unit 731 captures an image of a target region. The target detection unit 752 detects a first target device from the target region using the image of the target region. The motion control unit 740 controls the position of the body in such a way that the body moves to the air above the detected first target device and hovers. The distance measurement unit 736 measures, in the air above the first target device, a distance to another flying object hovering above the second target device. The distance transmission unit 780 transmits the distance.

The flying object 70 of the present example embodiment performs part of the operation of the control device 100 of the second example embodiment. The first target device of the present example embodiment is the same as the first target device of the first example embodiment and the first target device 400A of the second example embodiment. The second target device of the present example embodiment is the same as the second target device of the first example embodiment and the second target device 400B of the second example embodiment.

The target image capturing unit 731 of the present example embodiment is the same as the target image capturing unit 231 of the first example embodiment. The distance measurement unit 736 is the same as the distance measurement unit 236 of the first example embodiment.

The target detection unit 752 of the present example embodiment detects a first target device in a target region using an image by a method similar to the method of the target detection unit 110 of the control device 100 of the first example embodiment. An body control unit 730 of the present example embodiment may determine how to control the position of the body by a method similar to the method of the flying object control unit 130 of the control device 100 of the first example embodiment. The body control unit 730 of the present example embodiment may determine how to control the height of the body by a method similar to the method of the flying object control unit 130 of the control device 100 of the first example embodiment.

<Operation>

Figure 22:
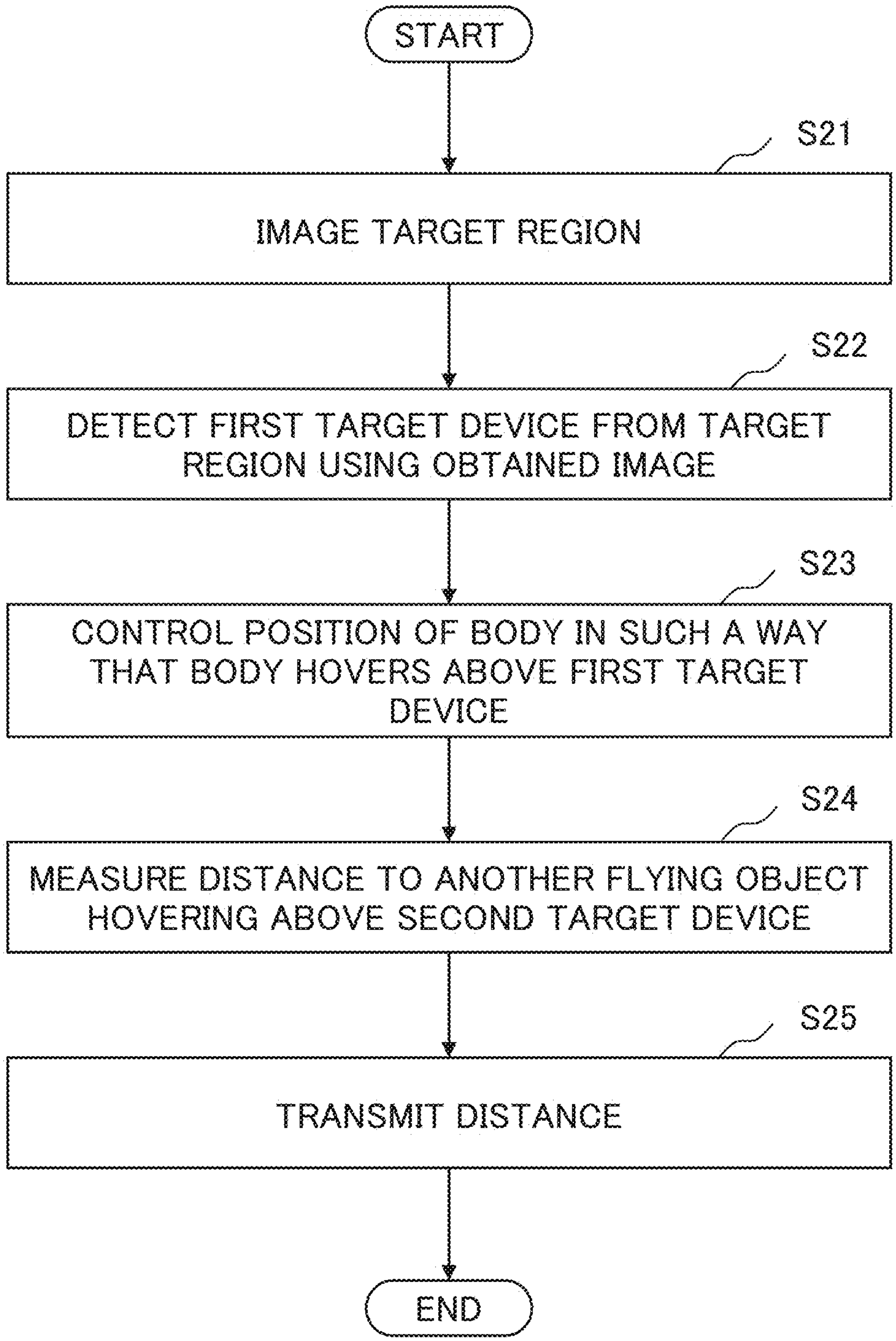
FIG. 22 is a flowchart illustrating an example of the operation of the flying object according to the third example embodiment of the present disclosure.

FIG. 22 is a flowchart illustrating an example of the operation of the flying object according to the third example embodiment of the present disclosure. In the example illustrated in FIG. 22, first, the target image capturing unit 731 captures an image of a target region (step S21). Next, the target detection unit 752 detects the first target device from the target region using the obtained image (step S22). The motion control unit 740 controls the position of the body in such a way that the body hovers above the first target device (step S23). The distance measurement unit 736 measures a distance to another flying object hovering above the second target device (step S24). The distance transmission unit 780 transmits the distance obtained by the measurement (step S25).

<Effects>

The present example embodiment has the same effect as that of the first example embodiment. This is because the motion control unit 740 controls the body of the flying object in such a way that the flying object 70 hovers above the first target device. This is because the distance measurement unit 736 measures the distance to another flying object.

Fourth Example Embodiment

Next, the fourth example embodiment of the present disclosure will be described in detail with reference to the drawings.

<Configuration>

Figure 23:
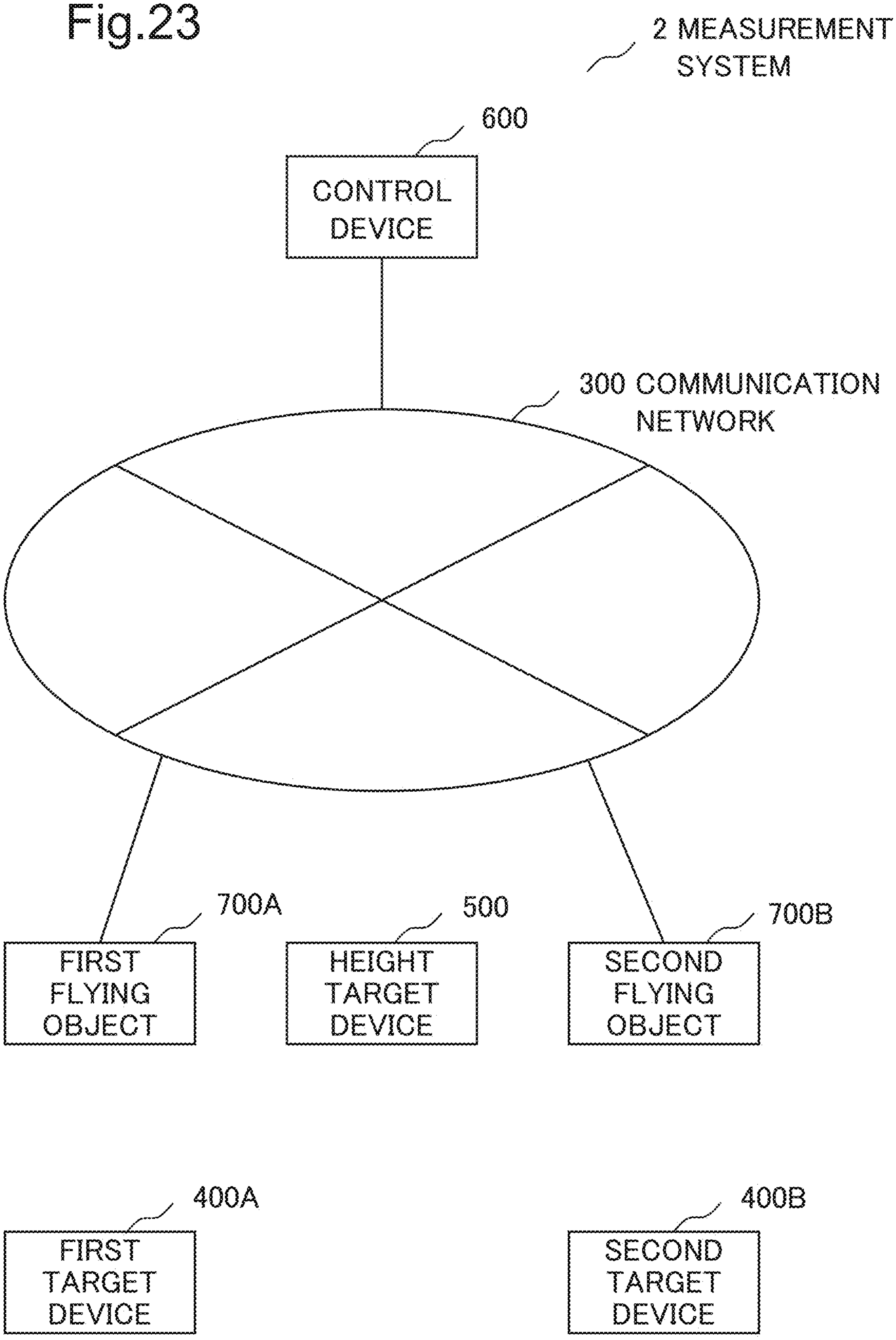
FIG. 23 is a block diagram illustrating an example of a configuration of a measurement system according to the fourth example embodiment of the present disclosure.

FIG. 23 is a diagram illustrating an example of a configuration of a measurement system according to the fourth example embodiment of the present disclosure. In the example illustrated in FIG. 23, a measurement system 2 includes a control device 600, a first flying object 700A, a second flying object 700B, the first target device 400A, the second target device 400B, and the height target device 500. The first target device 400A, the second target device 400B, and the height target device 500 are the same as the first target device 400A, the second target device 400B, and the height target device 500 of the second example embodiment. The control device 600 is communicably connected to each of the first flying object 700A and the second flying object 700B via the communication network 300. The communication network 300 is the same as the communication network 300 of the second example embodiment.

Also in the present example embodiment, in a case where the first target device 400A and the second target device 400B are not distinguished from each other, the first target device 400A and the second target device 400B are collectively referred to as a target device 400.

In the present example embodiment, in a case where the first flying object 700A and the second flying object 700B are not distinguished, the first flying object 700A and the second flying object 700B are collectively referred to as a flying object 700.

<Control Device 600>

Figure 24:
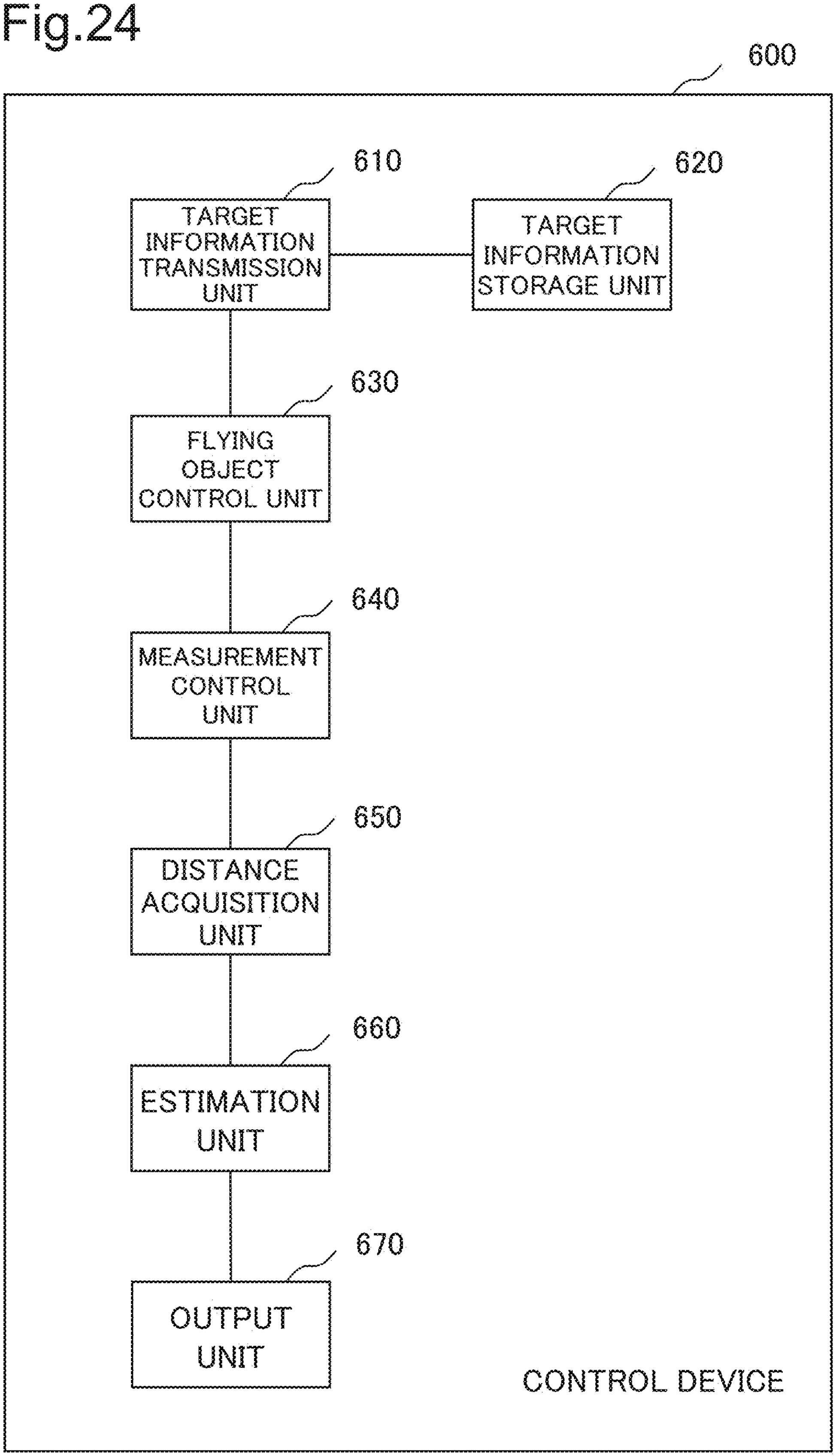
FIG. 24 is a block diagram illustrating an example of a configuration of a control device according to the fourth example embodiment of the present disclosure.

FIG. 24 is a block diagram illustrating an example of a configuration of a control device according to the fourth example embodiment of the present disclosure. In the example illustrated in FIG. 24, the control device 100 includes a target information transmission unit 610, a target information storage unit 620, a flying object control unit 630, a measurement control unit 640, a distance acquisition unit 650, an estimation unit 660, and an output unit 670. The distance acquisition unit 650, the estimation unit 660, and the output unit 670 of the present example embodiment are the same as the distance acquisition unit 150, the estimation unit 160, and the output unit 170 of the second example embodiment, respectively.

<Target Information Storage Unit 620>

The target information storage unit 620 stores information about the target device 400 (information about the first target device 400A and information about the second target device 400B). The information about the target device 400 stored in the target information storage unit 620 includes identification information about the target device 400 and information about a pattern of the target device 400. The pattern of the target device 400 is the same as the pattern of the target device 400 of the second example embodiment. The identification information about the target device 400 is information that can identify each target device 400.

<Target Information Transmission Unit 610>

The target information transmission unit 610 reads the information about the first target device 400A, the information about the second target device 400B, and the information about the height target device 500 from the target information storage unit 620.

The target information transmission unit 610 transmits the read information about the first target device 400A, the read information about the second target device 400B, and the read information about the height target device 500 to the first flying object 700A. The target information transmission unit 610 also transmits the read information about the first target device 400A, the read information about the second target device 400B, and the read information about the height target device 500 to the second flying object 700B.

The target information transmission unit 610 further transmits an instruction to detect a target.

When receiving the instruction to detect the target, the first flying object 700A captures an image of the target region (that is, the target image), and detects the first target device 400A, the second target device B, and the height target device 500 from the captured target image. The first flying object 700A acquires the position of the first flying object 700A when the target image is captured. The first flying object 700A estimates the positions of the first target device 400A, the second target device B, and the height target device 500 in the target region. The first flying object 700A uses the acquired position, the camera parameter of a target image capturing unit 731 to be described later that captures an image of a target region, and the positions at which the first target device 400A, the second target device B, and the height target device 500 are detected to estimate these positions.

The first flying object transmits the positions of the first target device 400A, the second target device B, and the height target device 500 in the target region to the target information transmission unit 610. In this case, the target information transmission unit 610 receives the positions of the first target device 400A, the second target device B, and the height target device 500 in the target region to transmit the received positions of the first target device 400A, the second target device B, and the height target device 500 in the target region to the second flying object 700B.

The first flying object may transmit the positions of the first target device 400A, the second target device B, and the height target device 500 in the target region to the second flying object 700B instead of the target information transmission unit 610.

<Flying Object Control Unit 630>

The flying object control unit 630 of the present example embodiment transmits, to the first flying object 700A, an instruction to fly toward the air above the first target device 400A. Identification information about the first target device 400A may be designated in an instruction to fly toward the air above the first target device 400A.

When receiving an instruction to fly toward the air above the first target device 400A, the first flying object 700A flies toward the air above the first target device 400A. When the movement by flight is completed, the first flying object 700A performs position adjustment of changing the position in such a way that the body hovers above the first target device 400A while measuring the first target device 400A. When the position adjustment is completed, the first flying object 700A performs direction adjustment of changing the direction in such a way that the height target device 500 can be measured. Furthermore, while measuring the height target device 500, the first flying object 700A performs height adjustment of changing the height of the position where the body of the first flying object 700A is hovering in such a way that the height of the position where the body of the first flying object 700A is hovering is equal to the height of the height target device 500. When the height adjustment is completed, the first flying object 700A transmits a notification of the end of the movement to the flying object control unit 630.

The flying object control unit 630 of the present example embodiment transmits, to the second flying object 700B, an instruction to fly toward the air above the second target device 400B. In the instruction to fly toward the air above the second target device 400B, identification information about the second target device 400B may be designated.

When receiving an instruction to fly toward the air above the second target device 400B, the second flying object 700B flies toward the air above the second target device 400B. When the movement by flight is completed, the second flying object 700B performs position adjustment of changing the position in such a way that the body hovers above the second target device 400B while measuring the second target device 400B. When the position adjustment is completed, the second flying object 700B performs direction adjustment of changing the direction in such a way that the height target device 500 can be measured. Furthermore, while measuring the height target device 500, the second flying object 700B performs height adjustment of changing the height of the position where the body of the second flying object 700B is hovering in such a way that the height of the position where the body of the second flying object 700B is hovering is equal to the height of the height target device 500. When the height adjustment is completed, the second flying object 700B transmits a notification of the end of the movement to the flying object control unit 630.

Upon receiving the notification of the end of the movement from the second flying object 700B, the flying object control unit 630 transmits an instruction of second height adjustment to the first flying object 700A.

Upon receiving the instruction of the second height adjustment from the flying object control unit 630, the first flying object 700A performs the second direction adjustment of changing the direction of the body of the first flying object 700A to a direction in which the second flying object 700B can be measured. When receiving the notification of the end of the movement of the second flying object 700B from the flying object control unit 630, the second flying object 700B is hovering at a position at the height same as the height of the height target device 500 above the second target device 400B. Therefore, in the second direction adjustment, the first flying object 700A changes the direction of the body in such a way that the position at the height equal to the height at which the first flying object 700A is hovering above the second target device 400B can be measured. There is a possibility that there is a difference in height between the first flying object 700A and the second flying object 700B due to an error. Therefore, while measuring the second flying object 700B, the first flying object 700A performs the second height adjustment of changing the height of the position where the body of the first flying object 700A hovers in such a way that the height of the position where the body of the first flying object 700A hovers is equal to the height of the position where the second flying object 700B hovers. When the second height adjustment is completed, the first flying object 700A transmits a notification of the measurement preparation completion to the flying object control unit 630.

After the second height adjustment, the first flying object 700A may perform fine direction adjustment in which the measurement direction of the distance measurement unit 736 that measures the distance, which will be described in detail later, is adjusted to face the direction of the reference line of the second flying object 700B. In a case where the first flying object 700A is configured to perform the fine direction adjustment, when the fine direction adjustment is completed, the first flying object 700A transmits a notification of the measurement preparation completion to the flying object control unit 630.

The notification of the end of the movement and the notification of the measurement preparation completion may be appropriately determined data.

Upon receiving the notification of the measurement preparation completion from the first flying object 700A, the flying object control unit 630 transmits a notification of the measurement preparation completion to the measurement control unit 640.

<Measurement Control Unit 640>

The measurement control unit 640 receives a notification of the measurement preparation completion from the flying object control unit 630. When receiving the notification of the measurement preparation completion from the flying object control unit 630, the measurement control unit 640 transmits an instruction to measure the distance to the first flying object 700A.

When receiving the instruction to measure the distance, the first flying object 700A measures the distance to the second flying object 200B. The first flying object 700A transmits information about the distance obtained by the measurement.

In a case where the estimation unit 660 described later is configured to use another information necessary for estimating the distance between the first flying object 200A and the second flying object 200B, as in the second example embodiment, the first flying object 700A is configured to acquire information necessary for estimating the distance between the first flying object 200A and the second flying object 200B described above. In this case, the first flying object 700A further transmits the acquired information.

<Distance Acquisition Unit 650>

The distance acquisition unit 650 acquires distance information obtained by measurement from the first flying object 700A. The distance acquisition unit 650 transmits the acquired distance information to the estimation unit 660.

In a case where the estimation unit 660 described later is configured to use another information necessary for estimating the distance between the first flying object 200A and the second flying object 200B, as in the second example embodiment, the distance acquisition unit 650 is configured to further acquire the information. The distance acquisition unit 650 is configured to transmit the acquired information to the estimation unit 660.

<Estimation Unit 660>

The estimation unit 660 receives information about the distance measured by the first flying object 700A from the distance acquisition unit 650. The estimation unit 660 may estimate the distance between the first target device 400A and the second target device 400B by an estimation method similar to the estimation method by the estimation unit 160 according to the second example embodiment.

For example, the estimation unit 660 may estimate the distance between the first flying object 700A and the second flying object 700B by an estimation method similar to the estimation method by the estimation unit 160 according to the second example embodiment. As in the second example embodiment, the distance between the first flying object 700A and the second flying object 700B is the distance between the reference point of the first flying object 700A and the reference point of the second flying object 700B. As in the above case, in a state where the first flying object 700A hovers above the first target device 400A, the reference point of the first flying object 700A exists vertically above the reference point of the first target device 400A. In a state where the second flying object 700B hovers above the second target device 400B, the reference point of the second flying object 700B exists vertically above the reference point of the second target device 400B. The distance between the first target device 400A and the second target device 400B is a distance between a reference point of the first target device 400A and a reference point of the second target device 400B. The estimation unit 660 sets the estimated distance between the first flying object 700A and the second flying object 700B as the distance between the first target device 400A and the second target device 400B.

The estimation unit 660 transmits the estimated distance between the first target device 400A and the second target device 400B to the output unit 670.

<Output Unit 670>

The output unit 670 outputs the distance received from the output unit 670.

<Flying Object 700>

A physical structure (for example, an outer shape) of a flying object 700 of the present example embodiment is the same as the physical structure of the flying object 200 of the second example embodiment.

Figure 25:
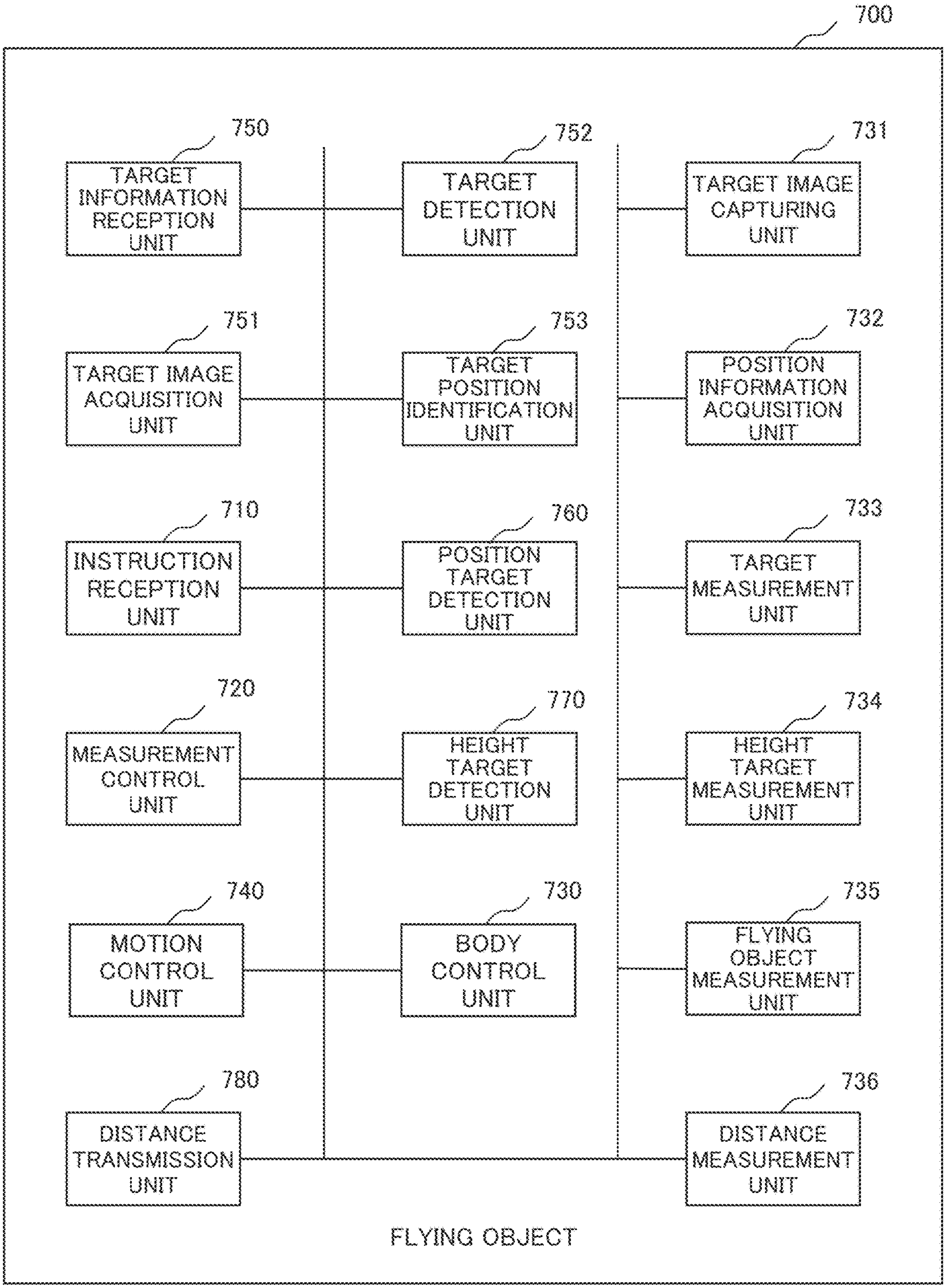
FIG. 25 is a block diagram illustrating an example of a configuration of a flying object according to the fourth example embodiment of the present disclosure.

FIG. 25 is a block diagram illustrating an example of a configuration of the flying object 700 according to the fourth example embodiment of the present disclosure. In the example illustrated in FIG. 25, the flying object 700 includes an instruction reception unit 710, a measurement control unit 720, the body control unit 730, the motion control unit 740, a target information reception unit 750, the target image acquisition unit 751, the target detection unit 752, and a target position identification unit 753. The flying object 700 further includes a position target detection unit 760, a height target detection unit 770, and the distance transmission unit 780. The flying object 700 further includes the target image capturing unit 731, a position information acquisition unit 732, a target measurement unit 733, a height target measurement unit 734, a flying object measurement unit 735, and the distance measurement unit 736.

The target image capturing unit 731, the position information acquisition unit 732, the target measurement unit 733, the height target measurement unit 734, the flying object measurement unit 735, and the distance measurement unit 736 are the same as the target image capturing unit 231, the position information acquisition unit 232, the target measurement unit 233, the height target measurement unit 234, the flying object measurement unit 235, and the distance measurement unit 236 of the first example embodiment, respectively.

<Target Information Reception Unit 750>

The target information reception unit 750 receives information about the first target device 400A, information about the second target device 400B, and information about the height target device from the control device 600. The target information reception unit 750 transmits the received information about the first target device 400A, the received information about the second target device 400B, and the received information about the height target device to the target detection unit 752.

<Instruction Reception Unit 710>

The instruction reception unit 710 receives an instruction from the control device 600.

In a case where the received instruction is an instruction to detect the target, the instruction reception unit 710 transmits the received instruction to the target detection unit 752.

In a case where the received instruction is an instruction to move to the air above the target device 400, the instruction reception unit 710 transmits the received instruction to the body control unit 730. In a case where the received instruction is an instruction of the second height adjustment, the instruction reception unit 710 transmits the received instruction to the body control unit 730.

In a case where the received instruction is an instruction to measure the distance, the instruction reception unit 710 transmits the received instruction to the distance transmission unit 780.

<Target Detection Unit 752>

The target detection unit 752 receives information about the first target device 400A, information about the second target device 400B, and information about the height target device from the target information reception unit 750.

The target detection unit 752 receives the target image from the target image acquisition unit 751.

As in the target detection unit 110 of the second example embodiment, the target detection unit 752 detects an image of the first target device 400A, an image of information about the second target device 400B, and an image of information about the height target device from the target image. The target detection unit 752 identifies the position of the first target device 400A, the position of the information about the second target device 400B, and the position of the information about the height target device in the target image.

The target detection unit 752 transmits the position of the first target device 400A, the position of the information about the second target device 400B, and the position of the information about the height target device in the target image to the target position identification unit 753.

<Target Image Acquisition Unit 751>

The target image acquisition unit 751 receives a request for a target image from the instruction reception unit 710. Upon receiving the request for the target image, the target image acquisition unit 751 determines the imaging position by a method similar to the method of determining the imaging position by the target image acquisition unit 181 of the second example embodiment. At this time, the information about the target region may be given to the target image acquisition unit 751 in advance. The target image is acquired by a method similar to the method of acquiring the target image by the target image acquisition unit 181 of the second example embodiment. However, the target image acquisition unit 751 transmits a movement instruction to the motion control unit 740. The target image acquisition unit 751 transmits an instruction to capture the target image to the measurement control unit 720.

Upon receiving the instruction to capture the target image, the measurement control unit 720 captures the target image using the target image capturing unit 731 to acquire the position where the target image is captured using the position information acquisition unit 732.

The target image acquisition unit 751 receives the target image and the position where the target image is acquired from the measurement control unit 720. The target image acquisition unit 751 transmits the received target image to the target detection unit 752. The target image acquisition unit 751 transmits the received position where the target image is acquired to the target position identification unit 753.

<Target Position Identification Unit 753>

The target position identification unit 753 receives the position where the target image is acquired from the target image acquisition unit 751. The target position identification unit 753 receives the position of the first target device 400A, the position of the information about the second target device 400B, and the position of the information about the height target device in the target image from the target detection unit 752.

The target position identification unit 753 identifies the position of the first target device 400A, the position of the information about the second target device 400B, and the position of the information about the height target device in the target region by a method similar to the method of the target position identification unit 120 of the second example embodiment.

The target position identification unit 753 transmits the identified position of the first target device 400A, the identified position of the information about the second target device 400B, and the identified position of the information about the height target device in the target region to the control device 600. The target position identification unit 753 may transmit the identified position of the first target device 400A, the identified position of the information about the second target device 400B, and the identified position of the information about the height target device in the target region to the second flying object 700B.

<Measurement Control Unit 720>

The measurement control unit 720 has the same function as the measurement control unit 220 of the second example embodiment, and operates as in the measurement control unit 220 of the second example embodiment. Upon receiving the measurement instruction, the measurement control unit 720 performs measurement using a unit that performs measurement according to the instruction, receives a measurement result from the unit that has performed the measurement, and transmits the measurement result obtained by the measurement to the unit that has given the measurement instruction. Therefore, the measurement control unit 720 captures a target image using the target image capturing unit 731. The measurement control unit 720 acquires the position of the flying object 700 using the position information acquisition unit 732. The measurement control unit 720 measures the target device 400 using the target measurement unit 733. The measurement control unit 720 measures the height target device 500 using the height target measurement unit 734. The measurement control unit 720 measures another flying object 700 using the flying object measurement unit 735. The measurement control unit 720 measures the distance using the distance measurement unit 736.

<Motion Control Unit 740>

The motion control unit 740 has the same function as the motion control unit 240 of the second example embodiment, and operates as in the motion control unit 240 of the second example embodiment. However, the motion control unit 740 controls the movement (that is, position and height) of the body of the flying object 700 according to the received instruction.

<Airframe Control Unit 730>

The body control unit 730 receives an instruction of the flying object 700 from the control device 600 via the instruction reception unit 710, and controls the movement and measurement of the body according to the received instruction.

Specifically, in a case where an instruction to move to the air above the target device 400 is received, the body control unit 730 transmits the instruction to move to the air above the target device 400 to the motion control unit 740. Thus, the flying object 700 to the air above the target device 400 and causing the flying object 700 to hover. The body control unit 730 performs position adjustment, direction adjustment, position adjustment similar to the height adjustment, direction adjustment, and height adjustment of the flying object control unit 130 of the second example embodiment. However, the body control unit 730 receives information about the reference point of the detected target device 400 from the position target detection unit 760. The body control unit 730 receives information about the reference point of the detected height target device 500 and information about the detected another flying object 700 from the height target detection unit 770. The body control unit 730 transmits a measurement instruction to the measurement control unit 720. The body control unit 730 transmits a movement instruction and a height change instruction to the motion control unit 740.

When the position adjustment, the direction adjustment, and the height adjustment are completed, the body control unit 730 transmits a notification of the end of the movement.

When receiving the instruction of the second height adjustment, the body control unit 730 performs the second direction adjustment and the second height adjustment similar to the second direction adjustment and the second height adjustment of the flying object control unit 130 of the second example embodiment. However, the body control unit 730 transmits a measurement instruction to the measurement control unit 720. The body control unit 730 transmits a movement instruction and a height change instruction to the motion control unit 740.

When the second direction adjustment and the second height adjustment are completed, the body control unit 730 transmits a notification of the measurement preparation completion.

The body control unit 730 may perform the above-described fine direction adjustment after the second direction adjustment and the second height adjustment. In this case, when the fine direction adjustment is completed, the body control unit 730 transmits a notification of the measurement preparation completion.

<Position Target Detection Unit 760>

The position target detection unit 760 operates as in the position target detection unit 131 of the second example embodiment.

However, the position target detection unit 760 receives the measurement data (for example, an image) of the target device 400 measured by the target measurement unit 733 from the target measurement unit 733 via the measurement control unit 720. The position target detection unit 760 transmits information about the detected reference point of the target device 400 to the body control unit 730.

<Height Target Detection Unit 770>

The height target detection unit 770 operates as in the height target detection unit 132 of the second example embodiment.

However, the height target detection unit 770 receives measurement data (for example, an image) of the height target device 500 from the height target measurement unit 734 via the measurement control unit 720. The height target detection unit 770 receives measurement data (for example, an image) of the another flying object 700 from the flying object measurement unit 735 via the measurement control unit 720. The height target detection unit 770 transmits information about the detected reference point of the height target device 500 to the body control unit 730. The height target detection unit 770 transmits information about the position of a figure indicating a reference face of the another flying object 700 to the body control unit 730.

<Distance Transmission Unit 780>

Distance transmission unit 780 receives an instruction to measure the distance from instruction reception unit 710. Upon receiving the instruction to measure the distance, the distance transmission unit 780 transmits an instruction to measure the distance to the another flying object 700 to the measurement control unit 720. The distance transmission unit 780 receives the distance to the another flying object 700 obtained by the measurement from the measurement control unit 720 from the distance measurement unit 736 via the measurement control unit 720. The distance transmission unit 780 transmits the distance to the another flying object 700 to the control device 600.

<Operation>

Next, the operation of the control device 600 according to the fourth example embodiment of the present disclosure will be described in detail with reference to the drawings.

Figure 26:
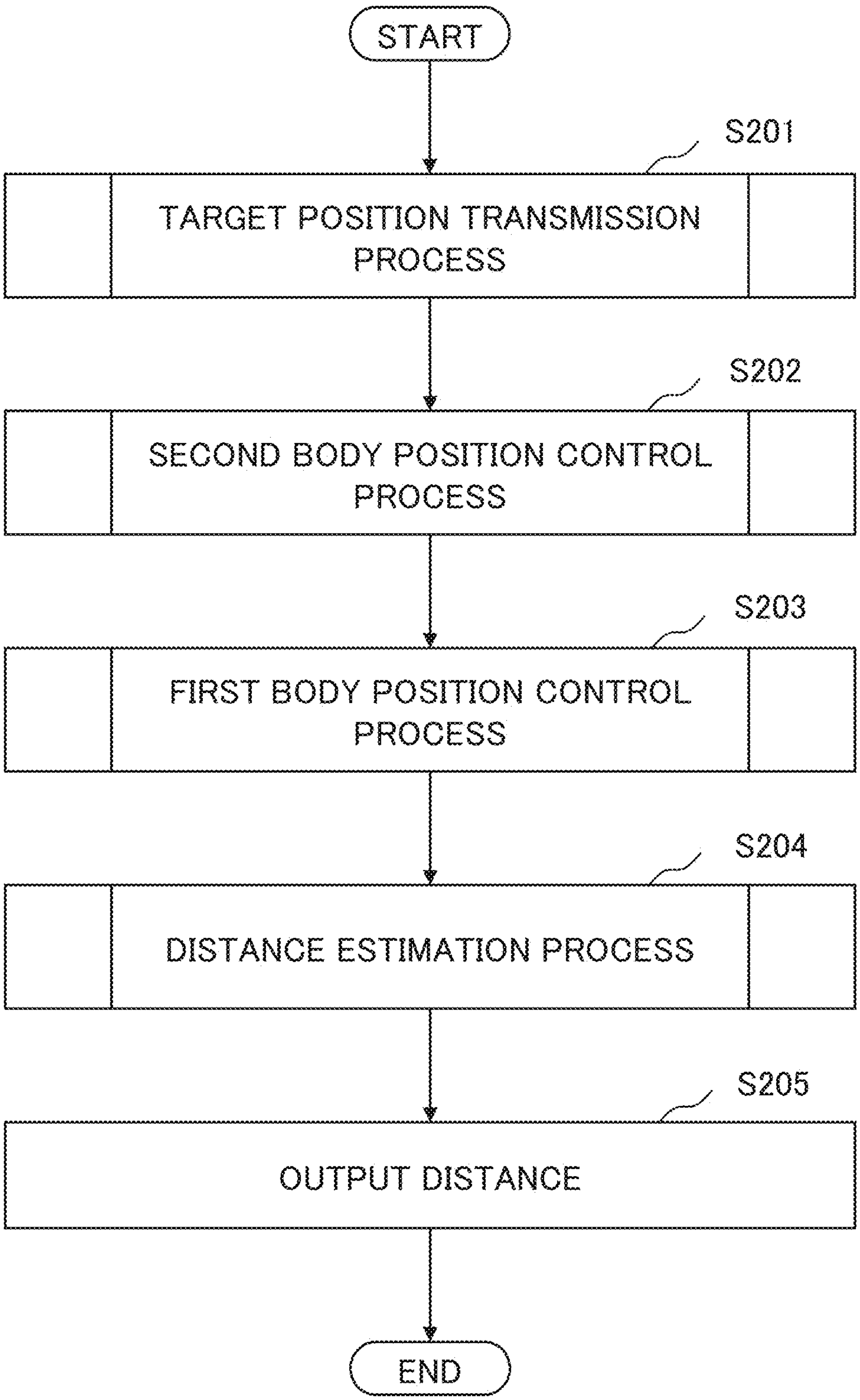
FIG. 26 is a flowchart illustrating an entire example of the operation of the control device according to the fourth example embodiment of the present disclosure.

FIG. 26 is a flowchart illustrating an example of the entire operation of the control device 600 according to the fourth example embodiment of the present disclosure. In the example illustrated in FIG. 26, the control device 600 performs a target position transmission process (step S201). Next, the control device 600 performs a second body position control process (step S202). The control device 600 performs a first body position control process (step S203). The control device 600 performs a distance estimation process (step S204). Finally, the output unit 670 outputs the obtained distance (step S205). The target position transmission process, the second body position control process, the first body position control process, and the distance estimation process will be described in detail below.

Figure 27:
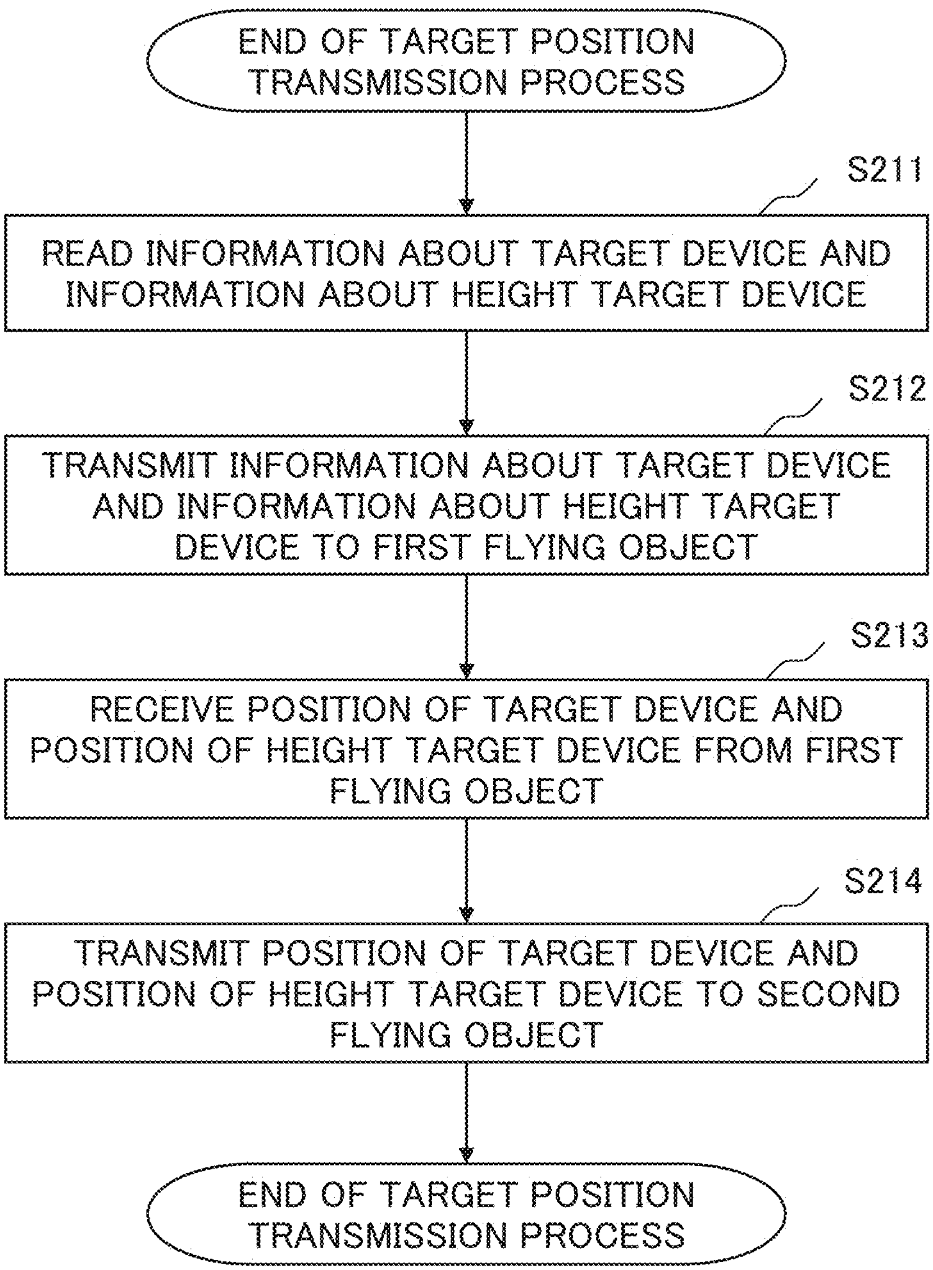
FIG. 27 is a flowchart illustrating an example of an operation of a target position measurement process of the control device according to the fourth example embodiment of the present disclosure.

FIG. 27 is a flowchart illustrating an example of the operation of a target position measurement process of the control device 600 according to the fourth example embodiment of the present disclosure. In the example illustrated in FIG. 27, the target information transmission unit 610 reads information about the target device 400 (that is, the first target device 400A and the second target device 400B) and information about the height target device 500 from the target information storage unit 620 (step S211). The target information transmission unit 610 transmits the read information about the target device 400 and the read information about the height target device 500 to the first flying object 700A (step S212). The target information transmission unit 610 transmits an instruction to detect a target to the first flying object 700A, and receives the position of the target device 400 and the position of the height target device 500 in the target region from the first flying object 700A (step S213). The target information transmission unit 610 transmits the position of the target device 400 and the position of the height target device 500 received from the first flying object 700A to the second flying object 700B (step S214).

Figure 28:
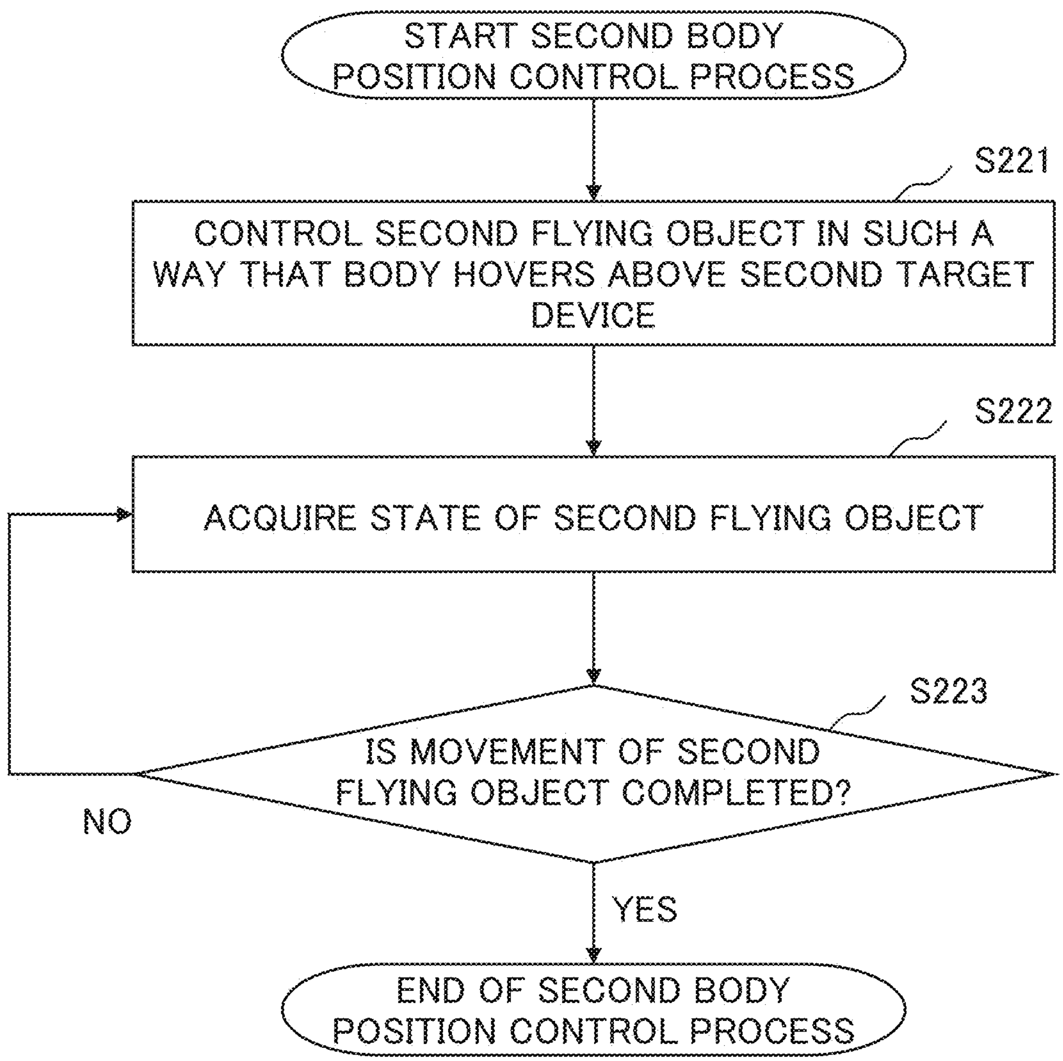
FIG. 28 is a flowchart illustrating an example of the operation of the second body position control process of the control device according to the fourth example embodiment of the present disclosure.

FIG. 28 is a flowchart illustrating an example of the operation of the second body position control process of the control device 600 according to the fourth example embodiment of the present disclosure. In the example illustrated in FIG. 28, the flying object control unit 630 controls the second flying object 700B in such a way that the body hovers above the second target device 400B (step S221). Specifically, the flying object control unit 630 transmits an instruction to move to the air above the target device 400 to the second flying object 700B. The flying object control unit 630 acquires the state of the second flying object 700B (step S222). Specifically, when not receiving the notification of the end of the movement from the second flying object 700B, the flying object control unit 630 determines that the second flying object 700B is in a moving state. When receiving the notification of the end of the movement from the second flying object 700B, the flying object control unit 630 determines that the state of the second flying object 700B is a state in which the movement has been ended (that is, a state in which the body hovers at a position at the height equal to the height of the height target device 500 above the second target device 400B). When the state of the second flying object 700B is not the state in which the movement is ended (NO in step S223), the operation of the control device 600 returns to step S222. When the state of the second flying object 700B is the state in which the movement is ended (YES in step S223), the control device 600 ends the operation illustrated in FIG. 28.

Figure 29:
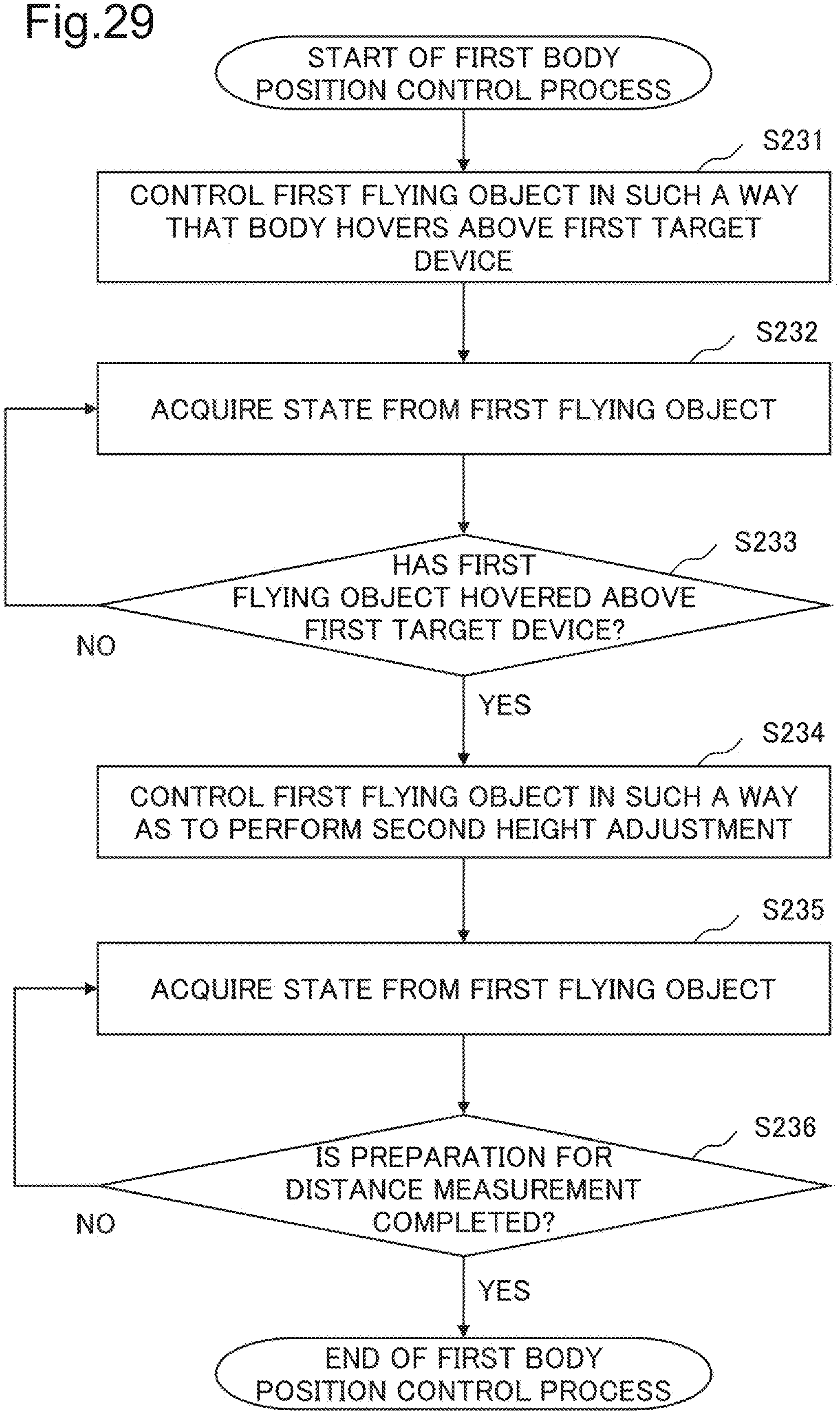
FIG. 29 is a flowchart illustrating an example of the operation of the first body position control process of the control device according to the fourth example embodiment of the present disclosure.

FIG. 29 is a flowchart illustrating an example of the operation of the first body position control process of the control device 600 according to the fourth example embodiment of the present disclosure. In the example illustrated in FIG. 29, the flying object control unit 630 controls the first flying object 700A in such a way that the body hovers above the first target device 400A (step S221). Specifically, the flying object control unit 630 transmits an instruction to move to the air above the target device 400 to the first flying object 700A. The flying object control unit 630 acquires the state of the first flying object 700A (step S222). Specifically, when not receiving the notification of the end of the movement from the first flying object 700A, the flying object control unit 630 determines that the first flying object 700A is in a moving state. When receiving the notification of the end of the movement from the first flying object 700A, the flying object control unit 630 determines that the state of the first flying object 700A is a state in which the movement has been ended (that is, a state in which the first flying object 700A hovers at a position at the height equal to the height of the height target device 500 above the first target device 400A). When the state of the first flying object 700A is not the state in which the movement is ended (NO in step S223), the operation of the control device 600 returns to step S222.

When the state of the first flying object 700A is the state in which the movement is ended (YES in step S223), the flying object control unit 630 controls the first flying object 700A in such a way as to perform the second height adjustment (step S234). Specifically, the flying object control unit 630 transmits an instruction of the second height adjustment to the first flying object 700A. The flying object control unit 630 acquires the state of the first flying object 700A (step S225). Specifically, when not receiving the notification of the measurement preparation completion from the first flying object 700A, the flying object control unit 630 determines that the state of the first flying object 700A is a state in which the second height adjustment is not completed. When receiving the notification of the measurement preparation completion from the first flying object 700A, the flying object control unit 630 determines that the state of the first flying object 700A is a state in which the second height adjustment has been completed (that is, a state in which preparation for distance measurement is completed). When the preparation for distance measurement is not completed (NO in step S236), the operation of the control device 600 returns to step S235. When the preparation for distance measurement is completed (YES in step S236), control device 600 ends the operation illustrated in FIG. 29.

Figure 30:
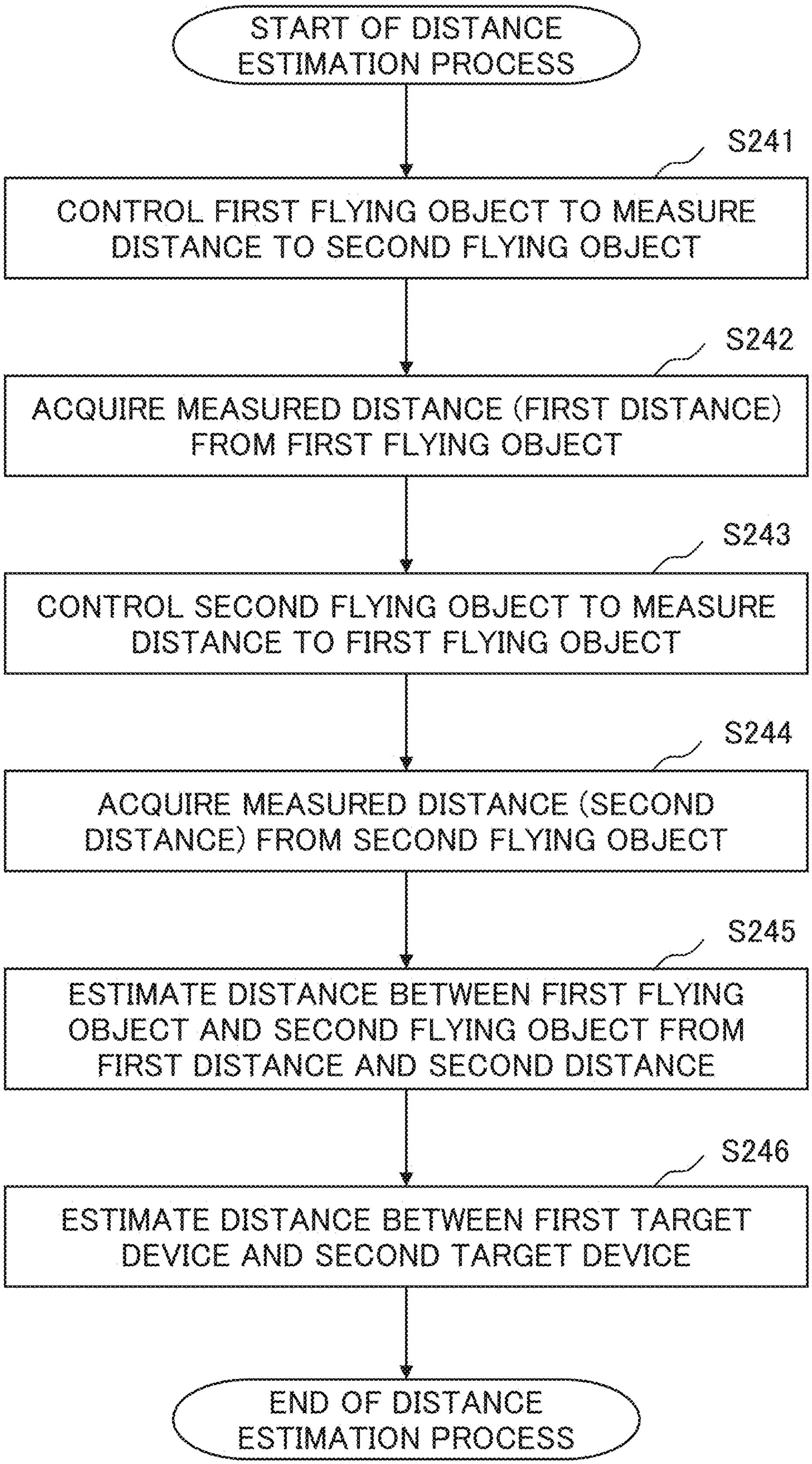
FIG. 30 is a flowchart illustrating an example of an operation of a distance measurement process of the control device according to the fourth example embodiment of the present disclosure.

FIG. 30 is a flowchart illustrating an example of the operation of the distance measurement process of the control device 600 according to the fourth example embodiment of the present disclosure.

In the example illustrated in FIG. 30, the measurement control unit 640 controls the first flying object 700A in such a way that the distance to the second flying object 700B is measured (step S241). Specifically, the measurement control unit 640 transmits an instruction to measure the distance to the first flying object 700A. The distance acquisition unit 650 acquires the measured distance (that is, the first distance) from the first flying object 700A (step S242).

The measurement control unit 640 controls the second flying object 700B in such a way that the distance to the first flying object 700A is measured (step S243). Specifically, the measurement control unit 640 transmits an instruction to measure the distance to the second flying object 700B. The distance acquisition unit 650 acquires the measured distance (that is, the second distance) from the second flying object 700B (step S244).

Next, the estimation unit 660 estimates the distance between the first flying object 700A and the second flying object 700B from the first distance and the second distance (step S245). The estimation unit 660 estimates the distance between the first target device 400A and the second target device 400B from the distance between the first flying object 700A and the second flying object 700B. The estimation unit 660 sets the distance between the first flying object 700A and the second flying object 700B as the distance between the first target device 400A and the second target device 400B.

The example illustrated in FIG. 30 is an example in which both the first flying object 700A and the second flying object 700B measure the distance to another flying object. One of the first flying object 700A and the second flying object 700B may measure the distance to another flying object. In this case, the control device 600 performs the operations of steps S241 and S242 or the operations of steps S243 and S244. In step S245, the control device 600 estimates the distance between the first flying object 700A and the second flying object 700B only from the obtained distance.

Next, the operation of the flying object 700 according to the fourth example embodiment of the present disclosure will be described in detail with reference to the drawings.

Figure 31:
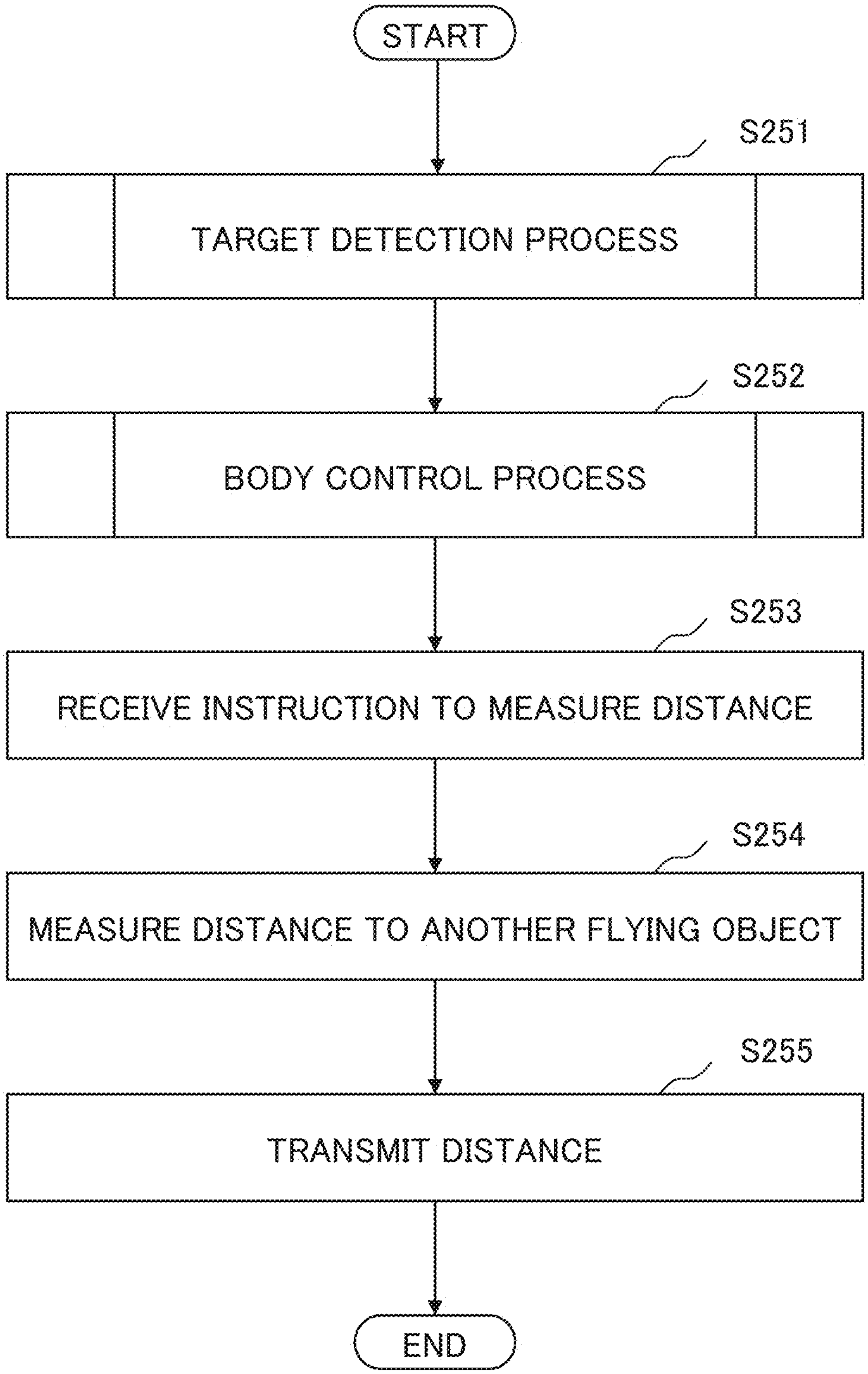
FIG. 31 is a flowchart illustrating an entire example of the operation of the flying object according to the fourth example embodiment of the present disclosure.

FIG. 31 is a flowchart illustrating an example of the entire operation of the flying object 700 according to the fourth example embodiment of the present disclosure. In the example illustrated in FIG. 31, the flying object 700 performs a target detection process (step S251). Next, the flying object 700 performs a body control process (step S252). Next, the instruction reception unit 710 receives an instruction to measure the distance (that is, the instruction to measure the distance described above) (step S253). The distance measurement unit 736 measures the distance to the another flying object 700 (step S254). Finally, the distance transmission unit 780 transmits the obtained distance (step S255).

The operation of the body control process of the first flying object 700A is different from the operation of the body control process of the second flying object 700B. The second flying object 700B does not need to perform the operation of step S251. In a case where the estimation unit of the control device 600 is configured to estimate the distance between the first flying object 700A and the second flying object 700B from the first distance, the second flying object 700B does not need to perform the operations of step S253 and step S254.

Figure 32:
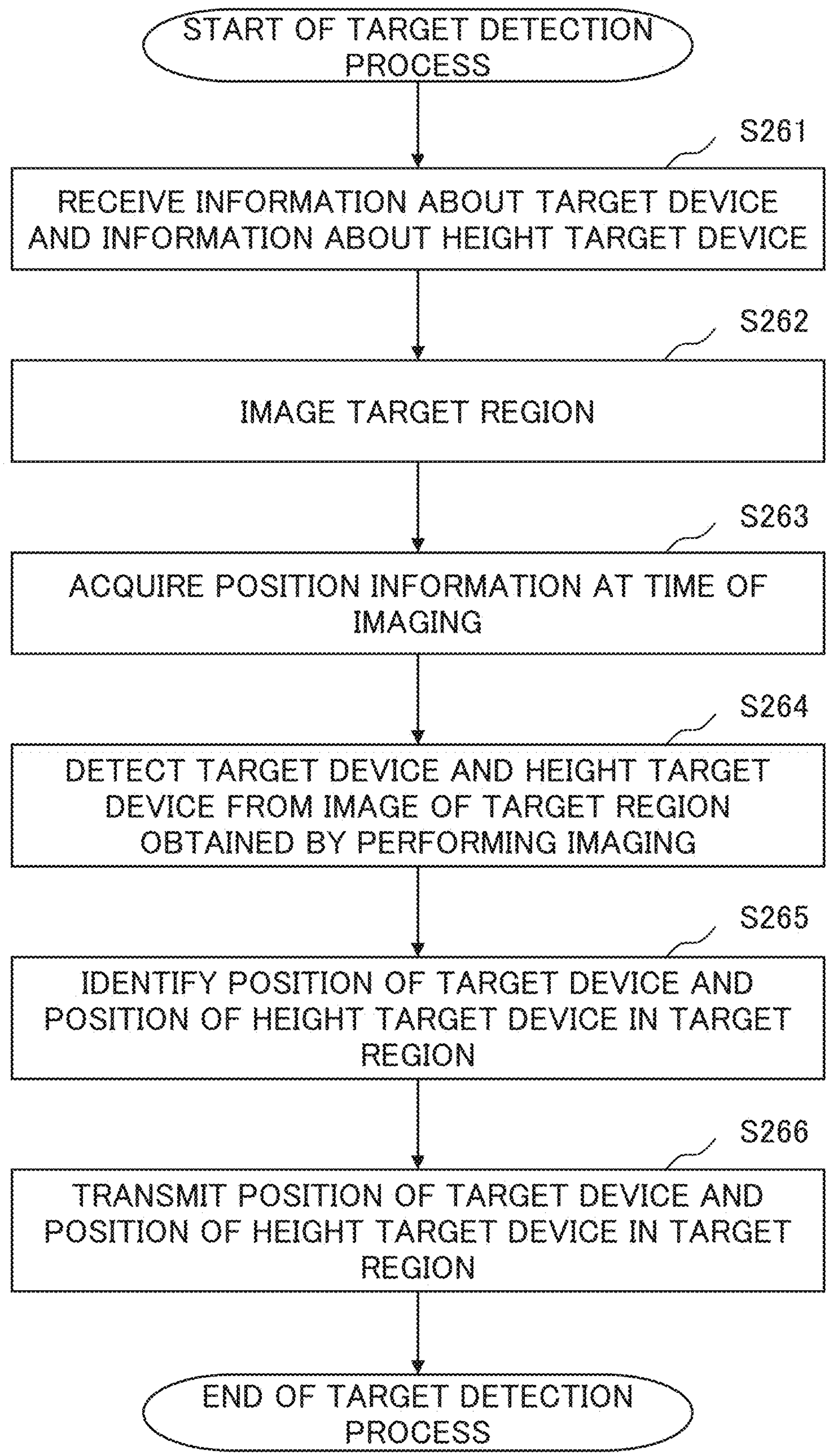
FIG. 32 is a flowchart illustrating an example of an operation of a target detection process of the flying object according to the fourth example embodiment of the present disclosure.

FIG. 32 is a flowchart illustrating an example of the operation of the target detection process for the flying object 700 according to the fourth example embodiment of the present disclosure. In the example illustrated in FIG. 32, first, the target information reception unit 750 receives information about the target device 400 (that is, the first target device 400A and the second target device 400B) and information about the height target device 500 (step S261). Next, the target image acquisition unit 751 images the target region using the measurement control unit 720 and the target image capturing unit 731 (step S262). The target image acquisition unit 751 further acquires position information at the time of imaging using the measurement control unit 720 and the position information acquisition unit 732 (step S263). The information about the position at the time of imaging is information about the position at which the flying object 700 has imaged the target region.

Next, when receiving an instruction to detect a target, the target detection unit 752 detects the target device 400 and the height target device 500 from the image of the target region obtained by performing imaging (step S254). The image of the target region obtained by performing imaging is the above-described target image. Next, the target position identification unit 753 identifies the position of the target device 400 and the position of the height target device 500 in the target region (step S265). The target position identification unit 753 transmits the position of the target device 400 and the position of the height target device 500 in the target region to the control device 600 (step S266).

FIGS. 33, 34, 35, and 36 are flowcharts illustrating an example of the operation of the body control process of the first flying object 700A according to the fourth example embodiment of the present disclosure.

Figure 33:
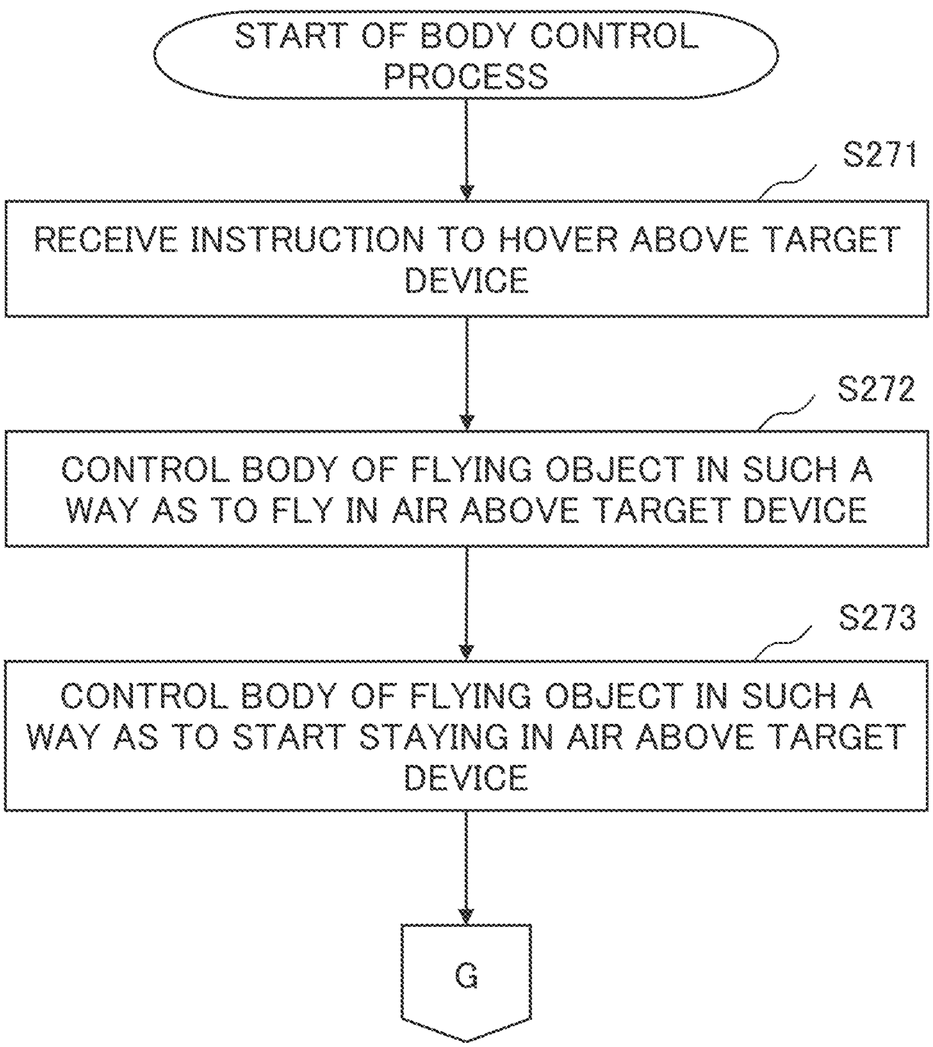
FIG. 33 is a flowchart illustrating an example of an operation of a body control process of the flying object according to the fourth example embodiment of the present disclosure.

In the operation illustrated in FIG. 33, the instruction reception unit 710 receives an instruction to hover above the target device 400 (here, the first target device 400A) (step S271). The instruction to hover above the target device 400 is the above-described instruction to move to the air above the target device 400. Upon receiving the instruction to move to the air above the target device 400, the body control unit 730 controls the body of the flying object 700 (here, the first flying object 700A) in such a way as to fly to the air above the target device 400 (step S272). The body control unit 730 controls the body of the flying object 700 (here, the first flying object 700A) in such a way as to start staying in the air above the target device 400 (step S273).

Figure 34:
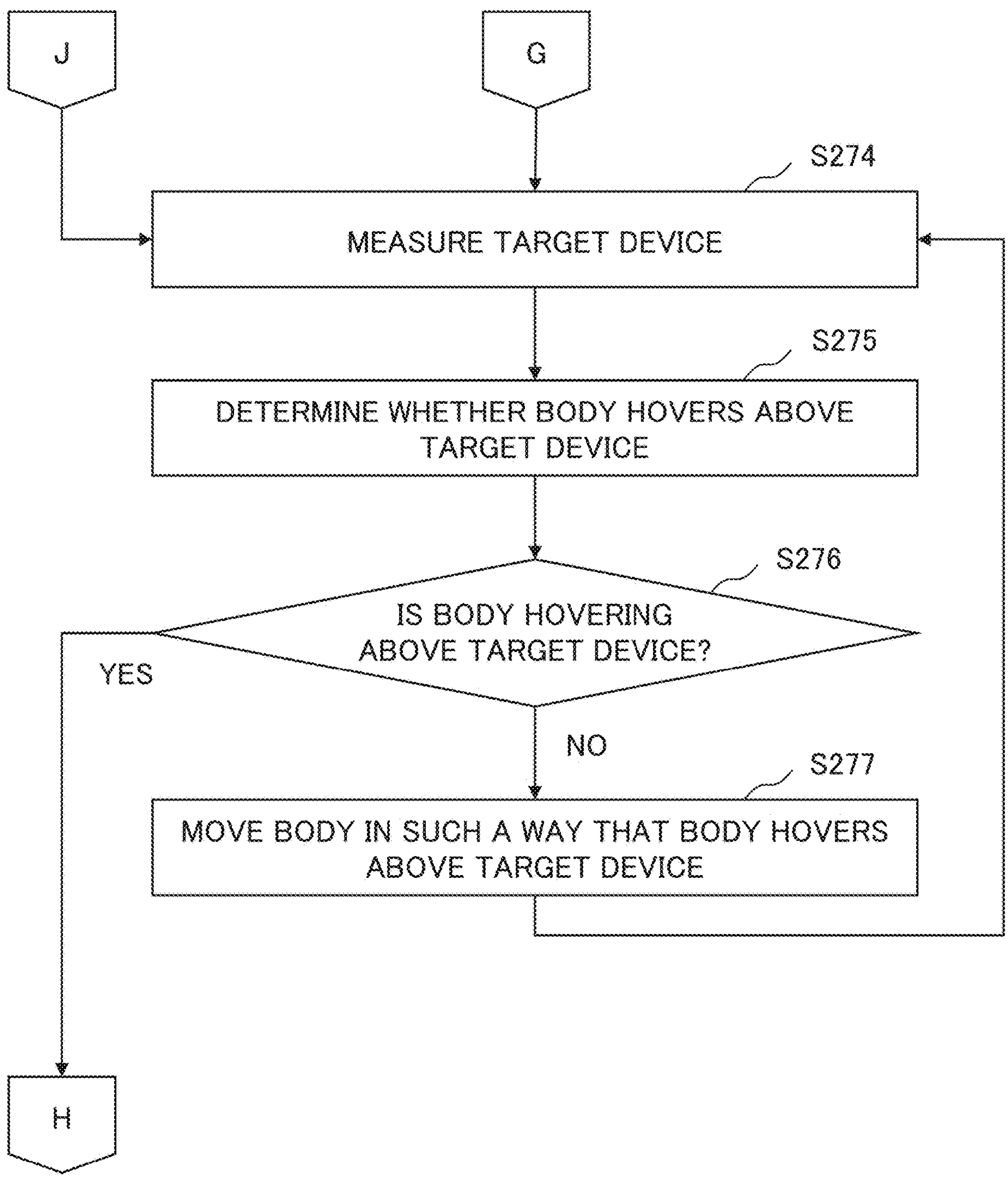
FIG. 34 is a flowchart illustrating an example of the operation of the body control process of the flying object according to the fourth example embodiment of the present disclosure.

In the operation illustrated in FIG. 34, the body control unit 730 starts position adjustment. In the position adjustment, the target measurement unit 733 measures the target device (here, the first target device 400A) (step S274). The body control unit 730 determines whether the body is staying in the air above the target device 400 using the position of the reference point of the target device 400 detected from the measurement data obtained by the measurement (step S275). When the body is not staying in the air above the target device 400 (NO in step S276), the body control unit 730 moves the body in such a way that the body hovers above the target device 400 (step S277). The flying object 700 repeats the operations in and after step S273. When the body is staying in the air above the target device 400 (YES in step S276), the flying object 200 then performs the operation of step S278 in FIG. 35.

Figure 35:
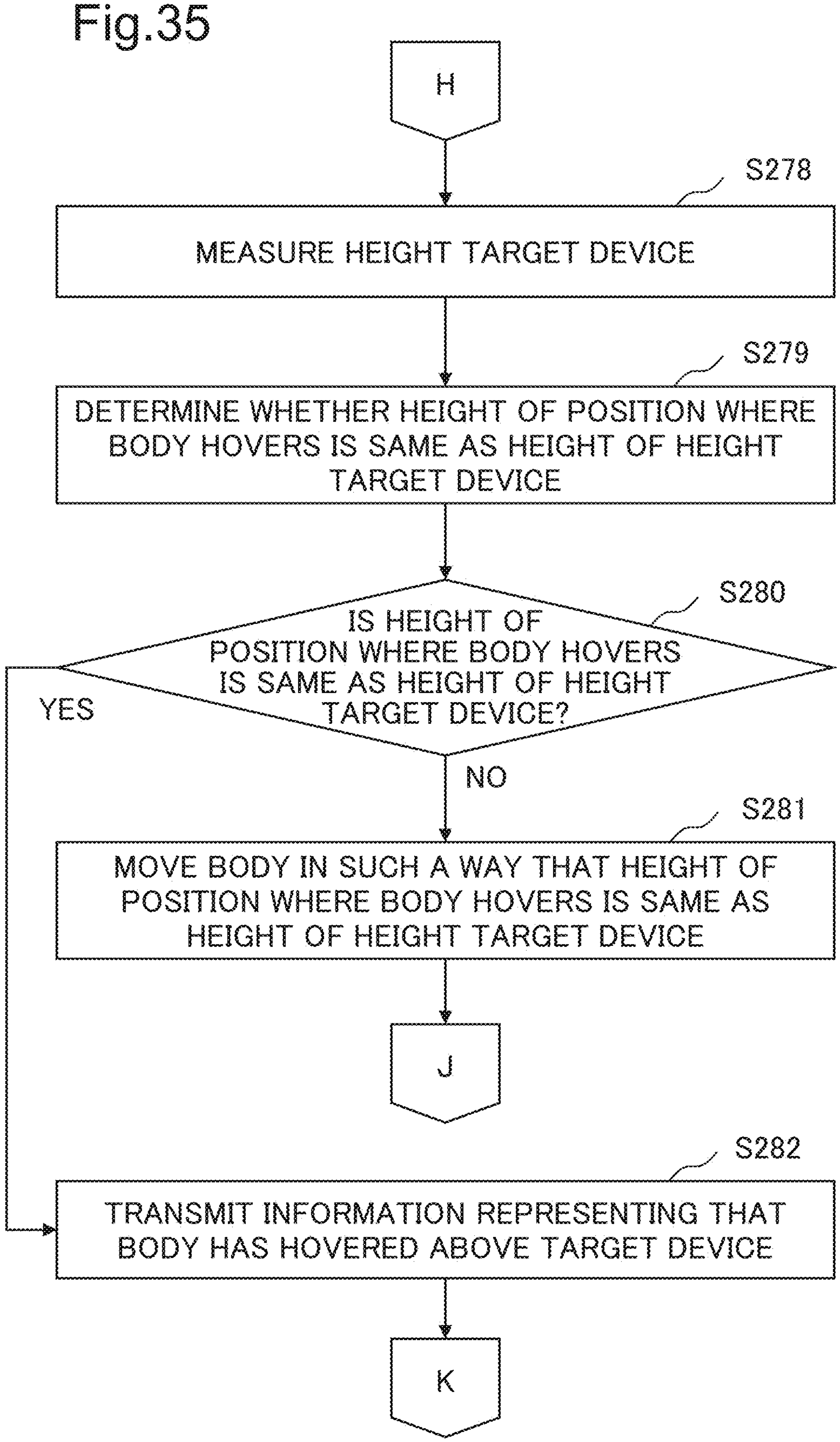
FIG. 35 is a flowchart illustrating an example of the operation of the body control process of the flying object according to the fourth example embodiment of the present disclosure.

In the operation illustrated in FIG. 35, the height target measurement unit 734 measures the height target device 500 (step S278). The body control unit 730 determines whether the height of the position where the body hovers is equal to the height of the height target device 500 (step S279). When the height of the position where the body hovers is not equal to the height of the height target device 500 (NO in step S280), the body control unit 730 moves the body using the motion control unit 740 in such a way that the height of the position where the body hovers is equal to the height of the height target device 500 (step S281). The flying object 200 repeats the operations in and after step S274.

When the height of the position where the body hovers is equal to the height of the height target device 500 (YES in step S280), information indicating that the body hovers above the target device is transmitted (step S282). The information indicating that the body hovers above the target device is the above-described notification of the end of the movement. Next, the flying object 700 performs the operation of step S283. The flying object 700 performs the operation of step S282 only once for the first time in the series of operations of the flying object 700 of FIGS. 33, 34, 35, and 36. In other words, in a case where step S282 is repeated twice or more, in the second and subsequent steps S282, the body control unit 730 does not transmit information indicating that the body hovers above the target device.

Figure 36:
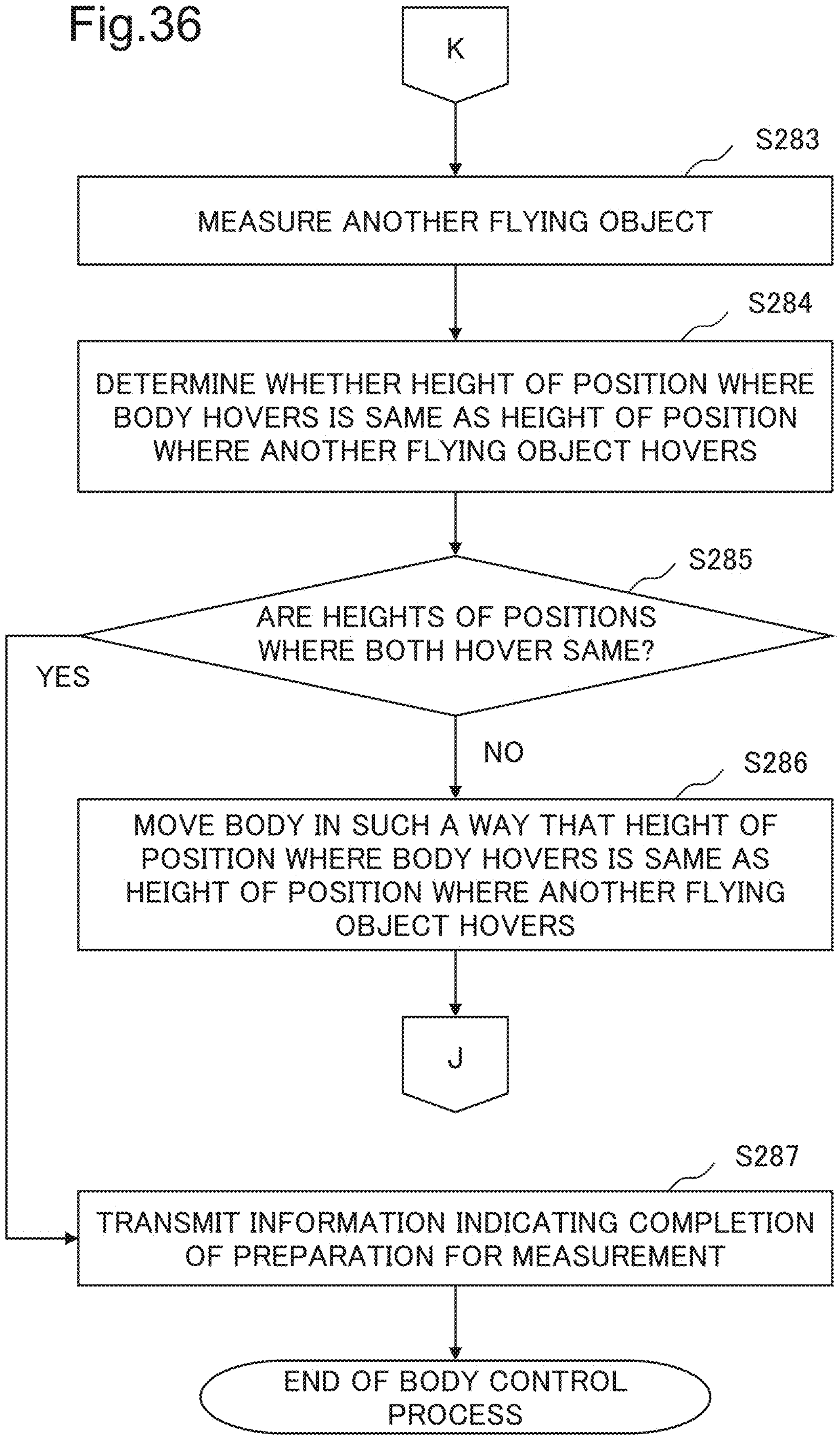
FIG. 36 is a flowchart illustrating an example of the operation of the body control process of the flying object according to the fourth example embodiment of the present disclosure.

In the operation of FIG. 36, when receiving the instruction of the second height adjustment, the body control unit 730 measures the another flying object 700 (here, the second flying object 700B) using the measurement control unit 720 and the flying object measurement unit 735 (step S283). The body control unit 730 determines whether the height of the position where the body of the flying object 200 hovers is equal to the height of the position where the another flying object 700 hovers (step S284). This body represents the body of the flying object 700 on which the body control unit 730 is mounted. When the heights of positions at which both (that is, the body and the another flying object 700) hover are not the same (NO in step S285), the body control unit 730 moves the body in such a way that the height of the position where the body hovers is equal to the height of the position where the another flying object 700 hovers (step S286). The flying object 200 repeats the operations in and after step S274. In this repetition, as described above, the flying object 700 does not perform the operation of step S282. In the second and subsequent steps S282, the body control unit 730 does not transmit information indicating that the body hovers above the target device.

When the heights of the positions where both (that is, the body and the another flying object 700) hover are the same (YES in step S285), the body control unit 730 transmits information indicating that the measurement preparation has ended to the control device 600 (step S287). The information indicating that the measurement preparation has ended is the above-described notification of the measurement preparation completion. The flying object 700 ends the operation of the body control process.

Figure 37:
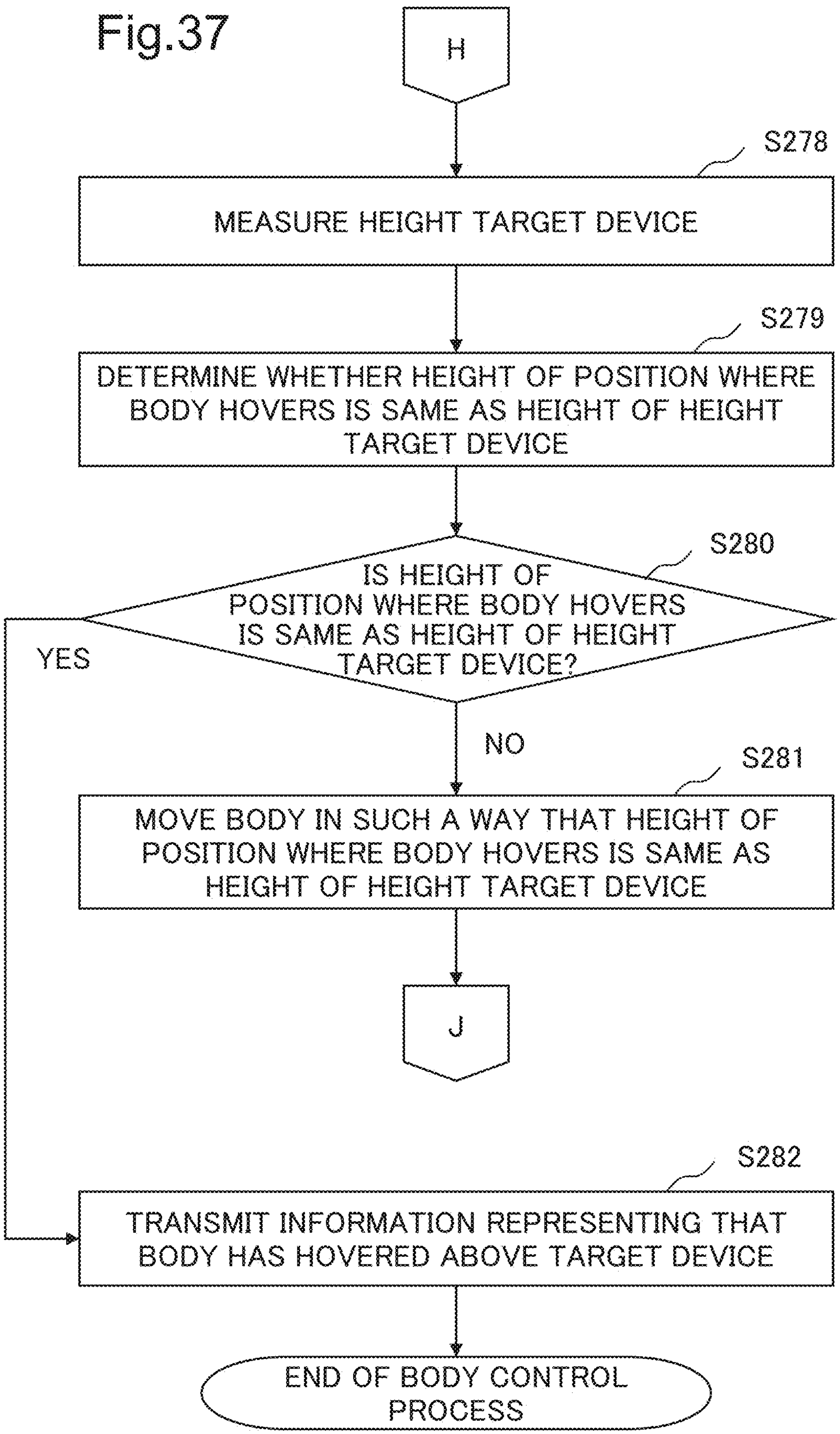
FIG. 37 is a flowchart illustrating another example of the operation of the body control process of the flying object according to the fourth example embodiment of the present disclosure.

FIGS. 33, 34, and 37 are flowcharts illustrating an example of the operation of the body control process of the second flying object 700B according to the fourth example embodiment of the present disclosure. In the operation illustrated in FIGS. 33 and 34, the second flying object 700B performs an operation similar to the operation illustrated in FIGS. 33 and 34 of the above-described first flying object 700A. However, in this case, the flying object 700 in the operation illustrated in FIGS. 33 and 34 is the second flying object 700B, the another flying object 700 is the first flying object 700A, and the target device 400 is the second target device 400B.

Of the operations illustrated in FIG. 37, the operations from step S279 to step S282 are the same as the operations from step S279 to step S282 illustrated in FIG. 35 except that the body is the body of the second flying object 700B. However, in the operation illustrated in FIG. 37, after the operation of step S282, the second flying object 700B ends the operation of the body control process.

<Effects>

The present example embodiment described above has the same effect as the third example embodiment. The reason is the same as the reason why the effect of the third example embodiment occurs.

First Modification of Fourth Example Embodiment

The target information transmission unit 610 transmits the read information about the first target device 400A, the read information about the second target device 400B, and the read information about the height target device 500 to the first flying object 700A. The target information transmission unit 610 transmits, to the first flying object 700A, information about the target region (for example, information indicating the range of the target region) and an instruction to detect the target device 400 and the height target device 500 in the target region.

Upon receiving the information about the target region and the instruction to detect the target device 400 and the height target device 500 in the target region, the first flying object 700A captures an image of the target region. The first flying object 700A detects the target device 400 and the height target device 500 in the target region using the captured image. Specifically, the first flying object 700A detects the image of the target device 400 and the image of the height target device 500 from the captured image. The first flying object 700A identifies the position of the target device 400 and the position of the height target device 500 in the target region. The first flying object 700A transmits the identified position of the target device 400 and the identified position of the height target device 500 to the target information transmission unit 610.

The target information transmission unit 610 transmits the read information about the first target device 400A, the read information indicating the position of the second target device 400B, and the read information about the height target device 500 to the first flying object 700A. The target information transmission unit 610 transmits the read information about the second target device 400B, the read information indicating the position of the second target device 400B, and the read information about the height target device 500 to the second flying object 700B.

Second Modification of Fourth Example Embodiment

In the present modification, the information about the plurality of sequenced first target devices 400A and the information about the plurality of sequenced second target devices 400B in the second modification of the second example embodiment are given to the control device 600. The target detection unit 752 identifies the positions of all the first target devices 400A and the positions of all the second target devices 400B. The body control unit 730 controls the first flying object 700A and the second flying object 700B in such a way that the first flying object 700A hovers above the first target device 400A and the second flying object 700B hovers above the second target device 400B according to the order assigned to the first target device 400A and the second target device 400B. The body control unit 730 controls the first flying object 700A and the second flying object 700B in such a way that the second flying object 700B hovers above the second target device 400B to which the order same as the order assigned to the first target device 400A is assigned during a time period at least partially overlapping with a time period during which the first flying object 700A hovers above the first target device 400A. For each combination of the first target device 400A and the second target device 400B to which the same order is assigned, the distance acquisition unit 650 acquires the distance between the first flying object 700A hovering above the first target device 400A and the second flying object 700B hovering above the second target device 400B. The estimation unit 660 estimates the distance between the first target device 400A and the second target device 400B for each combination of the first target device 400A and the second target device 400B to which the same order is assigned. The output unit 670 outputs the distance between the first target device 400A and the second target device 400B for each combination of the first target device 400A and the second target device 400B to which the same order is assigned.

In the present modification, the flying object control unit 630 may transmit an order instruction indicating the order of the target device 400 to the first flying object 700A and the second flying object 700B. When the instruction reception unit 710 receives the order instruction in the first flying object 700A, the body control unit 730 controls the body in such a way that the body hovers above the first target device 400A in which the order in the plurality of first target devices 400A is the order indicated by the order instruction. When the instruction reception unit 710 receives the order instruction in the second flying object 700B, the body control unit 730 controls the body in such a way that the body hovers above the second target device 400B in which the order in the plurality of second target devices 400B is the order indicated by the order instruction.

The body control unit 730 of the first flying object 700A may control the body in such a way as to sequentially repeat the flight of the first target device 400A to the air in the order according to the order assigned to each of the plurality of first target devices 400A. The body control unit 730 of the second flying object 700B may control the body in such a way as to sequentially repeat the flight of the second target device 400B to the air in the order according to the order assigned to each of the plurality of first target devices 400A. At this time, the body control unit 730 of the first flying object 700A may transmit an instruction to fly to the air above the next second target device 400B to the second flying object 700B when controlling the first flying object 700A in such a way as to fly to the air above the next first target device 400A. When receiving an instruction to fly to the air above the next second target device 400B, the instruction reception unit 710 of the second target device 400B may perform control in such a way that the second flying object 700B flies to the air above the next second target device 400B according to the instruction.

Third Modification of Fourth Example Embodiment

In the present modification, the flying object control unit 130 does not perform the second direction adjustment and the second height adjustment.

In this case, the first flying object does not transmit the notification of the measurement preparation completion. Upon receiving the notification of the end of the movement from both the first flying object and the second flying object, the measurement control unit 640 may transmit an instruction to measure the distance.

Other Example Embodiments

The control device and the flying object according to the above-described example embodiments can be achieved using a computer including a memory in which a program read from a storage medium is loaded and a processor that executes the program. The control device and the flying object according to the above-described example embodiments can also be achieved by dedicated hardware. The control device and the flying object according to the above-described example embodiments can also be achieved by a combination of the above-described computer and dedicated hardware.

Figure 38:
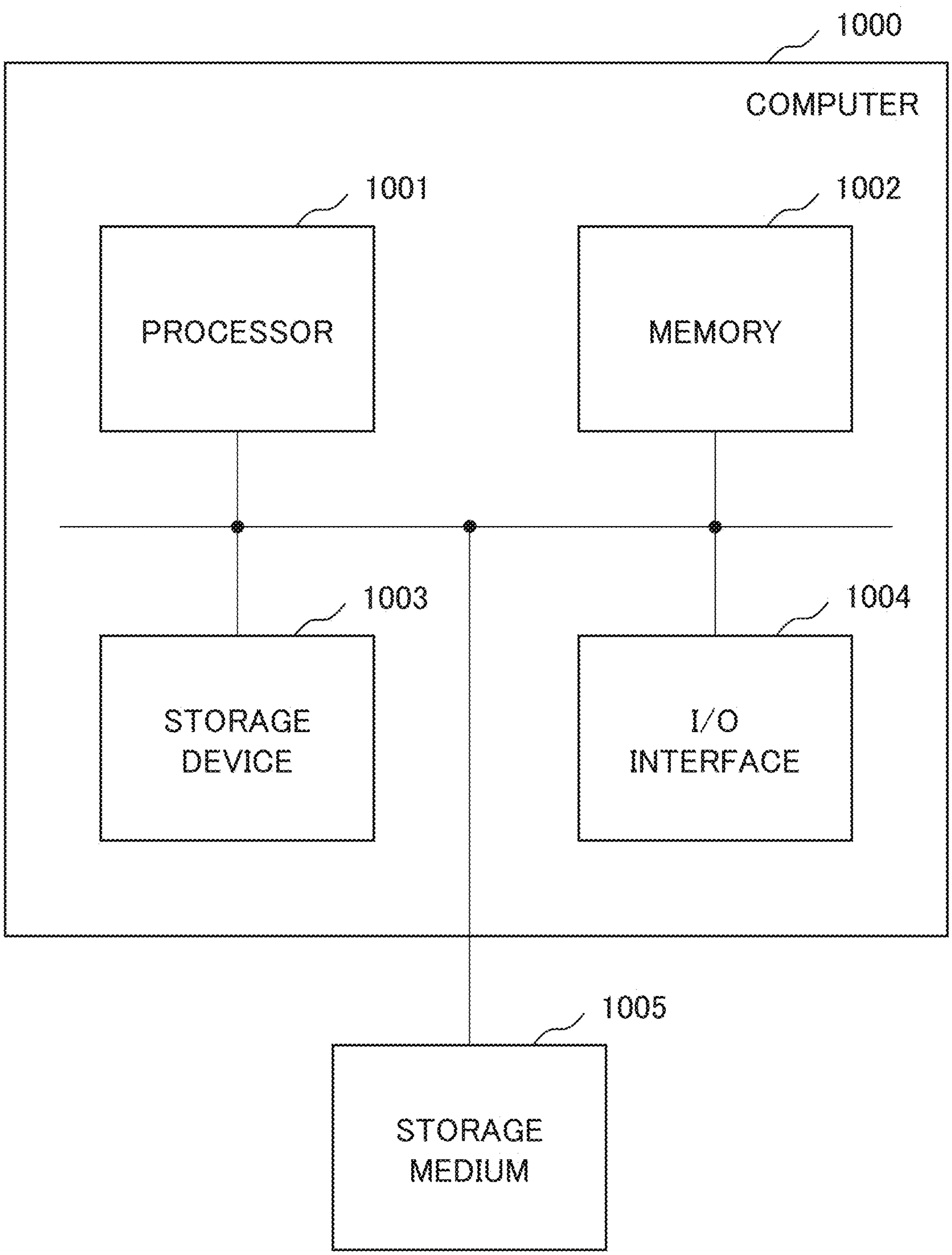
FIG. 38 is a diagram 38 illustrating an example of a hardware configuration of a computer 1000 capable of achieving the control device and the flying object according to the example embodiment of the present disclosure.

FIG. 38 is a diagram illustrating an example of a hardware configuration of a computer 1000 capable of achieving the control device and the flying object according to the example embodiment of the present disclosure. Referring to FIG. 38, a computer 1000 includes a processor 1001, a memory 1002, a storage device 1003, and an input/output (I/O) interface 1004. The computer 1000 can access a storage medium 1005. The memory 1002 and the storage device 1003 are, for example, storage devices such as a random access memory (RAM) and a hard disk. The storage medium 1005 is, for example, a storage device such as a RAM or a hard disk, a read only memory (ROM), or a portable storage medium. The storage device 1003 may be the storage medium 1005. The processor 1001 can read and write data and programs from and in the memory 1002 and the storage device 1003. The processor 1001 can access, for example, other devices via the I/O interface 1004. The processor 1001 may access the storage medium 1005. The storage medium 1005 stores a program for operating the computer 1000 as the control device according to the example embodiment of the present disclosure or a program for operating the computer 1000 as the flying object according to the example embodiment of the present disclosure.

The processor 1001 loads a program that is stored in the storage medium 1005 and causes the computer 1000 to operate as the control device according to the example embodiment of the present disclosure into the memory 1002. The processor 1001 executes the program loaded in the memory 1002, whereby the computer 1000 operates as the control device according to the example embodiment of the present disclosure.

The processor 1001 loads, into the memory 1002, a program that is stored in the storage medium 1005 and causes the computer 1000 to operate as the flying object according to the example embodiment of the present disclosure. The processor 1001 executes the program loaded in the memory 1002, whereby the computer 1000 operates as the flying object according to the example embodiment of the present disclosure.

The target detection unit 110, the target position identification unit 120, the flying object control unit 130, the position target detection unit 131, the height target detection unit 132, the measurement control unit 140, and the distance acquisition unit 150 can be achieved by the processor 1001 that executes a program loaded in the memory 1002. The estimation unit 160, the output unit 170, the target image acquisition unit 181, the position information acquisition unit 182, the target measurement result acquisition unit 183, the height measurement result acquisition unit 184, and the flying object measurement result acquisition unit 185 can be achieved by the processor 1001 that executes a program loaded in the memory 1002. The transmission/reception unit 210, the measurement control unit 220, and the motion control unit 240 can be achieved by the processor 1001 that executes a program loaded in the memory 1002. The target image capturing unit 231, the position information acquisition unit 232, the target measurement unit 233, the height target measurement unit 234, the flying object measurement unit 235, and the distance measurement unit 236 can be achieved by the processor 1001 that executes a program loaded in the memory 1002. The target information transmission unit 610, the flying object control unit 630, the measurement control unit 640, the distance acquisition unit 650, the estimation unit 660, and the output unit 670 can be achieved by the processor 1001 that executes a program loaded in the memory 1002. The instruction reception unit 710, the measurement control unit 720, the body control unit 730, the motion control unit 740, the target information reception unit 750, the target image acquisition unit 751, the target detection unit 752, and the target position identification unit 753 can be achieved by the processor 1001 that executes a program loaded in the memory 1002. The position target detection unit 760, the height target detection unit 770, and the distance transmission unit 780 can be achieved by the processor 1001 that executes a program loaded in the memory 1002. The target image capturing unit 731, the position information acquisition unit 732, the target measurement unit 733, the height target measurement unit 734, the flying object measurement unit 735, and the distance measurement unit 736 can be achieved by the processor 1001 that executes a program loaded in the memory 1002.

The target information storage unit 620 can be achieved by the storage device 1003 such as the memory 1002 and a hard disk device included in the computer 1000.

Some or all of the target detection unit 110, the target position identification unit 120, the flying object control unit 130, the position target detection unit 131, the height target detection unit 132, the measurement control unit 140, and the distance acquisition unit 150 can be achieved by a dedicated circuit that implements the functions of the respective units. Some or all of the estimation unit 160, the output unit 170, the target image acquisition unit 181, the position information acquisition unit 182, the target measurement result acquisition unit 183, the height measurement result acquisition unit 184, and the flying object measurement result acquisition unit 185 can be achieved by a dedicated circuit that implements the functions of the respective units. Some or all of the transmission/reception unit 210, the measurement control unit 220, and the motion control unit 240 can be achieved by a dedicated circuit that implements the functions of the respective units. Some or all of the target image capturing unit 231, the position information acquisition unit 232, the target measurement unit 233, the height target measurement unit 234, the flying object measurement unit 235, and the distance measurement unit 236 can be achieved by a dedicated circuit that implements the functions of the respective units. Some or all of the target information transmission unit 610, the target information storage unit 620, the flying object control unit 630, the measurement control unit 640, the distance acquisition unit 650, the estimation unit 660, and the output unit 670 can be achieved by a dedicated circuit that implements the functions of the respective units. Some or all of the instruction reception unit 710, the measurement control unit 720, the body control unit 730, the motion control unit 740, the target information reception unit 750, the target image acquisition unit 751, the target detection unit 752, and the target position identification unit 753 can be achieved by a dedicated circuit that implements the function of each unit.

Some or all of the position target detection unit 760, the height target detection unit 770, and the distance transmission unit 780 can be achieved by a dedicated circuit that implements the functions of the respective units. Some or all of the target image capturing unit 731, the position information acquisition unit 732, the target measurement unit 733, the height target measurement unit 734, the flying object measurement unit 735, and the distance measurement unit 736 can be achieved by a dedicated circuit that implements the functions of the respective units.

Some or all of the above example embodiments may be denoted as the following Supplementary Notes, but are not limited to the following.

Supplementary Note 1

A control device including:

a flying object control unit configured to control a first flying object and a second flying object in such a way that the first flying object hovers above a first target device, and the second flying object hovers above a second target device, a measurement control unit configured to control the first flying object in such a way that the first flying object measure a first distance to the second flying object in response to the first flying object hovering above the first target device and the second flying object hovering above the second target device, and a distance acquisition unit configured to acquire the measured first distance from the first flying object.

Supplementary Note 2

The control device according to Supplementary Note 1, wherein the flying object control unit performs control in such a way that at least one of the first flying object or the second flying object flies while capturing an image of a ground of a target region in which the first target device and the second target device are placed to transmit the image, the control device includes:

a target image reception unit configured to receive the image;

a target detection unit configured to detect, from the image, the first target device and the second target device; and a target position identification unit configured to identify a position of the first target device and a position of the second target device in the target region, and the flying object control unit controls the first flying object and the second flying object using the identified position of the first target device and the identified position of the second target device.

Supplementary Note 3

The control device according to Supplementary Note 1 or 2, wherein the first target device is included in a first target device row that is a set of a plurality of sequenced first target devices, the second target device is included in a second target device row that is a set of a plurality of sequenced second target devices, the flying object control unit controls the first flying object and the second flying object in such a way that the second flying object hovers above the second target device whose order in the second target device row is the same as an order of the first target device in the first target device row during a second time period at least part of which is common to a first time period during which the first flying object hovers above the first target device, and the measurement control unit controls the first flying object in such a way that the first flying object measures a distance to the second flying object in a common time period between the first time period and the second time period.

Supplementary Note 4

The control device according to Supplementary Note 3, wherein the flying object control unit controls the first flying object and the second flying object in such a way that the first flying object repeats hovering above the first target device and flying to an air above the next first target device according to an order in the first target device row, and that the second flying object repeats hovering above the second target device and flying to an air above the next second target device according to an order in the second target device row.

Supplementary Note 5

The control device according to any one of Supplementary Notes 1 to 4, further including a height target measurement result acquisition unit configured to acquire, from the first flying object, first height target measurement data that is a result of the first flying object measuring a height target device, and to acquire, from the second flying object, second height target measurement data that is a result of the second flying object measuring the height target device, wherein the flying object control unit controls the first flying object and the second flying object in such a way that the first flying object and the second flying object hover at a height equal to a height of the height target device, using the first height target measurement data and the second height target measurement data.

Supplementary Note 6

The control device according to any one of Supplementary Notes 1 to 5, further including a flying object measurement result acquisition unit configured to acquire, from the first flying object, second flying object measurement data that is a result of the first flying object measuring the second flying object, and to acquire, from the second flying object, first flying object measurement data that is a result of the second flying object measuring the first flying object, wherein the flying object control unit controls the first flying object and the second flying object using the first flying object measurement data and the second flying object measurement data in such a way that each of a height of the first flying object and a height of the second flying object is equal to a height of the height target device.

Supplementary Note 7

The control device according to any one of Supplementary Notes 1 to 6, further including:

an estimation unit configured to estimate an estimated distance that is a distance between the first target device and the second target device, using the first distance; and an output unit configured to output the estimated distance.

Supplementary Note 8

The control device according to Supplementary Note 7, wherein the measurement control unit controls the second flying object in such a way that the second flying object further measures a second distance to the first flying object in response to the first flying object reaching an air above the first target device and the second flying object reaching an air above the second target device, the distance acquisition unit further acquires the measured first distance from the second flying object, and the estimation unit estimates the estimated distance using the first distance and the second distance.

Supplementary Note 9

A measurement system including the control device according to any one of Supplementary Notes 1 to 8, the measurement system including:

the first flying object; the second flying object; the first target device; and the second target device.

Supplementary Note 10

A flying object including:

a target image capturing unit configured to capture an image of a target region;

a target detection unit configured to detect a first target device from the target region using the image of the target region;

a body control unit configured to control a position of a body in such a way that the body moves to and hovers in an air above the detected first target device;

a distance measurement unit configured to measure, in the air above the first target device, a distance to another flying object hovering above the second target device; and a distance transmission unit configured to transmit the distance.

Supplementary Note 11

The flying object according to Supplementary Note 10, further including a target information reception unit configured to receive information about a first target device row that is a set of a plurality of first target devices sequenced, wherein the target detection unit detects the plurality of first target devices in the first target device row in the target region, from an image of the target region, the body control unit controls the body in such a way that the body hovers above the first target device, included in the first target device row, whose order in the first target device row is the same as an order of the second target device in the second target device row during a first time period at least part of which is common to a second time period during which the another flying object hovers above the second target device included in a second target device row that is a set of a plurality of second target devices sequenced, and the distance measurement unit measures the distance to the another flying object in a common time period between the first time period and the second time period.

Supplementary Note 12

The flying object according to Supplementary Note 11, further including an instruction reception unit configured to receive an order instruction indicating a designated order, wherein the body control unit controls the body in such a way that the body hovers above the first target device whose order in the first target device row is the designated order indicated by the designated order, during the first time period at least part of which is common to the second time period during which the another flying object hovers above the second target device whose order in the second target device row is the designated order indicated by the designated order.

Supplementary Note 13

The flying object according to Supplementary Note 11, wherein the body control unit controls the body in such a way that the body repeats hovering above the first target device and flying to an air above the next first target device according to an order in the first target device row, and the flying object further includes an instruction transmission unit configured to instruct, when the flying object starts flying to the air above the next first target device, the another flying object that repeats hovering above the second target device and flying to an air above the next second target device to fly to the air above the next second target device according to an order in the second target device row.

Supplementary Note 14

The flying object according to any one of Supplementary Notes 10 to 13, further including a height target measurement unit configured to measure a height target device, wherein the body control unit controls a height of a position where the body hovers in such a way that a height of the height target device is equal to the height of the position where the body hovers, using a result of a measurement of the height target device.

Supplementary Note 15

The flying object according to Supplementary Note 14, further including a flying object measurement unit configured to measure the another flying object after controlling the height of the position where the body hovers in such a way that a height of the height target device is equal to the height of the position where the body hovers, wherein the body control unit controls the height of the position where the body hovers in such a way that a height of a position where the another flying object hovers is equal to the height of the position where the body hovers, using a result of a measurement of the another flying object.

Supplementary Note 16

The flying object according to any one of Supplementary Notes 10 to 13, further including a flying object measurement unit configured to measure the another flying object, wherein the body control unit controls a height of a position where the body hovers in such a way that a height of a position where the another flying object hovers is equal to a height of a position where the body hovers using a result of a measurement of the another flying object.

Supplementary Note 17

A control method including:

controlling a first flying object and a second flying object in such a way that the first flying object hovers above a first target device, and the second flying object hovers above a second target device;

controlling the first flying object in such a way that the first flying object measure a first distance to the second flying object in response to the first flying object hovering above the first target device and the second flying object hovering above the second target device; and acquiring the measured first distance from the first flying object.

Supplementary Note 18

The control method according to Supplementary Note 17, the method further including:

performing control in such a way that at least one of the first flying object or the second flying object flies while capturing an image of a ground of a target region in which the first target device and the second target device are placed to transmit the image;

receiving the image;

a target detection unit detecting, from the image, the first target device and the second target device;

identifying a position of the first target device and a position of the second target device in the target region; and controlling the first flying object and the second flying object using the identified position of the first target device and the identified position of the second target device.

Supplementary Note 19

The control method according to Supplementary Note 17 or 18, wherein the first target device is included in a first target device row that is a set of a plurality of sequenced first target devices, and the second target device is included in a second target device row that is a set of a plurality of sequenced second target devices, the method further including:

controlling the first flying object and the second flying object in such a way that the second flying object hovers above the second target device whose order in the second target device row is the same as an order of the first target device in the first target device row during a second time period at least part of which is common to a first time period during which the first flying object hovers above the first target device; and controlling the first flying object in such a way that the first flying object measures a distance to the second flying object in a common time period between the first time period and the second time period.

Supplementary Note 20

The control method according to Supplementary Note 19, the method further including controlling the first flying object and the second flying object in such a way that the first flying object repeats hovering above the first target device and flying to an air above the next first target device according to an order in the first target device row, and that the second flying object repeats hovering above the second target device and flying to an air above the next second target device according to an order in the second target device row.

Supplementary Note 21

The control method according to any one of Supplementary Notes 17 to 20, the method further including:

acquiring, from the first flying object, first height target measurement data that is a result of the first flying object measuring a height target device, and acquiring, from the second flying object, second height target measurement data that is a result of the second flying object measuring the height target device; and controlling the first flying object and the second flying object in such a way that the first flying object and the second flying object hover at a height equal to a height of the height target device, using the first height target measurement data and the second height target measurement data.

Supplementary Note 22

The control method according to any one of Supplementary Notes 17 to 21, the method further including:

acquiring, from the first flying object, second flying object measurement data that is a result of the first flying object measuring the second flying object, and to acquire, from the second flying object, first flying object measurement data that is a result of the second flying object measuring the first flying object; and controlling the first flying object and the second flying object using the first flying object measurement data and the second flying object measurement data in such a way that each of a height of the first flying object and a height of the second flying object is equal to a height of the height target device.

Supplementary Note 23

The control method according to any one of Supplementary Notes 17 to 22, the method further including:

estimating an estimated distance that is a distance between the first target device and the second target device, using the first distance; and outputting the estimated distance.

Supplementary Note 24

The control method according to Supplementary Note 23, the method further including:

controlling the second flying object in such a way that the second flying object further measures a second distance to the first flying object in response to the first flying object reaching an air above the first target device and the second flying object reaching an air above the second target device;

further acquiring the measured first distance from the second flying object; and estimating the estimated distance using the first distance and the second distance.

Supplementary Note 25

A flying object control method including:

capturing an image of a target region;

detecting a first target device from the target region using the image of the target region;

controlling a position of a body in such a way that the body moves to and hovers in an air above the detected first target device;

measuring, in the air above the first target device, a distance to another flying object hovering above the second target device; and transmitting the distance.

Supplementary Note 26

The flying object control method according to Supplementary Note 25, the method further including:

receiving information about a first target device row that is a set of a plurality of first target devices sequenced;

detecting the plurality of first target devices in the first target device row in the target region, from an image of the target region;

controlling the body in such a way that the body hovers above the first target device, included in the first target device row, whose order in the first target device row is the same as an order of the second target device in the second target device row during a first time period at least part of which is common to a second time period during which the another flying object hovers above the second target device included in a second target device row that is a set of a plurality of second target devices sequenced; and measuring the distance to the another flying object in a common time period between the first time period and the second time period.

Supplementary Note 27

The flying object control method according to Supplementary Note 26, the method further including:

receiving an order instruction indicating a designated order; and controlling the body in such a way that the body hovers above the first target device whose order in the first target device row is the designated order indicated by the designated order, during the first time period at least part of which is common to the second time period during which the another flying object hovers above the second target device whose order in the second target device row is the designated order indicated by the designated order.

Supplementary Note 28

The flying object control method according to Supplementary Note 26, the method further including:

controlling the body in such a way that the body repeats hovering above the first target device and flying to an air above the next first target device according to an order in the first target device row; and instructing, when the flying object starts flying to the air above the next first target device, the another flying object that repeats hovering above the second target device and flying to an air above the next second target device to fly to the air above the next second target device according to an order in the second target device row.

Supplementary Note 29

The flying object control method according to any one of Supplementary Notes 25 to 28, the method further including:

measuring a height target device; and controlling a height of a position where the body hovers in such a way that a height of the height target device is equal to the height of the position where the body hovers, using a result of a measurement of the height target device.

Supplementary Note 30

The flying object control method according to Supplementary Note 29, the method further including:

measuring the another flying object after controlling the height of the position where the body hovers in such a way that a height of the height target device is equal to a height of a position where the body hovers; and controlling the height of the position where the body hovers in such a way that a height of a position where the another flying object hovers is equal to the height of the position where the body hovers, using a result of a measurement of the another flying object.

Supplementary Note 31

The flying object control method according to any one of Supplementary Notes 25 to 28, the method further including:

measuring the another flying object; and controlling a height of a position where the body hovers in such a way that a height of a position where the another flying object hovers is equal to a height of a position where the body hovers using a result of a measurement of the another flying object.

Supplementary Note 32

A storage medium storing a program for causing a computer to execute:

a flying object control process of controlling a first flying object and a second flying object in such a way that the first flying object hovers above a first target device, and the second flying object hovers above a second target device;

a measurement control process of controlling the first flying object in such a way that the first flying object measure a first distance to the second flying object in response to the first flying object hovering above the first target device and the second flying object hovering above the second target device; and a distance acquisition process of acquiring the measured first distance from the first flying object.

Supplementary Note 33

The storage medium according to Supplementary Note 32, wherein the flying object control process includes performing control in such a way that at least one of the first flying object or the second flying object flies while capturing an image of a ground of a target region in which the first target device and the second target device are placed to transmit the image, the program causes the computer to execute:

a target image reception process of receiving the image;

a target detection unit detecting, from the image, the first target device and the second target device; and a target position identification process of identifying a position of the first target device and a position of the second target device in the target region, and the flying object control process includes controlling the first flying object and the second flying object using the identified position of the first target device and the identified position of the second target device.

Supplementary Note 34

The storage medium according to Supplementary Note 32 or 33, wherein the first target device is included in a first target device row that is a set of a plurality of sequenced first target devices, the second target device is included in a second target device row that is a set of a plurality of sequenced second target devices, the flying object control process includes controlling the first flying object and the second flying object in such a way that the second flying object hovers above the second target device whose order in the second target device row is the same as an order of the first target device in the first target device row during a second time period at least part of which is common to a first time period during which the first flying object hovers above the first target device, and the measurement control process includes controlling the first flying object in such a way that the first flying object measures a distance to the second flying object in a common time period between the first time period and the second time period.

Supplementary Note 35

The storage medium according to Supplementary Note 34, wherein the flying object control process includes controlling the first flying object and the second flying object in such a way that the first flying object repeats hovering above the first target device and flying to an air above the next first target device according to an order in the first target device row, and that the second flying object repeats hovering above the second target device and flying to an air above the next second target device according to an order in the second target device row.

Supplementary Note 36

The storage medium according to any one of Supplementary Notes 32 to 35, the program causing the computer to further execute a height target measurement result acquisition process of acquiring, from the first flying object, first height target measurement data that is a result of the first flying object measuring a height target device, and acquiring, from the second flying object, second height target measurement data that is a result of the second flying object measuring the height target device, wherein the flying object control process includes controlling the first flying object and the second flying object in such a way that the first flying object and the second flying object hover at a height equal to a height of the height target device, using the first height target measurement data and the second height target measurement data.

Supplementary Note 37

The storage medium according to any one of Supplementary Notes 32 to 36, the program causing the computer to further execute a flying object measurement result acquisition process of acquiring, from the first flying object, second flying object measurement data that is a result of the first flying object measuring the second flying object, and to acquire, from the second flying object, first flying object measurement data that is a result of the second flying object measuring the first flying object, wherein the flying object control process includes controlling the first flying object and the second flying object using the first flying object measurement data and the second flying object measurement data in such a way that each of a height of the first flying object and a height of the second flying object is equal to a height of the height target device.

Supplementary Note 38

The storage medium according to any one of Supplementary Notes 32 to 37, the program causing a computer to further execute:

an estimation process of estimating an estimated distance that is a distance between the first target device and the second target device, using the first distance; and an output process of outputting the estimated distance.

Supplementary Note 39

The storage medium according to Supplementary Note 38, wherein the measurement control process includes controlling the second flying object in such a way that the second flying object further measures a second distance to the first flying object in response to the first flying object reaching an air above the first target device and the second flying object reaching an air above the second target device, the distance acquisition process includes further acquiring the measured first distance from the second flying object, and the estimation process includes estimating the estimated distance using the first distance and the second distance.

Supplementary Note 40

A storage medium storing a program for causing a computer to execute:

a target image capturing process of capturing an image of a target region;

a target detection process of detecting a first target device from the target region using the image of the target region;

a body control process of controlling a position of a body in such a way that the body moves to and hovers in an air above the detected first target device;

a distance measurement process of measuring, in the air above the first target device, a distance to another flying object hovering above the second target device; and a distance transmission process of transmitting the distance.

Supplementary Note 41

The storage medium according to Supplementary Note 40, the program causing the computer to further execute a target information reception process of receiving information about a first target device row that is a set of a plurality of first target devices sequenced, wherein the target detection process includes detecting the plurality of first target devices in the first target device row in the target region, from an image of the target region, the body control process includes controlling the body in such a way that the body hovers above the first target device, included in the first target device row, whose order in the first target device row is the same as an order of the second target device in the second target device row during a first time period at least part of which is common to a second time period during which the another flying object hovers above the second target device included in a second target device row that is a set of a plurality of second target devices sequenced, and the distance measurement process includes measuring the distance to the another flying object in a common time period between the first time period and the second time period.

Supplementary Note 42

The storage medium according to Supplementary Note 41, the program causing the computer to further execute an instruction reception process of receiving an order instruction indicating a designated order wherein the body control process includes controlling the body in such a way that the body hovers above the first target device whose order in the first target device row is the designated order indicated by the designated order, during the first time period at least part of which is common to the second time period during which the another flying object hovers above the second target device whose order in the second target device row is the designated order indicated by the designated order.

Supplementary Note 43

The storage medium according to Supplementary Note 41, wherein the body control process includes controlling the body in such a way that the body repeats hovering above the first target device and flying to an air above the next first target device according to an order in the first target device row, and the program causes the computer to further execute an instruction transmission process of instructing, when the flying object starts flying to the air above the next first target device, the another flying object that repeats hovering above the second target device and flying to an air above the next second target device to fly to the air above the next second target device according to an order in the second target device row.

Supplementary Note 44

The storage medium according to any one of Supplementary Notes 40 to 43, the program causing the computer to further execute a height target measurement process of measuring a height target device, wherein the body control process includes controlling a height of a position where the body hovers in such a way that a height of the height target device is equal to the height of the position where the body hovers, using a result of a measurement of the height target device.

Supplementary Note 45

The storage medium according to Supplementary Note 44, the program causing the computer to further execute a flying object measurement process of measuring the another flying object after controlling the height of the position where the body hovers in such a way that a height of the height target device is equal to the height of the position where the body hovers, wherein the body control process includes controlling the height of the position where the body hovers in such a way that a height of a position where the another flying object hovers is equal to the height of the position where the body hovers, using a result of a measurement of the another flying object.

Supplementary Note 46

The storage medium according to any one of Supplementary Notes 40 to 43, the program causing the computer to further execute a flying object measurement process of measuring the another flying object, wherein the body control process includes controlling a height of a position where the body hovers in such a way that a height of a position where the another flying object hovers is equal to a height of a position where the body hovers using a result of a measurement of the another flying object.

Although the present disclosure is described with reference to the exemplary example embodiments, the present disclosure is not limited to the exemplary example embodiments. Various modifications that can be understood by those of ordinary skill in the art can be made to the configuration and details of the present disclosure within the scope of the present disclosure.

REFERENCE SIGNS LIST

1 measurement system
2 measurement system
10 control device
70 flying object
100 control device
110 target detection unit
120 target position identification unit
130 flying object control unit
131 position target detection unit
132 height target detection unit
140 measurement control unit
150 distance acquisition unit
160 estimation unit
170 output unit
181 target image acquisition unit
182 position information acquisition unit
183 target measurement result acquisition unit
184 height measurement result acquisition unit
185 flying object measurement result acquisition unit
200 flying object
200A first flying object
200B second flying object
210 transmission/reception unit
220 measurement control unit
231 target image capturing unit
232 position information acquisition unit
233 target measurement unit
234 height target measurement unit
235 flying object measurement unit
236 distance measurement unit
240 control unit
300 communication network
400 target device
400A first target device
400B second target device
500 target device
600 control device
610 target information transmission unit
620 target information storage unit
630 flying object control unit
640 measurement control unit
650 distance acquisition unit
660 estimation unit
670 output unit
700 flying object
700A first flying object
700B second flying object
710 instruction reception unit
720 measurement control unit
730 body control unit
731 target image capturing unit
732 position information acquisition unit
733 target measurement unit
734 height target measurement unit
735 flying object measurement unit
736 distance measurement unit
740 control unit
750 target information reception unit
751 target image acquisition unit
752 target detection unit
753 target position identification unit
760 position target detection unit
770 height target detection unit
780 distance transmission unit
1000 computer
1001 processor
1002 memory
1003 storage device
1004 I/O interface
1005 storage medium

What is claimed is:

1. A control device comprising:

at least one memory storing a set of instructions; and at least one processor configured to execute the set of instructions to:

control a first flying object and a second flying object in such a way that the first flying object hovers vertically above a first target device, and the second flying object hovers vertically above a second target device;

control the first flying object in such a way that the first flying object measure a first distance to the second flying object in response to the first flying object hovering vertically above the first target device and the second flying object hovering vertically above the second target device; and acquire the measured first distance from the first flying object.

2. The control device according to claim 1, wherein the at least one processor is further configured to execute the instructions to:

control at least one of the first flying object or the second flying object in such a way that the at least one of the first flying object or the second flying object flies while capturing an image of a ground of a target region in which the first target device and the second target device are placed, and transmits the image;

receive, the image;

detect, from the image, the first target device and the second target device; and identify a position of the first target device and a position of the second target device in the target region; and control the first flying object and the second flying object by using the identified position of the first target device and the identified position of the second target device.

3. The control device according to claim 1, wherein the first target device is included in a first target device row that is a set of a plurality of sequenced first target devices, the second target device is included in a second target device row that is a set of a plurality of sequenced second target devices, the at least one processor is further configured to execute the instructions to:

control the first flying object and the second flying object in such a way that the second flying object hovers above the second target device during a second time period at least part of which is common to a first time period during which the first flying object hovers above the first target device, a place number of the second target device in the second target device row being same as a place number of the first target device in the first target device row; and control the first flying object in such a way that the first flying object measures a distance to the second flying object in a common time period between the first time period and the second time period.

4. The control device according to claim 3, wherein the at least one processor is further configured to execute the instructions to control the first flying object and the second flying object in such a way that the first flying object repeats hovering above the first target device and flying to above the next first target device according to order in the first target device row, and that the second flying object repeats hovering above the second target device and flying to above the next second target device according to order in the second target device row.

5. The control device according to claim 1, wherein the at least one processor is further configured to execute the instructions to:

acquire, from the first flying object, first height target measurement data that is a result of the first flying object measuring a height target device, and to acquire, from the second flying object, second height target measurement data that is a result of the second flying object measuring the height target device; wherein control the first flying object and the second flying object by using the first height target measurement data and the second height target measurement data in such a way that the first flying object and the second flying object hover at a height equal to a height of the height target device.

6. The control device according to claim 1, wherein the at least one processor is further configured to execute the instructions to:

acquire, from the first flying object, second flying object measurement data that is a result of the first flying object measuring the second flying object;

acquire, from the second flying object, first flying object measurement data that is a result of the second flying object measuring the first flying object; and control the first flying object and the second flying object by using the first flying object measurement data and the second flying object measurement data in such a way that a height of the first flying object and a height of the second flying object are equal to a height of the height target device.

7. The control device according to claim 1, wherein the at least one processor is further configured to execute the instructions to:

estimate an estimated distance that is a distance between the first target device and the second target device by using the first distance; and output the estimated distance.

8. The control device according to claim 7, wherein the at least one processor is further configured to execute the instructions to:

control the second flying object in such a way that the second flying object further measures a second distance to the first flying object in response to the first flying object coming to above the first target device and the second flying object coming to above the second target device;

acquire the measured first distance from the second flying object; and estimate the estimated distance by using the first distance and the second distance.

9. A measurement system including the control device according to claim 1, the measurement system comprising:

the first flying object; the second flying object; the first target device; and the second target device.

10. A flying object comprising:

at least one memory storing a set of instructions; and at least one processor configured to execute the set of instructions to:

capture an image of a target region;

detect a first target device from the target region by using the image of the target region;

control a position of a body in such a way that the body moves to and hovers vertically above the detected first target device;

measure, at vertically above the first target device, a distance to another flying object hovering above the second target device; and transmit the distance.

11. The flying object according to claim 10, wherein the at least one processor is further configured to execute the instructions to:

receive information about a first target device row that is a set of a plurality of first target devices that are sequenced;

detect, from an image of the target region, the plurality of first target devices in the first target device row in the target region;

control the body in such a way that the body hovers above the first target device during a first time period at least part of which is common to a second time period during which the another flying object hovers above the second target device, the first target device being included in the first target device row, the second target device being included in a second target device row that is a set of a plurality of second target devices that are sequenced, a place number of the first target device in the first target device row being same as a place number of the second target device in the second target device row; and measure the distance to the another flying object in a common time period between the first time period and the second time period.

12. The flying object according to claim 11, wherein the at least one processor is further configured to execute the instructions to:

receive a place number instruction indicating a designated place number; and control the body in such a way that the body hovers above the first target device during the first time period at least part of which is common to the second time period during which the another flying object hovers above the second target device, a place number of the first target device in the first target device row being the designated place number indicated by the designated place number, a place number of the second target device in the second target device row being the designated place number indicated by the designated place number.

13. The flying object according to claim 11, wherein the at least one processor is further configured to execute the instructions to:

control the body in such a way that the body repeats hovering above the first target device and flying to above the next first target device according to order in the first target device row; and instruct, when the flying object starts flying to above the next first target device, the another flying object to fly to above the next second target device according to order in the second target device row, the another flying object that repeating hovering above the second target device and flying to above the next second target device.

14. The flying object according to claim 10, wherein the at least one processor is further configured to execute the instructions to:

measure a height target device; and control, by using a result of a measurement of the height target device, a height of a position where the body hovers in such a way that a height of the height target device is equal to the height of the position where the body hovers.

15. The flying object according to claim 14, wherein the at least one processor is further configured to execute the instructions to:

measure the another flying object after controlling the height of the position where the body hovers in such a way that a height of the height target device is equal to the height of the position where the body hovers; and control, by using a result of a measurement of the another flying object, the height of the position where the body hovers in such a way that a height of a position where the another flying object hovers is equal to the height of the position where the body hovers.

16. The flying object according to claim 10, wherein the at least one processor is further configured to execute the instructions to:

measure the another flying object; and control, by using a result of a measurement of the another flying object, a height of a position where the body hovers in such a way that a height of a position where the another flying object hovers is equal to a height of a position where the body hovers.

17. A control method comprising:

controlling a first flying object and a second flying object in such a way that the first flying object hovers vertically above a first target device, and the second flying object hovers vertically above a second target device;

controlling the first flying object in such a way that the first flying object measure a first distance to the second flying object in response to the first flying object hovering vertically above the first target device and the second flying object hovering vertically above the second target device; and acquiring the measured first distance from the first flying object.

18. The control method according to claim 17, the method further comprising:

controlling at least one of the first flying object or the second flying object in such a way that the at least one of the first flying object or the second flying object flies while capturing an image of a ground of a target region in which the first target device and the second target device are placed, and transmitting the image;

receiving the image;

target detection means detecting, from the image, the first target device and the second target device;

identifying a position of the first target device and a position of the second target device in the target region; and controlling the first flying object and the second flying object by using the identified position of the first target device and the identified position of the second target device.

19. The control method according to claim 17, wherein the first target device is included in a first target device row that is a set of a plurality of sequenced first target devices, and the second target device is included in a second target device row that is a set of a plurality of sequenced second target devices, the method further comprising:

controlling the first flying object and the second flying object in such a way that the second flying object hovers above the second target device during a second time period at least part of which is common to a first time period during which the first flying object hovers above the first target device, a place number of the second target device in the second target device row being same as a place number of the first target device in the first target device row; and controlling the first flying object in such a way that the first flying object measures a distance to the second flying object in a common time period between the first time period and the second time period.

20. The control method according to claim 19, the method further comprising controlling the first flying object and the second flying object in such a way that the first flying object repeats hovering above the first target device and flying to above the next first target device according to order in the first target device row, and that the second flying object repeats hovering above the second target device and flying to above the next second target device according to order in the second target device row.

* * * * *